US007627825B2

(12) United States Patent
Kakuda

(10) Patent No.: US 7,627,825 B2
(45) Date of Patent: Dec. 1, 2009

(54) CONTROL DEVICE AND METHOD, INFORMATION PROCESSING DEVICE AND METHOD, RECORDING MEDIUM, AND PROGRAM

(75) Inventor: Hiroshi Kakuda, Tokyo (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 10/509,557

(22) PCT Filed: Dec. 19, 2003

(86) PCT No.: PCT/JP03/16311

§ 371 (c)(1),
(2), (4) Date: Sep. 29, 2004

(87) PCT Pub. No.: WO2004/068889

PCT Pub. Date: Aug. 12, 2004

(65) Prior Publication Data

US 2005/0172228 A1 Aug. 4, 2005

(30) Foreign Application Priority Data

Jan. 30, 2003 (JP) ............................ 2003-021973

(51) Int. Cl.
*G06F 3/00* (2006.01)

(52) U.S. Cl. ...................................... 715/744; 715/866

(58) Field of Classification Search ................. 715/789, 715/864, 764, 716, 771, 744, 866; 345/169
See application file for complete search history.

(56) References Cited

U.S. PATENT DOCUMENTS 5,956,025 A * 9/1999 Goulden et al. ............. 715/716
6,211,856 B1 * 4/2001 Choi et al. .................. 345/666
6,603,488 B2 * 8/2003 Humpleman et al. ........ 715/771
6,914,551 B2 * 7/2005 Vidal ......................... 341/176
2002/0143805 A1 * 10/2002 Hayes et al. ................ 707/500
2003/0237043 A1 * 12/2003 Novak et al. ............. 715/500.1
2005/0149870 A1 * 7/2005 Van Ee et al. ............... 715/700

FOREIGN PATENT DOCUMENTS

JP 6-319177 11/1994
JP 9-23487 1/1997

(Continued)

*Primary Examiner*—Kieu Vu
*Assistant Examiner*—Omar Abdul-Ali
(74) *Attorney, Agent, or Firm*—Finnegan, Henderson, Farabow, Garrett & Dunner, L.L.P.

(57) ABSTRACT

The present invention relates to a control apparatus and method, an information processing apparatus and method, a recording medium and a program, and enables them to control a device more efficiently and reliably. If a remote controller 1 executes a search and detects a plurality of information processing apparatuses, respective operation panel information of the detected plurality of information processing apparatuses is requested. In response to the request, the operation panel information transmitted from the device is acquired by the remote controller 1 and the editing of the operation panel information is performed. Based on the operation panel information obtained by editing, the operation panels of the detected plurality of devices is displayed on the remote controller 1. The present invention is applicable to an information processing apparatus that is capable of controlling a variety of AV (Audio Visual) equipment and a home electrical appliance and the like through wireless communication.

22 Claims, 45 Drawing Sheets

FOREIGN PATENT DOCUMENTS

| | | |
|---|---|---|
| JP | 2001-242995 | 9/2001 |
| JP | 2002-016990 | 1/2002 |
| JP | 2002-112361 | 4/2002 |
| JP | 2003-509934 | 3/2003 |
| WO | WO 01/20572 | 3/2001 |

* cited by examiner

FIG.14

| | NAME | CATEGORY | MANU-FACTURER CODE | DEVICE ID | BLUETOOTH ADDRESS |
|---|---|---|---|---|---|
| DEVICE 1 | TELEVISION | TV | 00x1 | 1234 | 08:00:46:21:94:A3 |

FIG.21

| OPERATED DEVICE | YEAR/ MONTH/DAY | TIME | BUTTON ID (CONTENTS OF OPERATION) |
|---|---|---|---|
| A | 2002.11.25 | 16:00:15 | A001 |
| B | 2002.11.25 | 16:00:08 | B015 |
| A | 2002.11.25 | 15:30:00 | A002 |
| C | 2002.11.25 | 15:29:30 | C010 |
| D | 2002.11.25 | 15:29:25 | D001 |
| A | 2002.11.25 | 15:29:20 | A001 |
| B | 2002.11.25 | 15:15:45 | B010 |
| B | 2002.11.25 | 15:15:30 | B011 |
| B | 2002.11.25 | 15:15:15 | B012 |
| ⋮ | ⋮ | ⋮ | ⋮ |

| OPERATION PANEL | NUMBER OF USES |
| --- | --- |
| DEVICE A | 10 |
| DEVICE B | 5 |
| DEVICE C | 1 |

FIG.38

| PERIOD OF TIME \ DEVICE | A | B | C | D |
| --- | --- | --- | --- | --- |
| 13:00~13:59 | 25 | 0 | 10 | 2 |
| 14:00~14:59 | 10 | 5 | 0 | 0 |
| 15:00~15:59 | 5 | 2 | 0 | 5 |
| 16:00~16:59 | 7 | 2 | 3 | 10 |
| ⋮ | ⋮ | ⋮ | ⋮ | ⋮ |

FIG.41

| DEVICE \ DEVICE | A | B | C | D |
|---|---|---|---|---|
| A | | 5 | 0 | 2 |
| B | 5 | | 0 | 1 |
| C | 0 | 0 | | 0 |
| D | 2 | 1 | 0 | |

CONTROL DEVICE AND METHOD, INFORMATION PROCESSING DEVICE AND METHOD, RECORDING MEDIUM, AND PROGRAM

TECHNICAL FIELD

The present invention relates to a control apparatus and method, an information processing apparatus and method, a recording medium, and a program. In particular, the present invention relates to a control apparatus and method, an information processing apparatus and method, a recording medium, and a program which allow more effective control of the information processing apparatus.

BACKGROUND ART

In recent years, there has been widely used a new category of AV (Audio Visual) equipment and the like, for example, a hard disk recorder, a DVD (Digital Versatile Disc) recorder and the like.

Each piece of the equipment is normally equipped with a remote controller. Therefore, each time new piece of equipment is purchased, the number of remote controllers in the house is increased. For example, in a general household, there are already remote controllers for a television receiver, a VTR (Video Tape Recorder), audio equipment or the like.

Moreover, the number of personal computers having a television program playback function and a music playback function or various home electric appliances such as an air conditioner and lighting equipment, which can be operated by a remote controller, show a tendency to increase. Some households may have a considerable number of remote controllers.

Therefore, various types of technique enabling to manage such a plurality of remote controllers in an integrated manner has conventionally been proposed.

For example, in Japanese Patent application Publication No. 2002-16990 discloses a technique such that downloading display screen information of a remote controller and displaying a remote controller image based on it so as to allow the addition of a function of the remote controller.

Moreover, in Japanese Patent Application Publication No. 6-319177, a technique for allowing easy detection of equipment to be controlled in the case where a plurality of pieces of equipment can be so controllable by a single remote controller is disclosed.

In the above-mentioned techniques, however, if equipment to be controlled is detected, a remote controller image for controlling the equipment is merely displayed on a screen of the remote controller. Therefore, there is a problem that the equipment cannot be efficiently operated.

For example, in the case where a plurality of equipment is detected, if only a plurality of remote controller images for controlling the respective equipment are simultaneously displayed on a single screen, it takes a long time for a user to recognize the remote controller images and an approach to be taken for the equipment to be operated based on them. Therefore, the equipment cannot be efficiently operated. Moreover, some of such displays may possibly induce an erroneous operation of a user.

DISCLOSURE OF THE INVENTION

The present invention has been devised in diagram of the above circumstances so as to allow more effective and precise control of target equipment.

A control apparatus according to the present invention is characterized by including: detection means for detecting an information processing apparatus through wireless communication; first acquisition means for acquiring respective operation screen information of a plurality of information processing apparatuses if the plurality of information processing apparatuses is detected by the detection means, the first acquisition means is acquisition means for acquiring the operation screen information for displaying the operation screen that is to be operated when the information processing apparatus is controlled; editing means for editing the plurality of operation screen information so that the plurality of operation screens is displayed in a single display region if the plurality of operation screen information is acquired by the first acquisition means; display means for displaying the operation screens based on the operation screen information edited by the editing means; and control means for controlling the information processing apparatuses based on an input provided from the operation screens displayed by the display means.

The first acquisition means can acquire the operation screen information from the information processing apparatus through the wireless communication.

The first acquisition means can acquire the operation screen information from a predetermined server managing the operation screen information through the wireless communication.

Storage management means for managing storage of the already acquired operation screen information is further included, wherein the first acquisition means can acquire the operation screen information, the storage of which is managed by the storage management means.

The storage management means can clear less frequently used operation screen information from among the operation screen information, the storage of which is managed.

Intensity detection means for detecting intensities of the respective radio waves emitted from the plurality of information processing apparatuses is further included, wherein the editing means can edit the operation screen information so that the operation screen of the information processing apparatus that emits a high intensity radio wave is displayed by priority based on detection by the intensity detection means.

The display means determines whether or not the control apparatus is out of a communication coverage with the information processing apparatuses based on detection by the intensity detection means. If it is determined that the control apparatus is out of the communication coverage, the operation screen can be displayed so that transparency thereof is gradually increased at every predetermined time.

The editing means can edit the plurality of operation screen information so that the operation screen being operated is continuously displayed.

History management means for managing a history of control of the information processing apparatuses, which is performed by the control means, can be further included.

The editing means can edit the operation screen information so that the operation screen of a most recently operated information processing apparatus is displayed by priority based on the history managed by the history management means.

The editing means can edit the operation screen information so that the most frequently used operation screen is displayed by priority based on the history managed by the history management means.

The editing means can edit the operation screen information so that the operation screen, which is most likely to be used within a period of time including a current time, is displayed by priority based on the history managed by the history management means.

Selection means for selecting other information processing apparatus relevant to the information processing apparatus displaying the operation screen thereof is displayed, based on the histories managed by the history management means, is further included, wherein the editing means can edit the operation screen information so that the operation screen of other processing apparatus selected by the selection means is displayed together with the operation screen of the information processing apparatus.

The selection means can select other information processing apparatus relevant to the information processing apparatus based on a time difference between times at which the information processing apparatus and other information processing apparatus are respectively controlled, the times is obtained from the history.

The operation screen information can be described in an HTML.

Second acquisition means for acquiring other operation screen information in accordance with a category of the information processing apparatus is further included, wherein the display means can display other operation screen based on other operation screen information acquired by the second acquisition means, until the operation screen information is acquired by the first acquisition means.

If the information processing apparatus transmits the operation screen information, the first acquisition means can transmit feature information indicating a feature of the control apparatus and acquire the operation screen information transmitted from the information processing apparatus in response to the transmission.

A control method of a control apparatus according to the present invention is characterized by including: a detection step of detecting an information processing apparatus through wireless communication; an acquisition step of acquiring operation screen information for displaying an operation screen that is to be operated when the information processing apparatus is controlled while acquiring the respective operation screen information of a plurality of information processing apparatuses if the plurality of information processing apparatuses is detected by a process in the detection step; an editing step of editing the plurality of operation screen information so that a plurality of operation screens is displayed in a single display region if the plurality of information processing apparatuses is acquired by a process in the acquisition step; a display step of displaying the operation screens based on the operation screen information edited by a process in the editing step; and a control step of controlling the information processing apparatus based on an input provided from the operation screen displayed by a process in the display step.

A program recorded on a first recording medium according to the present invention is characterized by including: a detection step of detecting an information processing apparatus through wireless communication; an acquisition step of acquiring operation screen information for displaying an operation screen that is to be operated when the information processing apparatus is controlled while acquiring the respective operation screen information of a plurality of information processing apparatuses if the plurality of information processing apparatuses is detected by a process in the detection step; an editing step of editing the plurality of operation screen information so that a plurality of operation screens is displayed in a single display region if the plurality of information processing apparatuses is acquired by a process in the acquisition step; a display step of displaying the operation screens based on the operation screen information edited by a process in the editing step; and a control step of controlling the information processing apparatus based on an input provided from the operation screen displayed by a process in the display step.

A first program according to the present invention is characterized by including: a detection step of detecting an information processing apparatus through wireless communication; an acquisition step of acquiring operation screen information for displaying an operation screen that is to be operated when the information processing apparatus is controlled while acquiring the respective operation screen information of a plurality of information processing apparatuses if the plurality of information processing apparatuses is detected by a process in the detection step; an editing step of editing the plurality of operation screen information so that a plurality of operation screens is displayed in a single display region if the plurality of information processing apparatuses is acquired by a process in the acquisition step; a display step of displaying the operation screens based on the operation screen information edited by a process in the editing step; and a control step of controlling the information processing apparatus based on an input provided from the operation screen displayed by a process in the display step.

An information processing apparatus according to the present invention is characterized by including: storage means for storing operation screen information for making a control apparatus display an operation screen that is to be operated when the information processing apparatus is controlled, the operation screen information which is a constituent element for editing of a plurality of operation screens to be edited by the control apparatus; and transmission means for transmitting the operation screen information stored by the storage means to the control apparatus through wireless communication in response to a request from the control apparatus.

The operation screen information is selected based on feature information indicating a feature of the control apparatus so that the transmission means can transmit the operation screen information selected based on the feature information to the control apparatus.

An information processing method of an information processing apparatus according to the present invention is characterized by including: a storage step of storing operation screen information for making a control apparatus display an operation screen that is to be operated when the information processing apparatus is controlled, the operation screen information which is a constituent element for editing of a plurality of operation screens to be edited by the control apparatus; and a transmission step of transmitting the operation screen information stored by a process in the storage step to the control apparatus through wireless communication in response to a request from the control apparatus.

A program recorded on a second recording medium according to the present invention is characterized by including: a storage step of storing operation screen information for making a control apparatus display an operation screen that is to be operated when the information processing apparatus is controlled, the operation screen information which is a constituent element for editing of a plurality of operation screens to be edited by the control apparatus; and a transmission step of transmitting the operation screen information stored by a process in the storage step to the control apparatus through wireless communication in response to a request from the control apparatus.

A second program according to the present invention is characterized by including: a storage step of storing operation screen information for making a control apparatus display an operation screen that is to be operated when the information processing apparatus is controlled, the operation screen information which is a constituent element for editing of a plurality of operation screens to be edited by the control apparatus; and a transmission step of transmitting the operation screen information stored by a process in the storage step to the control apparatus through wireless communication in response to a request from the control apparatus.

In the control apparatus and method and the program according to the present invention, the information processing apparatus in the vicinity of the control apparatus is detected through the wireless communication. If a plurality of information processing apparatuses is detected, the respective operation screen information of the plurality of information processing apparatuses is acquired. If the plurality of operation screen information is acquired, the plurality of operation screen information is edited so that a plurality of operation screens is displayed in a single display region. As a result, the operation screens are displayed based on the edited operation screen information. The information processing apparatus is controlled based on an input provided from the operation screen.

In the control apparatus and method and the program according to the present invention, operation screen information for making a control apparatus display an operation screen, which is operated when the information processing apparatus is controlled, is stored, the operation screen information which is a constituent element for editing of a plurality of operation screens to be edited by the control apparatus. The stored operation screen information is transmitted to the control apparatus through the wireless communication in response to a request from the control apparatus.

BRIEF DESCRIPTION OF DRAWINGS

FIG. 14 is a diagram showing an example of information registered by the process in FIG. 12;

FIG. 21 is a diagram showing an example of an operation history;

FIG. 38 is a diagram showing an example of a management table of operation histories;

FIG. 41 is a diagram showing an example of a management table that controls the relevance between devices;

BEST MODE FOR CARRYING OUT THE INVENTION

Figure 1:
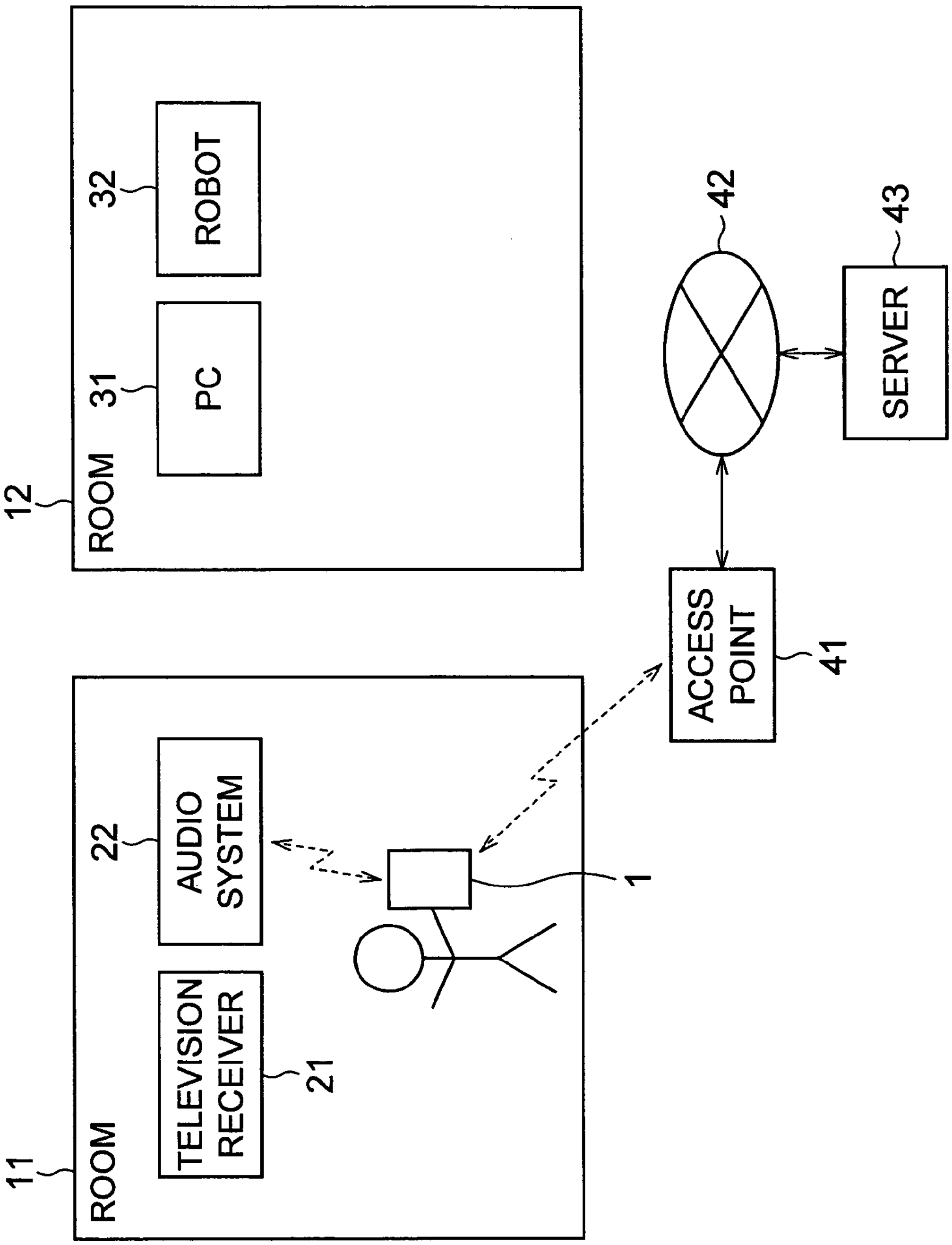
FIG. 1 is a diagram showing an example of a configuration of a control system to which the present invention is applied.

FIG. 1 is a diagram showing an example of a configuration of a control system to which the present invention is applied.

A remote controller (control apparatus) 1 has a wireless communication facility in conformity with, for example, Bluetooth (registered trademark) communication or IEEE (Institute of Electrical and Electronics Engineers) 802.11a, 802.11b, 802.11g and the like. The remote controller 1 transmits a command based on an input provided from a user through the wireless communication to a device to be controlled (an information processing apparatus) so as to control the device.

More specifically, the device to be controlled by the remote controller is also provided with a communication facility by Bluetooth or a communication facility in conformity with IEEE802.11b or the like.

In the example shown in FIG. 1, a television receiver 21 and an audio system 22 are placed in a room 11 as devices to be controlled by the remote controller 1. In a room 12, a personal computer (PC) 31 and a robot 32 are placed or present.

For example, when the remote controller 1 detects that it is held by a user because a vibration having a predetermined threshold value or more occurs in a built-in vibration sensor, it searches a device to be controlled so as to detect a device in the vicinity. Herein, the term "vicinity" means the range of, for example, several tens of centimeters to several meters, which allows the detection of a device that is placed in the room in which the remote controller 1 is present at that time. The user may also be allowed to set the range in which the device is searched by the remote controller 1 (the range of the vicinity).

When the remote controller 1 detects the device to be controlled as a result of the search, it communicates with the device by, for example, an HTTP (Hyper Text Transfer Protocol) so as to acquire, from the device, operation panel information for displaying an operation panel (a screen on which various buttons are arranged) that is operated by a user to control the device. Each device controlled by the remote controller 1 stores the operation panel information described in, for example, an HTML (Hyper Text Markup Language) and provides the operation panel information to the remote controller 1 through wireless communication such as Bluetooth in response to a request from the remote controller 1.

More specifically, a system between a client and a server is realized by the remote controller 1 and the device. The information panel information is provided from the device serving as a server to the remote controller 1.

For example, in the room 11 in FIG. 1, when the remote controller 1 detects that it is picked up by the user, it detects by a search the television receiver 21 and the audio system 22 as controllable devices. Moreover, the remote controller 1 acquires the respective operation panel information from the television receiver 21 and the audio system 22 through Bluetooth communication so as to display operation panels based on the acquired information.

Therefore, on an LCD (Liquid Crystal Display) 51 (FIG. 2) formed on a surface of the remote controller 1, an operation panel for operating the television receiver 21 and an operation panel for operating the audio system 22 are displayed. In the case where a plurality of devices is detected in this manner, the operation panel information are edited (splitting of frames of an HTML file) in the remote controller 1 so as to display the operation panels for a plurality of devices on a single LCD 51.

A touch panel is superposed on the LCD 51. When a predetermined button on the operation panel is operated by the user, a command corresponding to the operation is transmitted to the device. In the example shown in FIG. 1, an arrow in a broken line indicates that a predetermined control command is transmitted from the remote controller 1 to the audio system 22.

For example, if the user goes out of the room 11 with the remote controller 1 to be out of the communication coverage with the devices (the television receiver 21 and the audio system 22), the operation panels displayed on the remote controller 1 until then are cleared.

Likewise, in the room 12, a device is searched by the remote controller 1 at predetermined timing such as at the detection of pickup by the user. In this case, on the remote controller 1, an operation panel operated when the personal computer 31 is controlled and an operation panel operated when the robot 32 is controlled are displayed on the LCD 51 based on the information acquired from the personal computer 31 and the robot 32.

Therefore, if only the user enters the communication coverage with the devices while carrying the remote controller 1, the operation panels corresponding to the devices in the vicinity can be displayed without performing any operations on the remote controller 1 by himself/herself.

In the example shown in FIG. 1, an access point 41, which is wirelessly communicable with the remote controller 1 by Bluetooth communication, IEEE802.11b or the like, is provided. For example, if the operation panel information is not stored in the detected device or if new operation panel information is required to be acquired so as to use a function additionally provided for the device, the remote controller 1 communicates with the access point 41 to access the server 43 through a network 42 in order to download the operation panel information from the server 43.

As a result, the addition of a function to the device can accepted so as to display an operation panel optimum for the functions of the device at that time on the remote controller 1.

Figure 2:
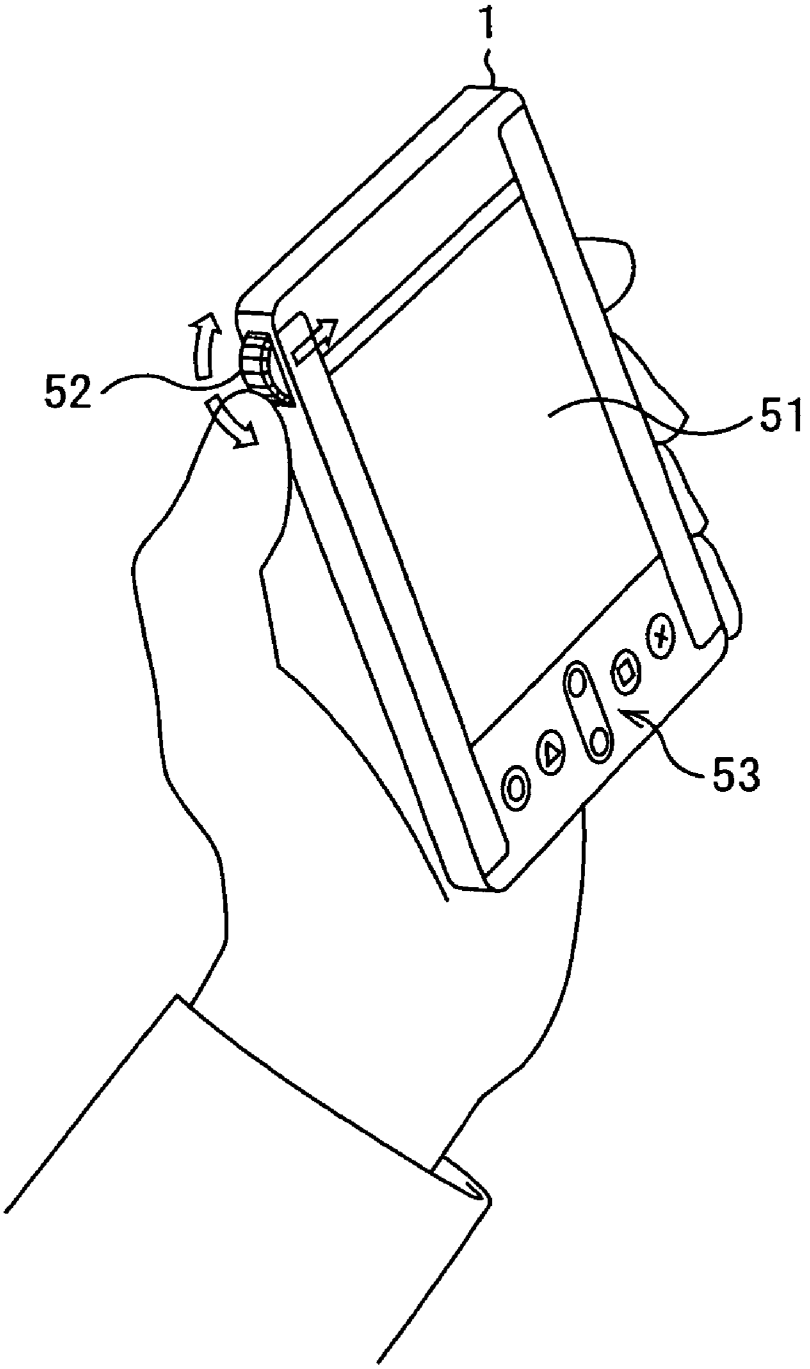
FIG. 2 is a perspective view showing an example of appearance of a remote controller in FIG. 1.

FIG. 2 is a perspective view showing an example of the appearance of the remote controller 1.

As shown in FIG. 2, a casing of the remote controller 1 is formed in such size that allows to grip and operate by one hand. The LCD 51, on which the operation panels of various devices are displayed, is formed on a front face of the casing of the remote controller 1. The touch panel is superposed on the LCD 51 so as to detect a position (a button) pressed by a user with a fingertip.

A jog dial 52 is provided on an upper portion the side face of the casing of the remote controller 1. The jog dial 52 is rolled as indicated with outline arrows in the drawing or pressed inward of the main body, for the selection of a button, an icon or the like displayed on the LCD 51. For example, in the case where a plurality of operation panels is vertically arranged in a contiguous manner, the user rolls the jog dial 52 to scroll a display range of the LCD 51 so as to be able to select an operation panel.

Figure 3:
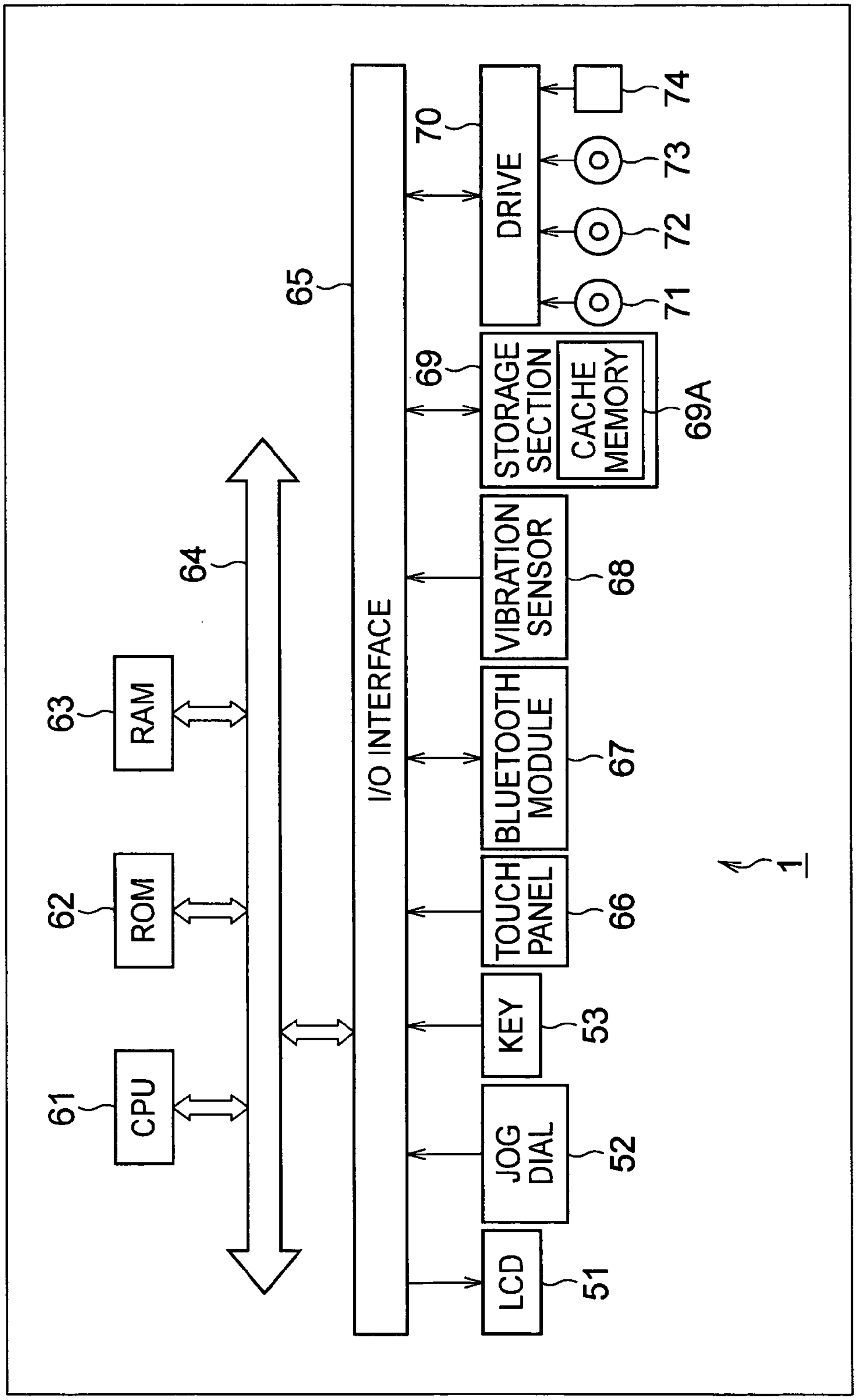
FIG. 3 is a block diagram showing an example of an internal configuration of the remote controller in FIG. 2.

A key 53 is operated by the user for input of various commands to a CPU (Central Processing Unit) 61 (see FIG. 3). For example, as the key 53, a search start button operated to start a search or a display switching button operated to switch the display when a plurality of operation panel information is acquired by the remote controller 1 may also be provided.

FIG. 3 is a block diagram showing an example of an internal configuration of the remote controller 1.

The CPU 61 executes various processes in accordance with a program stored in a ROM (Read Only Memory) 62 or a program loaded from a storage section 69 to a RAM (Random Access Memory) 63. Data necessary for the CPU 61 to execute various processes and the like are appropriately stored in the RAM 63.

The CPU 61, the ROM 62 and the RAM 63 are interconnected to each other through a bus 64. An input/output interface 65 is also connected to the bus 64.

To the input/output interface 65, the LCD 51, the jog dial 52, the key 53, and the touch panel 66 arranged so as to superpose on the LCD 51, are connected. A Bluetooth module 67 is connected to the input/output interface 65 as a wireless communication module for searching or controlling a device or for communication with the access point 41.

In the example shown in FIG. 3, the Bluetooth module 67 for performing communication in conformity with the Bluetooth communication is provided as a wireless communication module for searching or controlling a device. However, instead of the Bluetooth module 67 or in addition to the Bluetooth module 67, a wireless LAN (Local Area Network) module such as the above-described IEEE802.11b may be provided. Moreover, a module for infrared communication may be provided so as to search or control a device by the communication using an infrared ray.

A vibration sensor 68 for detecting a vibration generated in the casing of the remote controller 1 and the storage section 69 including a flash memory and a hard disk are also connected to the input/output interface 65. As described below, various device information about devices is stored in the storage section 69, while operation panel information (HTML files) acquired from the devices are stored in its cache memory 69A.

For example, a USB (Universal Serial Bus) connector or the like is formed on a surface of the remote controller 1 so that a drive 70 connected through a USB cable to the connector is appropriately connected to the input/output interface 65.

A magnetic disk 71, an optical disk 72, a magneto-optical disk 73, a semiconductor memory 74 or the like is attached to the drive 70 as needed so that a computer program read out from these recording mediums is installed on the storage section 69. Moreover, the operation panel information may be provided for the remote controller 1 by any one of the magnetic disk 71 through the semiconductor memory 74.

Figure 4:
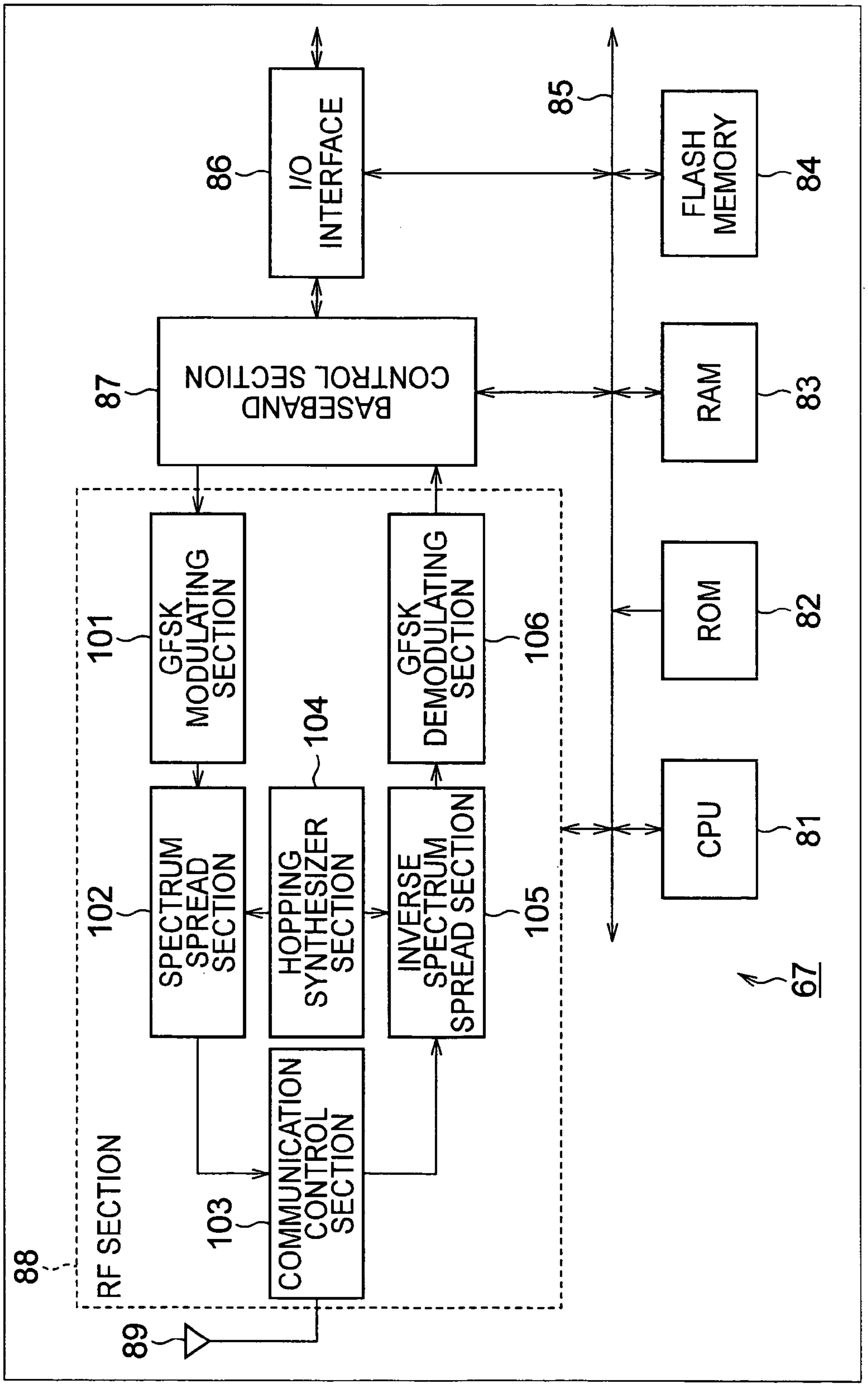
FIG. 4 is a block diagram showing an example of a configuration of a Bluetooth module in FIG. 3.

FIG. 4 is a block diagram showing an example of a configuration of the Bluetooth module 67 in FIG. 3.

A CPU 81 expands a control program stored in a ROM 82 to a RAM 83 so as to control the overall operation of the Bluetooth module 67. The CPU 81 through the RAM 83 are interconnected through a bus 85.

A flash memory 84 is connected to the bus 85. In the flash memory 84, for example, a Bluetooth device name, which is set for each Bluetooth device (a piece of equipment having a Bluetooth module) and is modifiable in accordance with the preference of a user, a Bluetooth address proper to each Bluetooth device, and the like are stored.

An input/output interface 86 manages the input and output of data supplied through the input/output interface 65 in FIG. 3 and data supplied from a baseband control section 87 based on an instruction from the CPU 81.

The baseband control section 87 supplies, for example, data supplied from the input/output interface 86 to a GFSK (Gaussian Frequency Shift Keying) modulating section 101 so as to transmit it to a device to be controlled while outputting data to the bus 85 or the input/output interface 86 when it is supplied from a GFSK demodulating section 106. The baseband control section 87 appropriately performs various controls such as communication link control, packet control, logic channel control, security control or a process such as error correction coding, decoding or data randomization.

The GFSK modulating section 101 in an RF (Radio Frequency) section 88 restricts a high radio frequency component of data supplied from the baseband control section 87 by a filter so as to perform frequency modulation as primary modulation and then outputs the acquired data to a spectrum spread section 102.

The spectrum spread section 102 switches a carrier frequency based on a frequency hopping pattern instructed by a hopping synthesizer section 104 so as to output a resultant signal, which is obtained after the spectrum spread is performed on the supplied data, to a communication control section 103.

An inverse spectrum spread section 105 makes a received frequency hop based on the frequency hopping pattern instructed by the hopping synthesizer section 104 so as to acquire, for example, a signal from the device. Moreover, the inverse spectrum spread section 105 performs inverse spectrum spread on the acquired signal so as to output the resultant signal to the GFSK demodulation section 106. The GFSK demodulating section 106 GFSK-demodulates the signal supplied from the inverse spectrum spread section 105 so as to output the acquired data to the baseband control section 87.

The communication control section 103 uses a 2.4 GHz band to transmit, for example, a signal for carrying a predetermined command, which is subjected to spectrum spread, from an antenna 89. Moreover, the communication control section 103 outputs the signal received from the antenna 89 to the inverse spectrum spread section 105.

Figure 5:
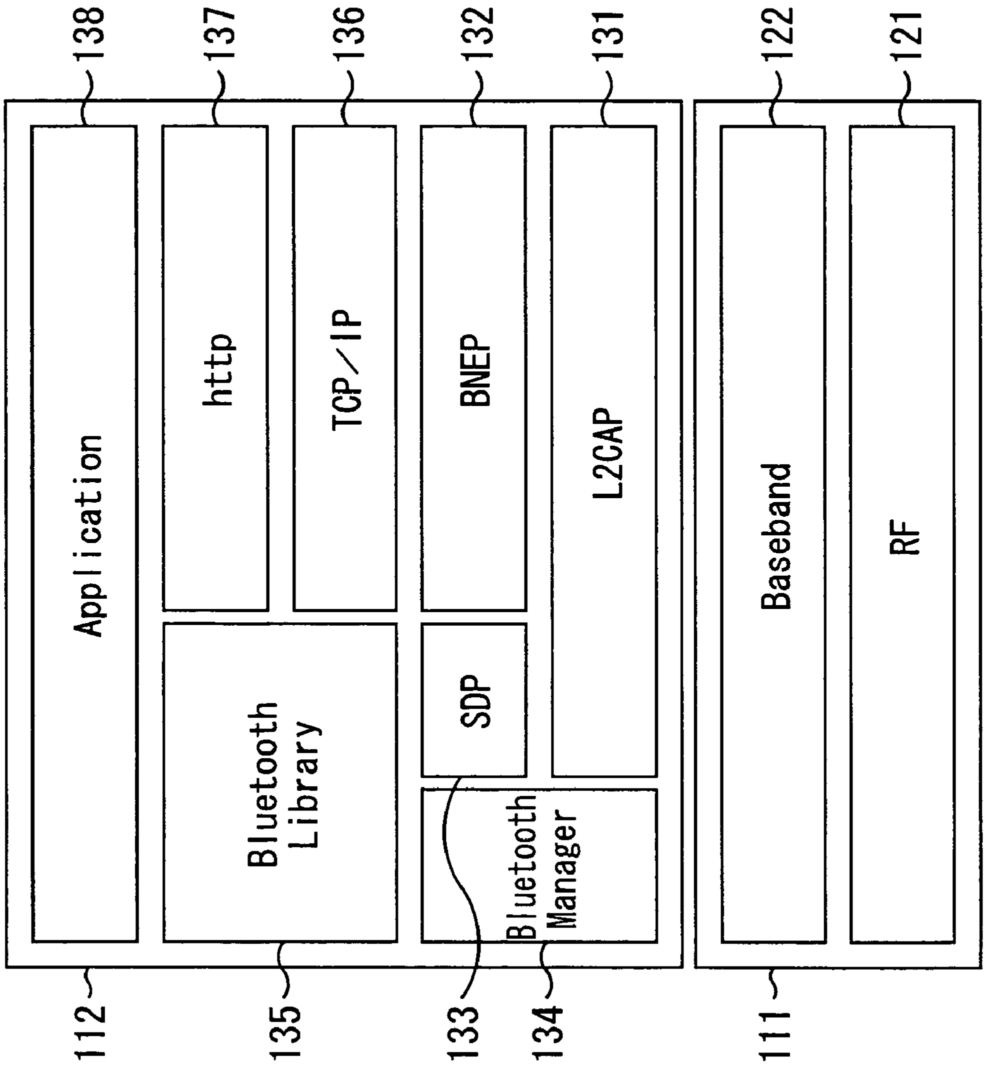
FIG. 5 is a diagram showing a protocol stack of Bluetooth.

FIG. 5 is a diagram showing an example of a protocol stack of a PAN (Personal Area Network) profile in the Bluetooth communication. For example, the control of the device with the remote controller 1 is performed by the PAN profile.

The protocol stack is composed of a hardware section 111 and a software section 112. A physical layer (RF layer) 121 of the hardware section 111 is a protocol for performing wireless communication using a frequency band at 2.4 GHz, which performs analog conversion on the data supplied from a baseband layer 112, a process inverse to it and the like. The baseband layer (Baseband layer) 122 is a protocol for providing an interface of a transmitted/received data packet to the physical layer 121. More specifically, in addition to the creation of a packet, the encoding or the decoding, it specifies a transmission/reception frequency for managing the frequency hopping, manages a time base slot and the like.

An L2CAP (Logical Link Control and Adaptation Protocol) (logical link control layer) 131 in the software section 112 is a protocol for controlling the entire Bluetooth system and providing an interface between an upper-level layer and a lower-level layer. More specifically, it sorts data in accordance with the type of protocol, converts a packet length or the like. A BNEP (Bluetooth Network Encapsulation Protocol) 132 is a protocol for providing the communication between slave equipment connected by multipoint connection. An SDP (Service Discovery Protocol) 133 is a protocol for detecting a function or a service provided by another equipment. A Bluetooth Manager 134 is, like the baseband layer 122, a protocol for managing a communication link in the Bluetooth communication, which, for example, instructs the baseband layer 122 to set the communication link or various parameters associated with the set communication link.

A Bluetooth Library 135 contains various components which are necessary for the communication. The TCP/IP communication performed with the detected device is managed by a TCP/IP (Transmission Control Protocol/Internet Protocol) layer 136, whereas the communication using an HTTP is managed by an HTTP layer 137. File transfer, LAN connection and the like through the Bluetooth communication are achieved by an application layer 138.

Figure 6:
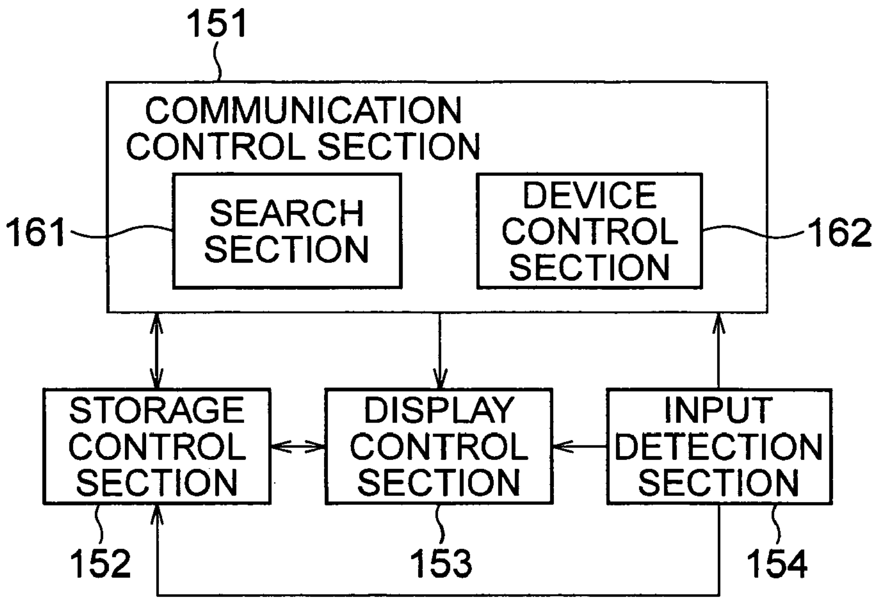
FIG. 6 is a block diagram showing an example of a functional configuration of the remote controller.

FIG. 6 is a block diagram showing an example of a functional configuration of the remote controller 1 having the above configuration. Each functional section shown in FIG. 6 is realized by the execution of a predetermined control program by the CPU 61.

The communication control section 151 manages the operation of the Bluetooth module 67 so as to control the Bluetooth communication with the devices. Therefore, in the case where a wireless LAN module or the like is provided in place of the Bluetooth module 67, its operation is controlled by the communication control section 151. In the following description, the case where the devices are controlled through the Bluetooth communication by the remote controller 1 will mainly be described.

The communication control section 151 includes a search section 161 and a device control section 162. The search section 161 searches a device that is present in the vicinity by Inquiry (query) and Page (call) specified in the Bluetooth in a predetermined cycle or at predetermined timing such as pickup of the casing of the remote controller 1 by the user. Information indicating the result of a search by the search section 161 is output to a storage control section 152 and a display control section 153.

The device control section 162 transmits a command corresponding to the input provided from the user to the searched device so as to control the device (for example, switch the channel of the television receiver 21 or the like). That is, information indicating the input provided from the user, which is detected by an input detection section 154, is output to the device control section 162 of the communication control section 151.

The storage control section 152 manages data stored in the storage section 69 while appropriately providing the stored data to the communication control section 151 and the like. By the storage control section 152, for example, information regarding the devices to be controlled and information such as an operation history of the user are managed. As described below, in order to control the devices by using the remote controller 1, the user is required to pre-register the information regarding the devices.

The display control section 153 controls the display of the LCD 51. For example, when the operation panel information is acquired and supplied by the communication control section 151 from the device to be controlled, the display control section 153 allows the LCD 51 to display an operation panel based on the supplied information.

The input detection section 154 detects the input provided from the user to the key 53 and the touch panel 66. Information indicating the detected input provided from the user is appropriately output to the storage control section 152, the display control section 153 or the like.

Figure 7:
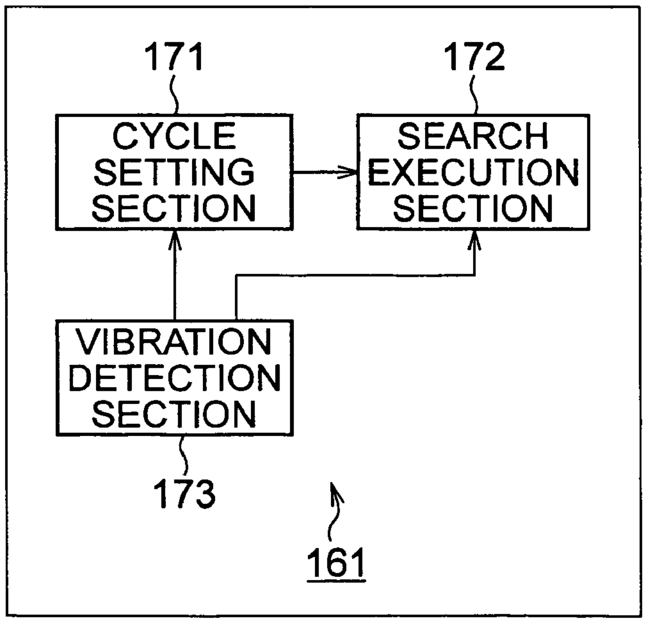
FIG. 7 is a block diagram showing an example of a configuration of a search section in FIG. 6.

FIG. 7 is a block diagram showing an example of a detailed configuration of the search section 161 in FIG. 6.

A cycle setting section 171 sets a cycle, in which a search is executed, in accordance with a status of the remote controller 1 at that time. A cycle for, for example, 10 seconds is set to the remote controller 1 as a cycle of a default for executing a search. If any device is not detected by a search, the cycle setting section 171 sets a longer cycle instead of the cycle of the default as a cycle for executing a search. Information indicating the cycle set by the cycle setting section 171 is output to a search execution section 172.

The search execution section 172 makes a search (Inquiry, Page) for a device in accordance with the cycle set by the cycle setting section 171. In addition, the search execution section 172 makes a search for a device when a vibration more than a predetermined threshold value is detected by a vibration detecting section 173. The result of the search by the search execution section 172 is appropriately output to the storage control section 152 and the display control section 153.

The vibration detecting section 173 monitors the output from the vibration sensor 68 so as to detect a vibration generated in the remote controller 1. For example, when a vibration more than a predetermined threshold value is detected, the vibration detecting section 173 recognizes the pickup of the casing of the remote controller 1 so as to output information indicating it to the cycle setting section 171 and the search execution section 172.

Figure 8:
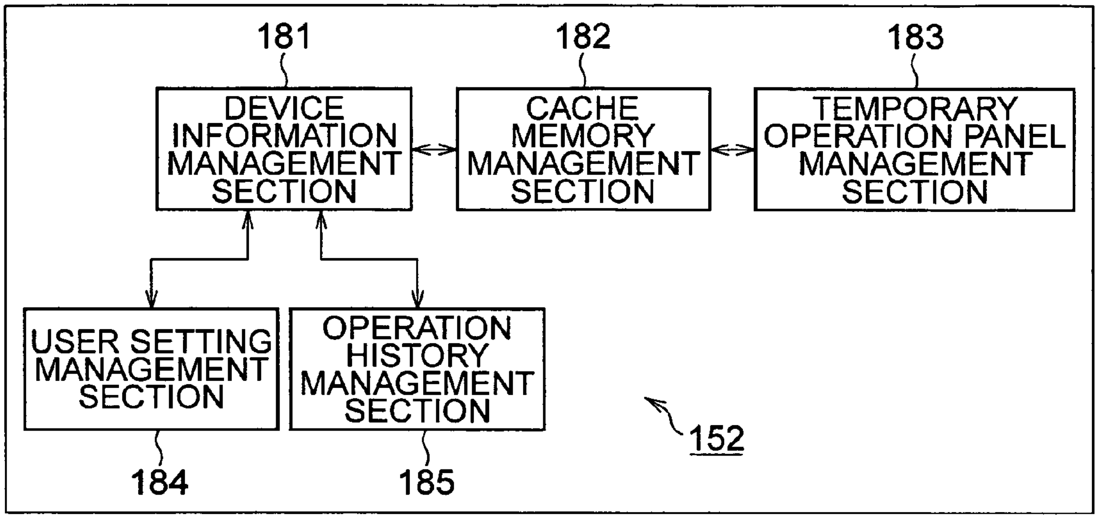
FIG. 8 is a block diagram showing an example of a configuration of a storage control section in FIG. 6.

FIG. 8 is a block diagram showing an example of a detailed configuration of the storage control section 152 in FIG. 6.

A device information management section 181 manages device information which is registered by a registration operation by the user and is supplied from the communication control section 151. For example, the device information managed by the device information management section 181 contains a device name, a category (the type of equipment of the device), a manufacturer code, a device ID, a Bluetooth address and the like. The device information management section 181 appropriately provides the managed information to a user setting management section 184, an operation history management section 185 and the like.

A cache memory management section 182 stores the operation panel information acquired from the device by the communication control section 151 in the cache memory 69A and manages it. For example, the cache memory management section 182 clears less frequently used operation panel information or operation panel information, for which a predetermined period of time has elapsed after its storage as the management of the operation panel information. The cache memory management section 182 outputs the operation panel information stored in the cache memory 69A to the display control section 153.

A temporary operation panel management section 183 manages information for displaying a temporary operation panel and outputs it to the display control section 153 as needed. As described below, in the remote controller 1, until the operation panel information is acquired from the device detected by the search, a temporary operation panel in accordance with the type of the device is displayed on the LCD 51. For example, in the case where the television receiver 21 is detected by the search, until operation panel information exclusive for the television receiver 21 is acquired from the television receiver 21, a temporary operation panel for allowing the use of the functions of a general television receiver is displayed on the LCD 51. The information for displaying the displayed temporary operation panel is also output to the cache memory management section 182 so as to be managed by the cache memory 69A.

In the storage section 69 of the remote controller 1, for example, information of the operation panel for allowing the use of the functions of a general television receiver, information of the operation panel for allowing the use of the functions of a general VTR, information of the operation panel for allowing the use of the functions of a general DVD (Digital Versatile Disc) player and the like are prepared as temporary operation panel information.

The user setting management section 184 manages, for example, a user setting for the display of the operation panel, based on the information supplied from the input detection section 154. The operation history management section 185 manages an operation history such as the contents of control of the device by the remote controller 1 and its time, based on the information supplied from the input detection section 154. The setting information managed by the user setting management section 184 and the history information managed by the operation history management section 185 are appropriately output to the device information management section 181.

Figure 9:
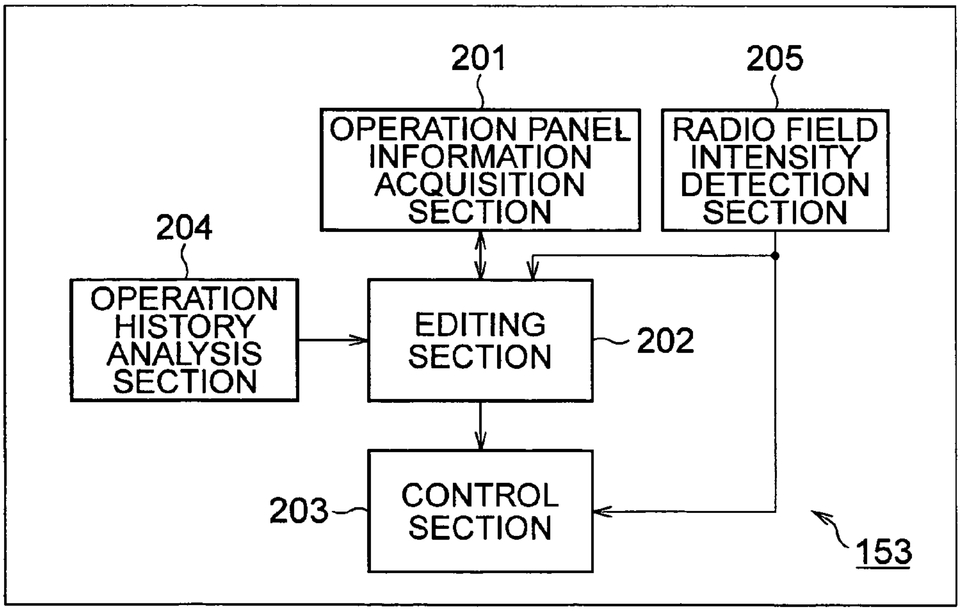
FIG. 9 is a block diagram showing an example of a configuration of a display control section in FIG. 6.

FIG. 9 is a block diagram showing an example of a detailed configuration of the display control section 153 in FIG. 6.

An operation panel information acquisition section 201 acquires the operation panel information managed by the cache memory management section 182 of the storage control section 152 or the operation panel information which is provided from the device and then supplied from the communication control section 151, and outputs it to an editing section 202.

The editing section 202 edits the operation panel information supplied from the operation panel information acquisition section 201 in order to create new operation panel information for allowing the LCD 51 to display the operation panel. For example, when operation panel information of two devices are supplied from the operation panel acquisition section 201, the editing section 202 edits the operation panel information (splitting of frames of an HTML file) such that the respective operation panels are displayed in an upper half and a lower half of the LCD 51. The operation panel information created by the editing section 202 is output to the control section 203.

In the editing performed by the editing section 202, information of the result of analysis of the operation history, which is supplied from an operation history analysis section 204, is referred to as needed.

The control section 203 controls the operation of the LCD 51 so as to allow the LCD 51 to display the operation panels based on the operation panel information supplied from the editing section 202.

The operation history analysis section 204 analyzes the preference of the user based on the operation history managed by the operation history management section 185 of the storage control section 152. For example, in the case where a plurality of operation history information is acquired by the editing section 202, the operation history analysis section 204 analyzes the preference of the user for the respective operation panels so as to output the result of analysis to the editing section 202.

A radio field intensity detection section 205 detects an intensity of a radio wave received by the Bluetooth module 67, based on the output from the communication control section 151. Information indicating the detected intensity of the radio wave is output to the editing section 202 and the control section 203. For example, for an operation panel of a device whose receivable radio wave weak because it is at apart a predetermined distance or more from the remote controller 1, the display thereof is controlled so that its having higher transparency (so as to be displayed in paler tone).

Figure 10:
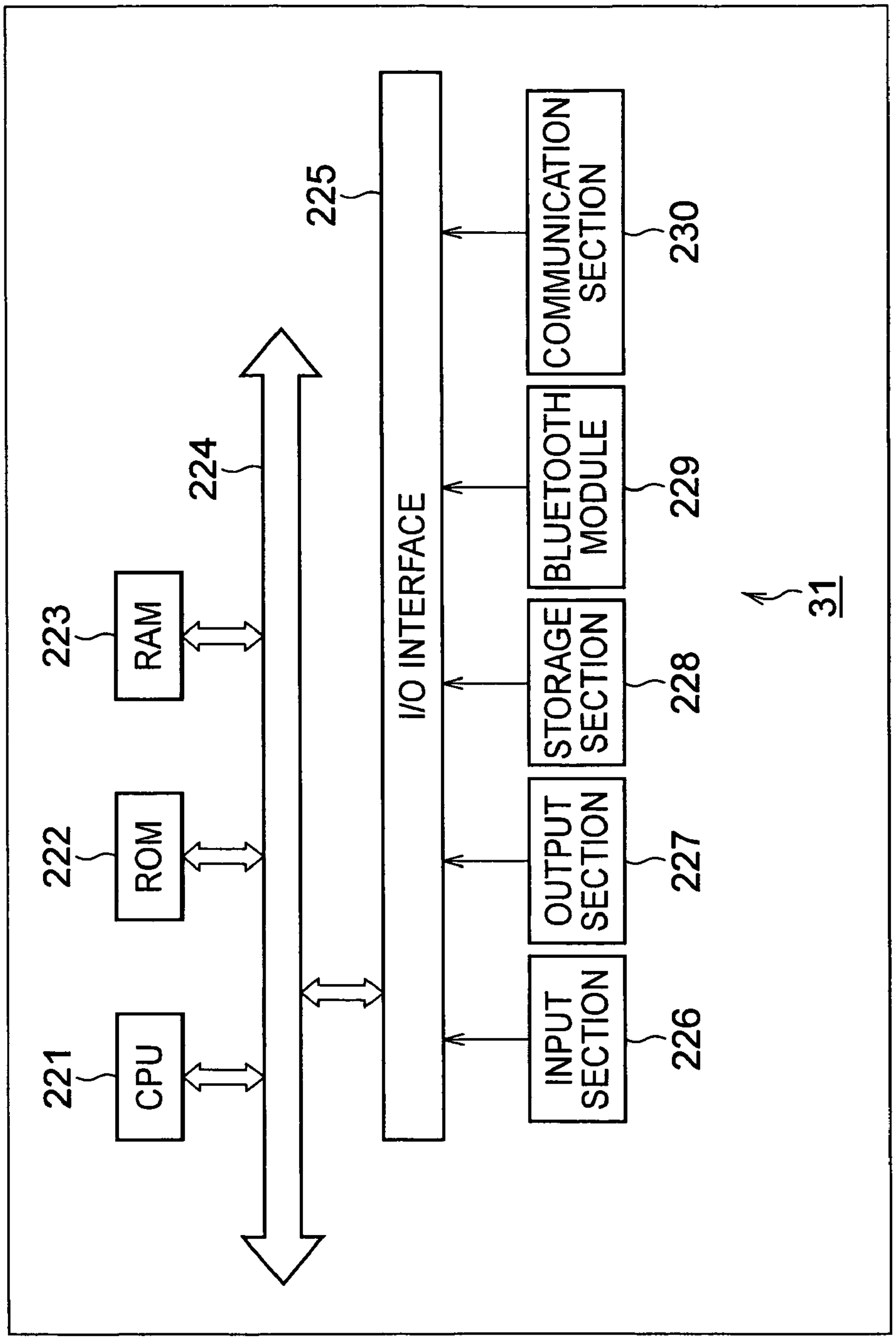
FIG. 10 is a block diagram showing an example of a configuration of a personal computer in FIG. 1.

FIG. 10 is a block diagram showing an example of a configuration of the personal computer 31 corresponding to a device to be controlled by the remote controller 1.

Since the personal computer 31 basically has the similar configuration as that of the remote controller 1 shown in FIG. 3, the description for the overlapping portions is appropriately omitted.

A Bluetooth module 229 is connected to an input/output interface 225. The Bluetooth module 229 communicates with the Bluetooth module 67 of the remote controller 1 by the Bluetooth, for example, so as to transmit the operation panel information stored in the storage section 228 in response to a request from the Bluetooth module 67.

A communication section 230 transmits/receives various information to/from the other devices, for example, through a wired or wireless network. The communication section 230 also transmits/receives information to/from various equipment connected through the Internet.

Figure 11:
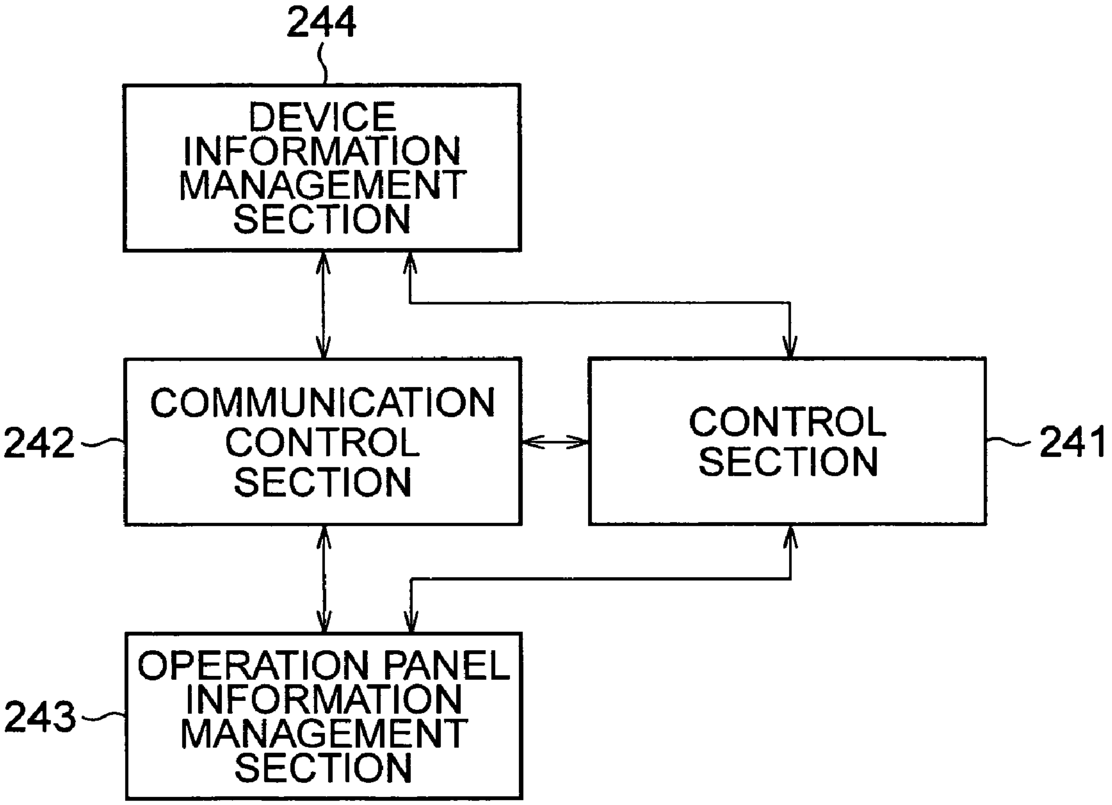
FIG. 11 is a block diagram showing an example of a functional configuration of the personal computer in FIG. 10.

FIG. 11 is a block diagram showing an example of a functional configuration of the personal computer 31 in FIG. 10. Each functional section shown in FIG. 11 is realized by the execution of a predetermined control program by a CPU 221 shown in FIG. 10.

A control section 241 controls the operation of the overall personal computer 1 (a communication control section 242, an operation panel information management section 243 and a device information management section 244). The communication control section 242 controls the Bluetooth communication in the Bluetooth module 229 or the communication in the communication section 230.

The operation panel information management section 243 manages the operation panel information stored in the storage section 228 and reads out the operation panel information in response to a request from the remote controller 1 so as to provide it. The device information management section 244 manages device information including a name, a category (personal computer), a manufacturer code, a device ID, a Bluetooth address and the like of the personal computer 31, and provides it to the remote controller 1.

The television receiver 21, the audio system 22 and the robot 32 in FIG. 1 has the similar configuration as that of the personal computer 31 shown in FIGS. 10 and 11. Therefore, FIGS. 10 and 11 are also cited as the configurations of the television receiver 21, the audio system 22 and the robot 32, as needed. In addition to the configuration shown in FIG. 10, configurations inherent in the respective devices such as a tuner section or a speaker section are added to the television receiver 21 and the audio system 22.

Next, the operation of the control system in FIG. 1 will be described.

First, with reference to a flowchart shown in FIG. 12, a process of the remote controller 1 for registering the device information will be described.

When the registration of the device information is instructed by the user, the search section 161 activates the Bluetooth module 67 at step S1 so as to make a search (Inquiry and Page) for the device.

The search section 161 determines whether the device is present in the communication coverage or not at step S2. If it is determined that the device is not present, it returns to step S1 so as to repeatedly make the search. If the device is present within the coverage of an electromagnetic wave emitted from the Bluetooth module 67, the device makes a response to the search.

At step S2, if the search section 161 determines that the device is present within the communication coverage, the process proceeds to step S3 so as to determine whether there is any device waiting for registration or not among the devices detected by the search. For example, in order to allow the operation of the device by using the remote controller 1, the user, who registers the device information of the device to the remote controller 1, is required to set the device to be in a registration wait state by a predetermined operation.

If the search section 161 determines that there is no device waiting for registration among the detected devices at step S3, it returns to step S1 so as to repeat the above process. If any device waiting for registration is not detected even after the search is repeated for a predetermined number of times, the process is terminated.

At step S3, if the search section 161 determines that there is a device waiting for registration, information of the detected device is output to the display control section 153 (the control section 203 (FIG. 9)).

At step S4, the display control section 153 displays a list of the devices waiting for registration (the devices capable of registering the device information) on the LCD 51 based on the output from the search section 161.

Figure 13:
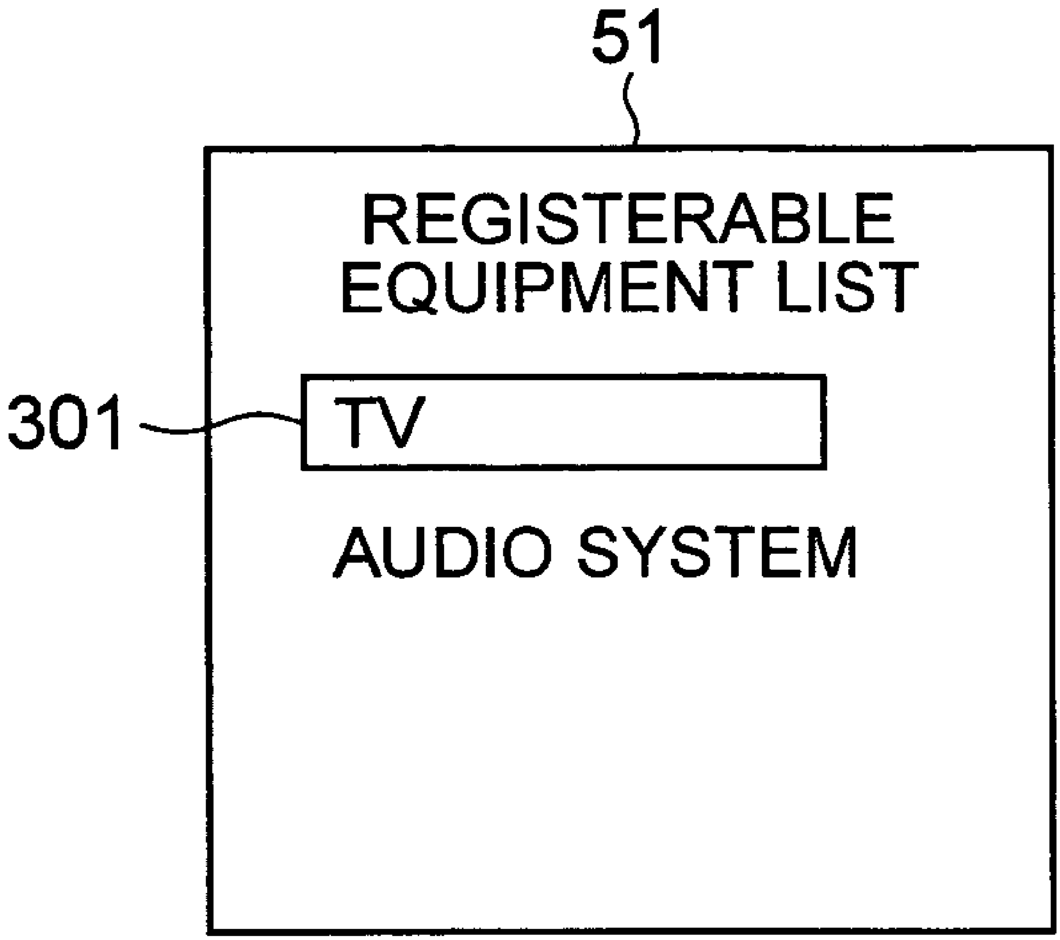
FIG. 13 is a diagram showing an example of a screen displayed at step S4 in FIG. 12.

FIG. 13 is a diagram showing an example of a screen displayed on the LCD 51 at step S4.

In the example shown in FIG. 13, a message "Registerable Equipment List" is displayed on the upper part of the screen. As devices which are set to be in a registration wait state, "TV (the television receiver 21)" and "Audio System (the audio system 22)" are displayed below it. In the other words, it is assumed that the screen shown in FIG. 13 corresponds to the example where the user sets the television receiver 21 and the audio system 22 placed in the room 1 in FIG. 1 in a registration wait state so as to perform a registration operation.

Text information of the "TV" and the "Audio System" in FIG. 13 are displayed based on the category information of the devices, which are acquired from the television receiver 21 and the audio system 22 by the search.

If the screen shown in FIG. 13 is displayed, the user moves a cursor 301 by pressing a surface of the LCD 51 or the like so as to select a device to be registered. The input provided from the user is detected by the input detecting section 154 so that the communication control section 151 (the device control section 162) is informed of it.

At step S5, the device control section 162 requests the device whose device, which a user instructs to register its information, to transmit the device information. In response to the request from the remote controller 1, the prestored device information is readout in the device so that the readout device information is provided for the remote controller 1 through the Bluetooth communication.

At step S6, the device control section 162 controls the Bluetooth module 67 so as to acquire the device information transmitted from the device. The acquired device information is output from the device control section 162 to the storage control section 152 (the device information management section 181).

The device information management section 181 stores the supplied device information in the storage section 69 so as to register it at step S7.

FIG. 14 is a diagram showing an example of device information managed by the device information management section 181.

As illustrated, as the device information, for example, a device name, a category of device, a manufacturer code, a device ID and a Bluetooth address are registered.

It is assumed that FIG. 14 corresponds to an example where the television receiver 21 is selected on the selection screen in FIG. 13, a name of the device 1 (the television receiver 21) "Television", a category "TV", a manufacturer code "00x1", a device ID "1234" and a Bluetooth address "08:00:46:21:94:A3" are registered.

The above process is repeatedly executed so as to successively add the information of the respective devices to the table shown in FIG. 14. For example, since a command is created by the device control section 162 in accordance with the registered information such as the manufacturer code, the device whose device information is registered can be operated by the remote controller 1 from then on.

Figure 15:
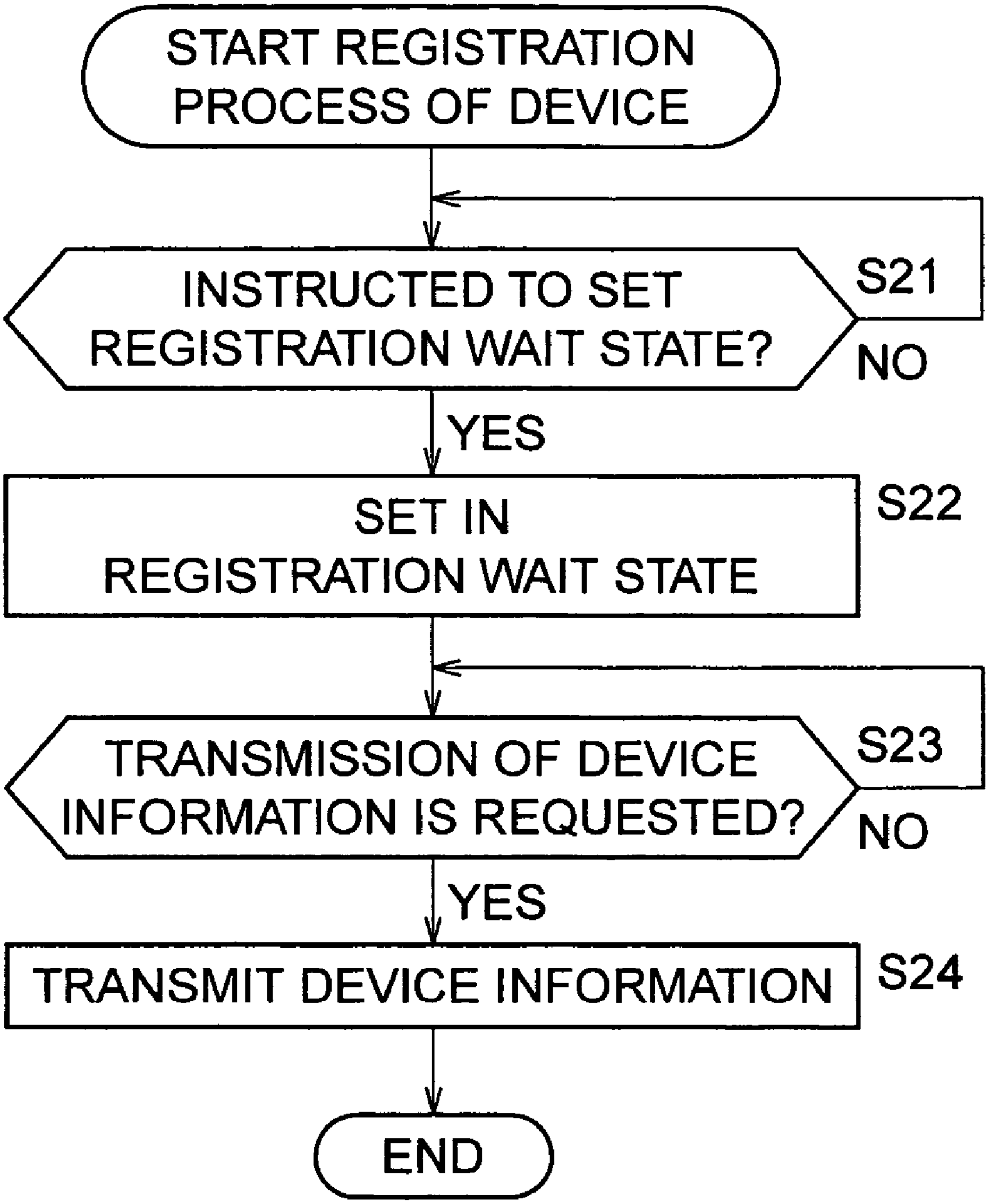
FIG. 15 is a flowchart illustrating a process executed by a device in response to the process in FIG. 12.

Next, with reference to a flowchart shown in FIG. 15, a process executed by the device in response to the process shown in FIG. 12 will be described. Hereinafter, the case where the process is executed by the television receiver 21 will be described.

At step S21, the control section 241 of the television receiver 21 determines whether setting of the registration wait state is instructed or not, based on the input provided from the user to the input section 226 (FIG. 10), and waits until it determines that the instruction is made.

If the control section 241 determines that the setting of the registration wait state is instructed because, for example, a predetermined button is operated at step S21, it proceeds to step S22 to set the television receiver 21 in the registration wait state.

As a result, the Bluetooth module 229 repeatedly executes Inquiry scan and Page scan. When a radio wave from the remote controller 1 is received, the remote controller 1 is informed of the setting of the registration wait state.

At step S23, the communication control section 242 determines whether the transmission of the device information is requested from the remote controller 1 or not, and waits until it determines that the transmission is requested.

If the communication control section 242 determines that the transmission of the device information is requested from the remote controller 1 at step S23, it proceeds to step S24 where the device information managed by the device information management section 244 is transmitted. More specifically, the device information stored in the storage section 228 is read out by the device information management section 244 so as to be transmitted from the communication control section 242 to the remote control 1.

Figure 12:
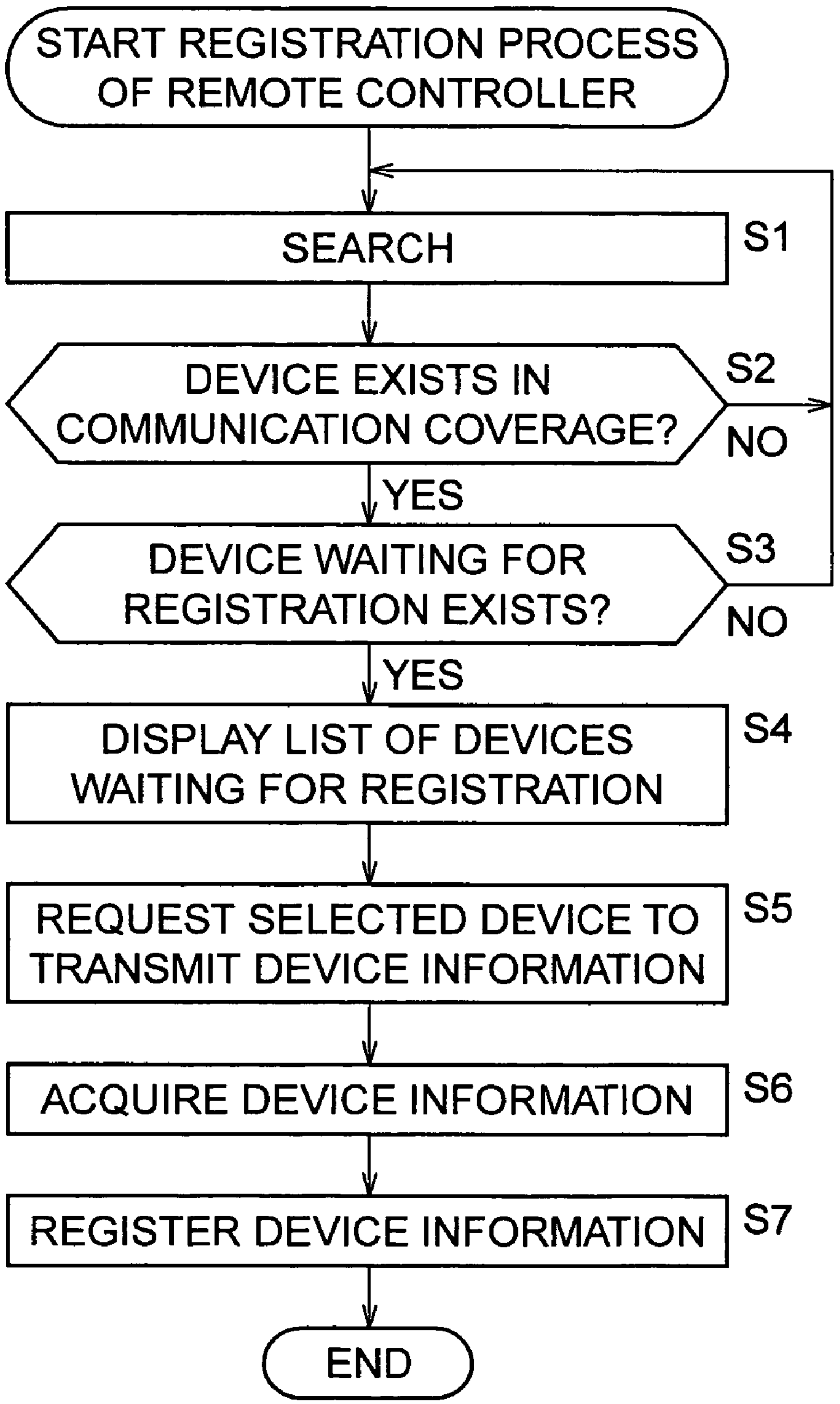
FIG. 12 is a flowchart illustrating a registration process of the remote controller.

As described above, in the remote controller 1 that receives the device information transmitted from the device, the registration thereof is performed (step S7 in FIG. 12).

Next, with reference to a flowchart shown in FIG. 16, a process of the remote controller 1 for displaying the operation panel will be described. This process is executed, for example, when the device to be controlled is detected by the search process performed in a predetermined cycle.

Upon notification of the detection of the device from the search section 161, the device information management section 181 of the storage control section 152 refers to the information managed in the storage section 69 so as to determine whether the device information of the detected device has been registered or not, at step S31.

At step S31, if the device information management section 181 determines that the device information of the detected device has not been registered, it proceeds to step S32 so as to perform the registration process described with reference to FIG. 12. More specifically, when a device waiting for registration is detected, the detected device is requested to transmit the device information so that the device information transmitted from the device in response to the request is registered.

After the registration of the device information, a process in step S33 is skipped so as to execute the following process.

On the other hand, if the device information management section 181 determines that the device information such as the device ID or the Bluetooth address of the detected device has already been registered in the storage section 69 at step S31, it proceeds to step S33. For example, if the information as shown in FIG. 14 has already been registered so that the television receiver 21 is detected by the search, it is determined that the device information has been registered.

At step S33, the cache memory management section 182 determines whether the operation panel information of the detected device remains or not in the cache memory 69A. If it is determined that it does not remain, it proceeds to step S34.

If the operation panel information is not remained in the cache memory 69A, the cache memory management section 182 outputs information indicating it to the temporary operation panel management section 183. The temporary operation panel management section 183 outputs the information for displaying a temporary operation panel (hereinafter, referred to as temporary operation panel information) to the display control section 153 in accordance with the category of the detected device.

The temporary operation panel information output from the temporary operation panel management section 183 is acquired by the operation panel information acquisition section 201 of the display control section 153 so as to be output to the control section 203 through the editing section 202.

The control section 203 allows the LCD 51 to display a temporary operation panel based on the supplied information at step S34.

Figure 17:
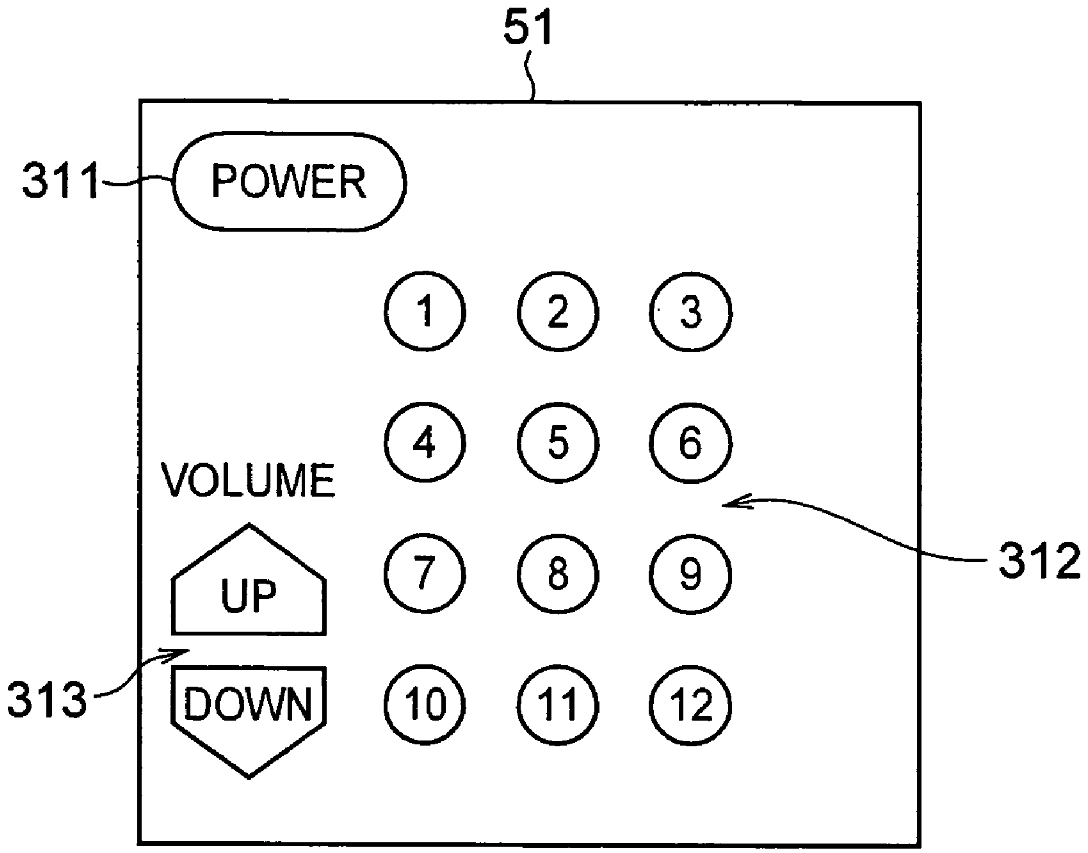
FIG. 17 is a diagram showing an example of a screen displayed at step S34 in FIG. 16.

FIG. 17 is a diagram showing an example of the temporary operation panel displayed on the LCD 51 at step S34.

For example, if the television receiver 21 is detected although the operation panel information of the television receiver 21 is not remained in the cache memory 69A, an operation panel for allowing the operation of the functions provided for a general television receiver regardless of a manufacturer or the like by the remote controller 1 as shown in FIG. 17 is displayed on the LCD 51.

In the example shown in FIG. 17, a power source button 311 which is operated to switch a power source ON/OFF is displayed on the upper left of the temporary operation panel of the television receiver 21. On its lower right, a numeric keypad 312 operated to change the channel is displayed. On the lower left of the temporary operation panel, a volume button which is operated to adjust the volume is displayed. The power source button 311, the numeric keypad 312 and the volume button 313 are commonly prepared for remote controllers of general television receivers regardless of manufacturer and function.

Such a temporary operation panel is displayed until the operation panel information for displaying an operation panel exclusive for the television receiver 21 is transmitted from the detected television receiver 21. Therefore, until the operation panel information is transmitted from the television receiver 21 so that the operation panel (the operation panel exclusive for the television receiver 21) is displayed based on it, the user can operate the television receiver 21 by using the temporary operation panel. More specifically, even immediately after the detection of the television receiver 21, the user can operate the television receiver 21.

Figure 16:
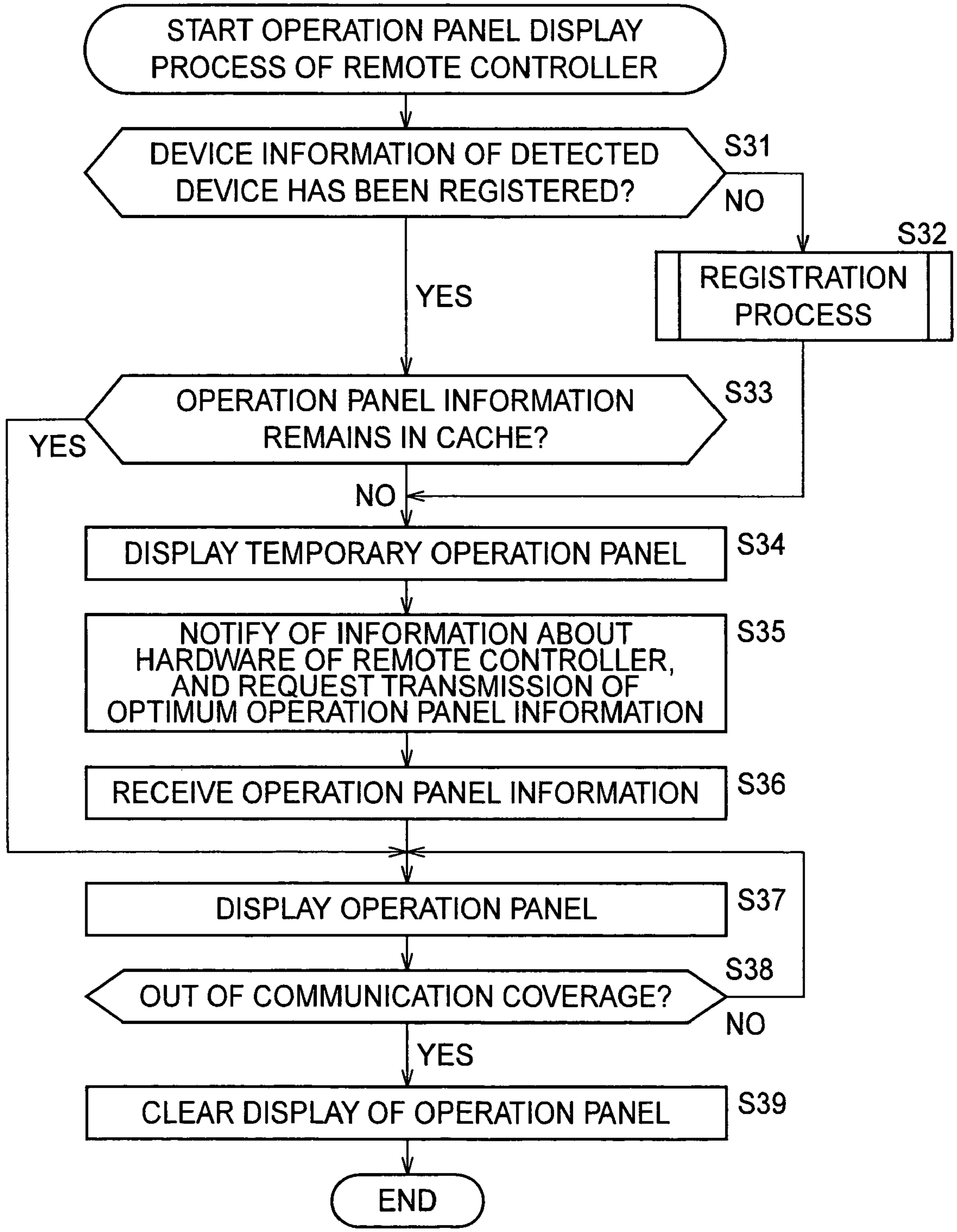
FIG. 16 is a flowchart illustrating a process of a remote controller that displays an operation panel.

Returning to the description of FIG. 16, at step S35, the device control section 162 transmits feature information indicating features of the remote controller 1 to the device so as to request the transmission of operation panel information optimum for the remote controller 1. For example, if the television receiver 21 is detected, information regarding a hardware such as a resolution (screen size) of the LCD 51 is transmitted to the television receiver 21 as feature information of the remote controller 1 so as to request the transmission of operation panel information in accordance with the resolution of the LCD 51.

In the television receiver 21, for example, device information in conformity with the resolution of the remote controller requesting the device information is selected from a plurality of prepared device information, or a conversion process in accordance with the resolution of the remote controller is performed.

Since the operation panel information in conformity with a hardware configuration of the remote controller 1 is transmitted from the device through the Bluetooth communication in response to the request from the remote controller 1, the device control section 162 receives the transmitted operation panel information at step S36. The operation panel information received by the device control section 162 is acquired by the operation panel information acquisition section 201 of the display control section 153.

After the operation panel information acquired by the operation panel information acquisition section 201 is subjected to a predetermined editing by the editing section 202, it is supplied to the control section 203. For example, if operation panel information is acquired from a plurality of devices, a predetermined editing of the HTML files (operation panel information) for displaying a plurality of operation panels on the LCD 51 is performed in the editing section 202.

At step S37, the control section 203 displays the operation panel on the LCD 51.

Figure 18:
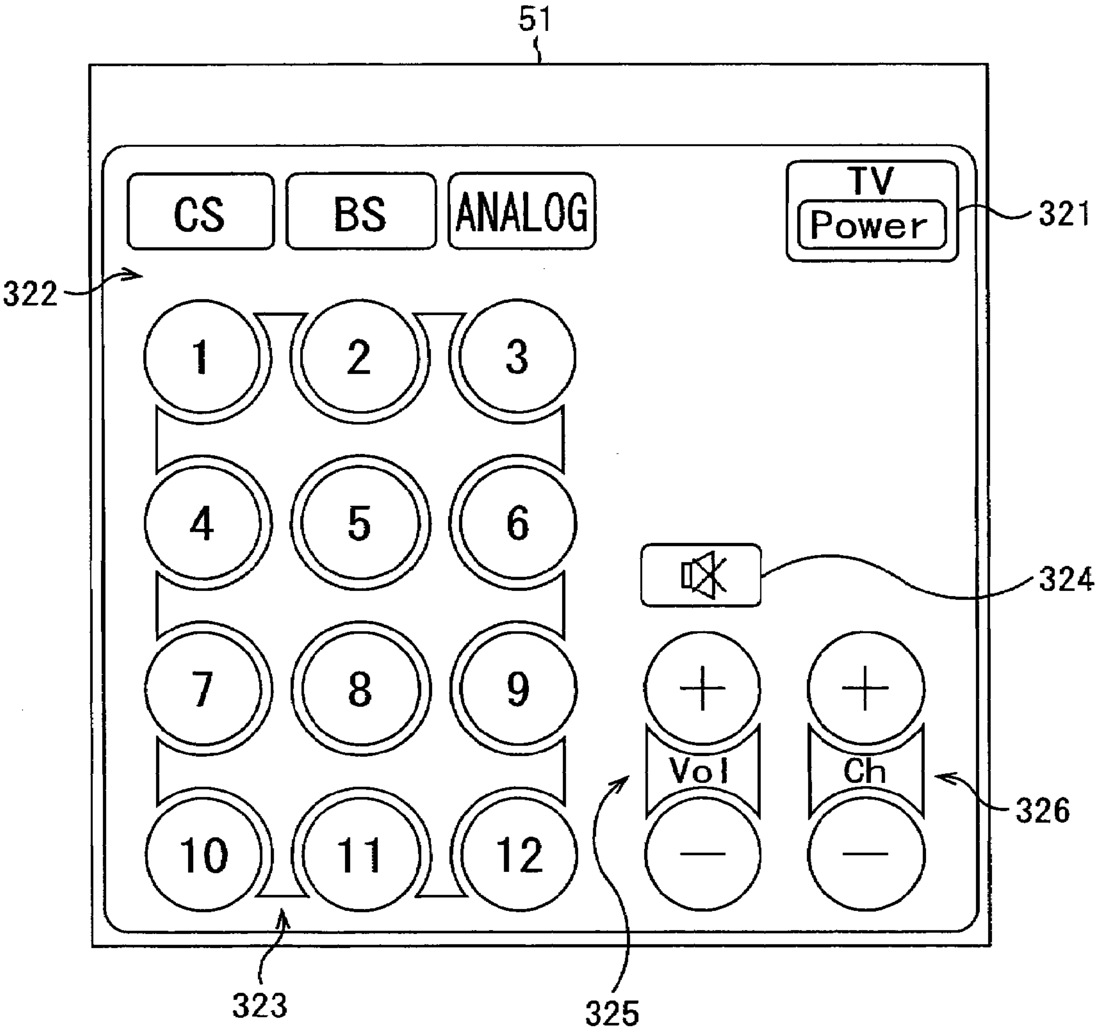
FIG. 18 is a diagram showing an example of a screen displayed at step S37 in FIG. 16.

FIG. 18 is a diagram showing an example of an operation panel which is displayed based on the operation panel information transmitted from the television receiver 21 at step S37.

In the example shown in FIG. 18, a power button 321 is displayed on the upper right of the operation panel. On the left, switching buttons 322, which are operated to switch a source between BS (Broadcasting Satellite) digital broadcasting, Cs (Communications Satellite) digital broadcasting, and analog broadcasting, are displayed. Below the switching buttons 322, a numeric keypad 323 is displayed. On the right, a mute button 324 which is operated to turn a sound output OFF, a volume button 325 which is operated to adjust the volume, and a channel switching button 326 which is operated to change the channel are displayed.

As is apparent from the comparison with the temporary operation panel shown in FIG. 17, the operation panel shown in FIG. 18, which is displayed based on the information transmitted from the television receiver 21, is customized in accordance with the functions of the television receiver 21. More specifically, for example, if the television receiver 21 is provided with the functions of displaying programs of BS digital broadcasting, CS digital broadcasting and analog broadcasting, the operation panel equipped with buttons, as shown on the operation panel in FIG. 18, for switching between them is displayed based on the operation panel information transmitted from the television receiver 21. The user of the remote controller 1 can operate the television receiver 21 by using the operation panel.

The operation panel information (HTML file) for displaying the operation panel shown in FIG. 18 is stored in the cache memory 69A.

Returning to the description of FIG. 16, it is determined by the radio field intensity detection section 205 of the display control section 153 whether the remote controller 1 goes out of the communication coverage with the devices or not. Until it is determined that it is out of the communication coverage, the process returns to step S37 to continue the display of the operation panel. The communication control section 151 for controlling the communication between the Bluetooth module 67 and the devices notify the radio field intensities detection section 205 of the reception condition of the radio wave used for the communication.

For example, if it is determined at step S38 that the user who operates the television receiver 21 until then goes out of the communication coverage because the user moves with the remote controller 1, the process proceeds to step S39 where the control section 203 clears the display of the operation panel that is displayed until then.

By the above process, the user simply brings the remote controller 1 close to the device that the user wants to operate so as to allow the operation panel of the device to be automatically displayed. At the similar time, the user can also clear the display without performing an operation for clearing the display on the operation panel by himself/herself.

Moreover, since the operation panel displayed on the remote controller 1 is displayed based on the information transmitted from the device, an optimum operation panel in accordance with the functions of the device can be displayed.

Figure 19:
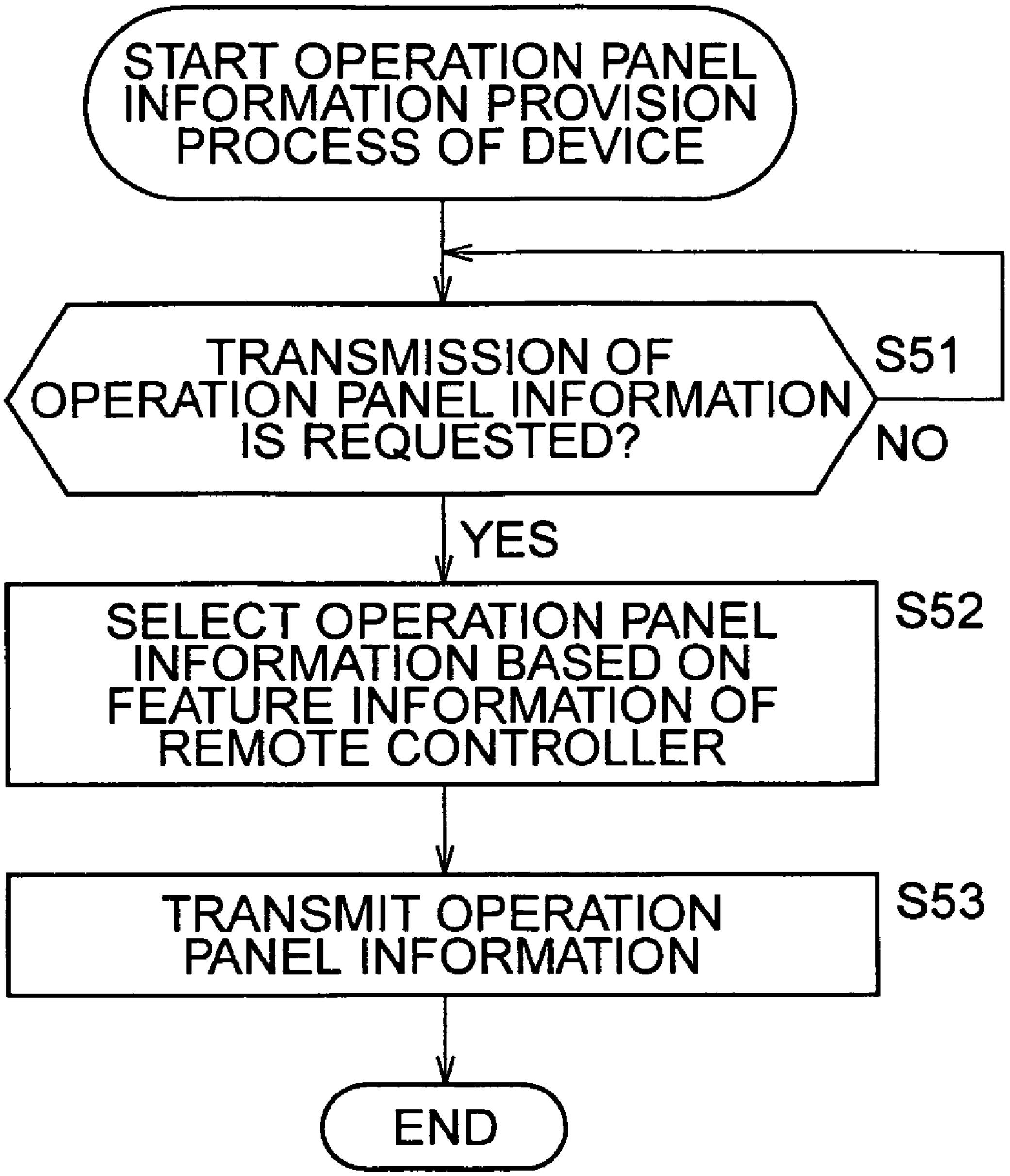
FIG. 19 is a flowchart illustrating a process executed by a device in response to the process in FIG. 16.

Next, with reference to a flowchart of FIG. 19, a process that is executed by the television receiver 21 as the device in response to the process in FIG. 16 will be described.

At step S51, the operation panel information management section 243 of the television receiver 21 determines whether the transmission of the operation panel information is requested from the remote controller 1 or not based on the information received by the Bluetooth module 229 and supplied through the communication control section 242, and waits until it is determined the request is made.

If it is determined that the transmission of the operation panel information is requested at step S51, the operation panel information management section 243 proceeds to step S52 to select the operation panel information to be provided based on the feature information (the resolution of the LCD 51, the information indicating whether color display is possible or not, and the like) of the remote controller 1, which is contained in the request from the remote controller 1.

For example, if a plurality of operation panel information in accordance with the respective resolutions is prepared in the television receiver 21, the one in conformity with the resolution of the remote controller 1 is selected from them. Moreover, after the display size of the operation panel information is changed by the operation panel information management section 243, the one in conformity with the resolution of the remote controller 1 is selected as the operation panel information to be provided. The operation panel information selected by the operation panel information management section 243 is output to the communication control section 242.

At step S53, the communication control section 242 transmits the operation panel information selected by the operation panel information management section 243 to the remote controller 1. On the remote controller 1, the operation panel is displayed based on the operation panel information transmitted at this step (step S37 in FIG. 16).

As described above, since the operation panel information is selected in accordance with the resolution of the remote controller 1 or the features such as the possibility of color display, it is possible to display an optimum operation panel on the remote controller 1.

Figure 20:
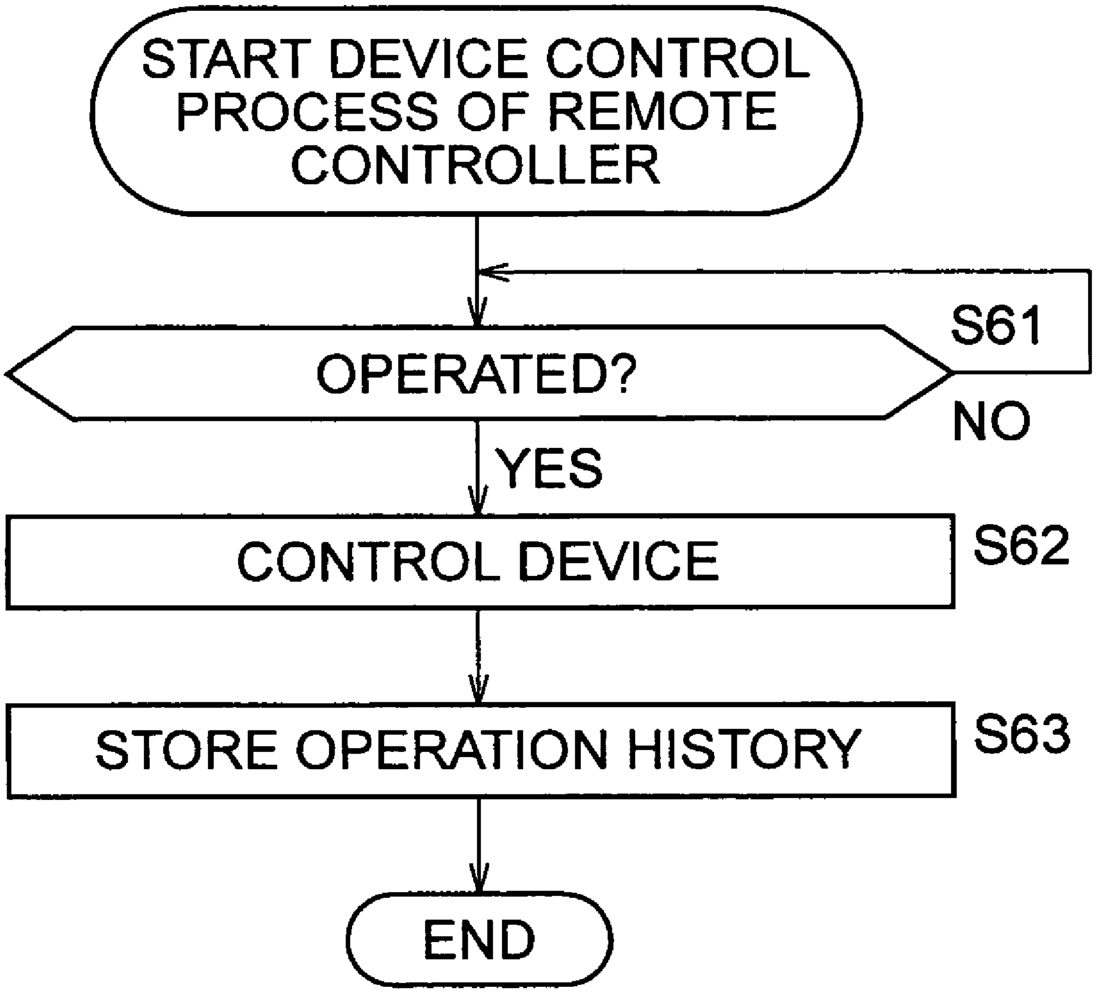
FIG. 20 is a flowchart illustrating a process of the remote controller that controls a device.

With reference to a flowchart of FIG. 20, a process of the remote controller 1 for controlling the device based on an input provided from the user to the operation panel will be described.

At step S61, the device control section 162 determines whether a predetermined button on the operation panel displayed on the LCD 51 is operated by the user or not based on an output from the input detection section 154, and waits until it is determined that the button is operated. For example, on the LCD 51, the operation panel shown in FIG. 18 is displayed.

If it is determined that the predetermined button of the operation panel information is operated at step S61, the display control section 162 proceeds to step S62 to control the device in accordance with the input provided from the user. More specifically, a command is created based on information such as a manufacturer code, which is contained in the preregistered device information, and is transmitted from the Bluetooth module 67 to the device.

In the device receiving the command, an operation in accordance with the command is performed. The command from the remote controller 1 may also be transmitted by an infrared ray, which is emitted from an emission section formed at a predetermined position of the remote controller 1, to the device.

The operation history management section 185 of the storage control section 152 stores the contents of the most recently performed operation as an operation history of the user at step S63.

FIG. 21 is a diagram showing an example of an operation history managed by the operation history management section 185.

As illustrated, for example, information such as year/month/day and time of the operation and a button ID is managed for each device as an operation history. For example, as the numeric keypad 323 (FIG. 18) shown in FIG. 22, an ID is assigned to each button of the operation panel displayed on the LCD 51. The contents of the operation are represented by the button ID.

Figure 22:
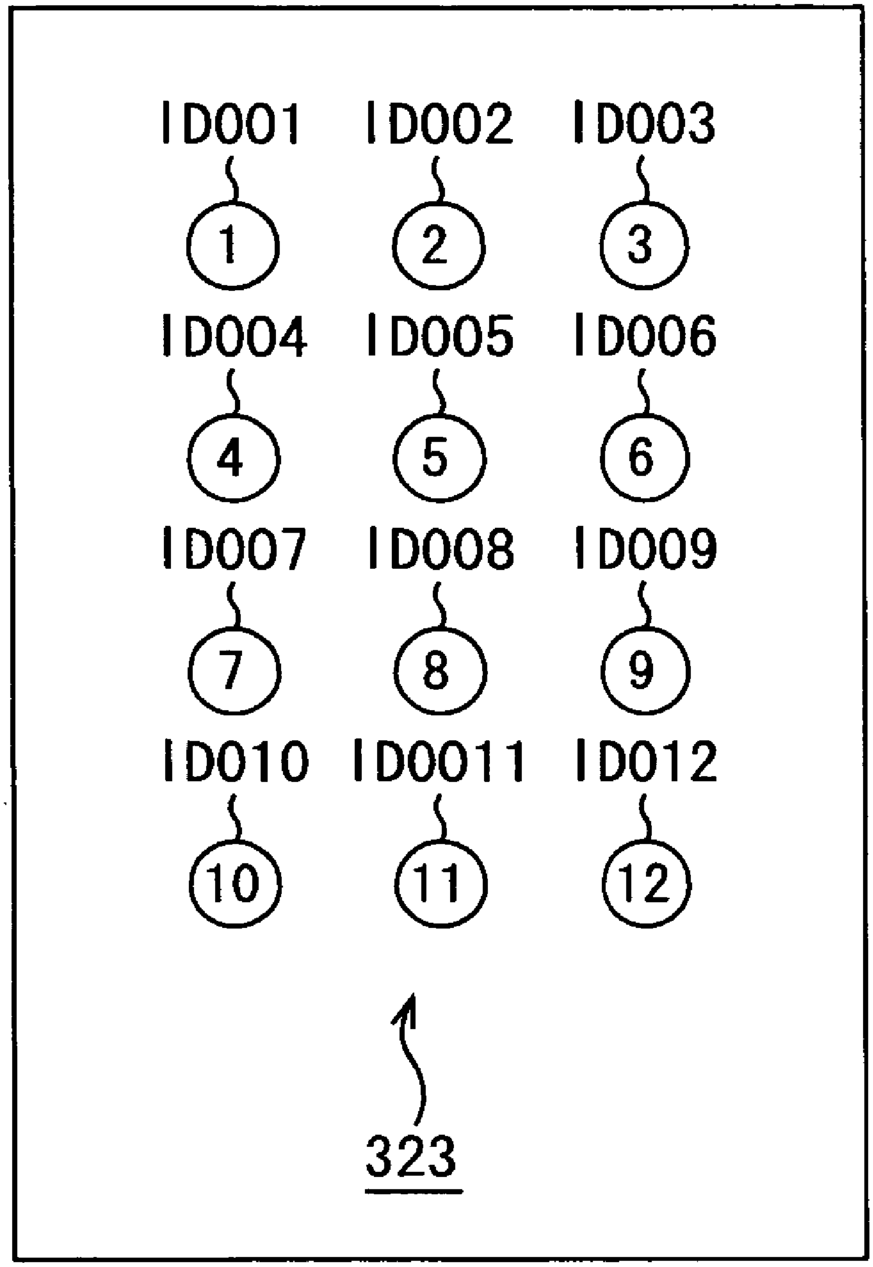
FIG. 22 is a diagram showing an example of button IDs.

In the example shown in FIG. 22, IDs “001” to “012” are assigned to the respective buttons “1” to “12” of the numeric keypad 323 (a numeric keypad operated to change the channel of the television receiver 21 or the like). In this manner, the IDs assigned to the respective buttons are managed as information representing the contents of the operations.

Returning to the description of FIG. 21, on the first line in the operation history, for a “Device A”, an operation corresponding to the contents represented by a button ID “A001”, which is performed on “Nov. 25, 2002” by the user, is registered. On the second line, for a “Device B”, an operation corresponding to the contents represented by a button ID “B015”, which is performed on “Nov. 25, 2002” by the user, is registered. In the similar manner, year/month/day and time of the operation and the contents of the operation are registered for each device to be followed.

As described below, the preference of the user is analyzed based on the thus registered operation history. The result of analysis is reflected in the display of the operation panels.

Next, with reference to a flowchart of FIG. 23, a process of the remote controller 1 for managing the operation panel information stored in the cache memory 69A will be described. The process is executed at predetermined timing, for example, at the transmission of new operation panel information from the device or the like.

At step S71, the cache memory management section 182 of the storage control section 152 refers to the operation panel information stored in the cache memory 69A. As described above, when the operation panel information is acquired from the device, the operation panel is displayed while its operation panel information is stored in the cache memory 69A so as to be used again when the device providing the operation panel information is detected.

At step S72, the cache memory management section 182 clears the least frequently used operation panel information. For example, if the frequency of use of the operation panel of each device is shown as in FIG. 24 based on the operation history managed by the operation history management section 185, the operation panel information of the device c, which is the least frequently used among the operation panel information stored in the cache memory 69A, is cleared.

Figures 23, 24:
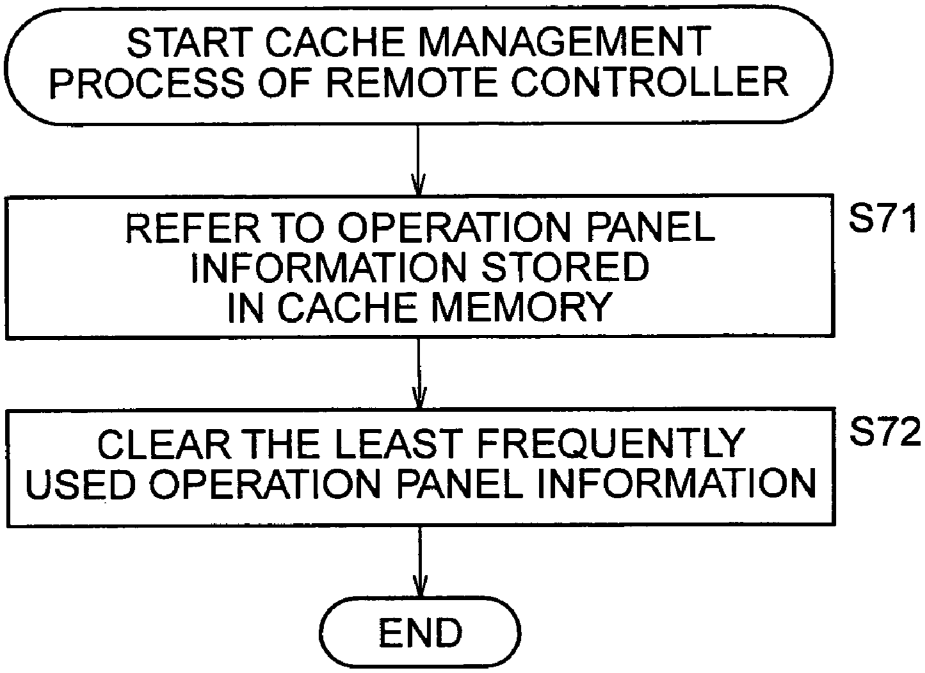
FIG. 23 is a flowchart illustrating a process of a remote controller that manages operation panel information.
FIG. 24 is a diagram showing an example of the frequency of use of an operation panel.

In the example shown in FIG. 24, the number of uses of the operation panel of the device A is “10”, the number of uses of the operation panel of the device B is “5”, and the number of uses of the operation panel of the device C is "1". Moreover, in the example shown in FIG. 24, the number of operation panel information which can be stored in the cache memory 69A at a time is 3 (the operation panel information of the devices A to C). However, the number to be stored can be changed in accordance with a capacity of the cache memory 69A.

In this example, since the operation panel information of the device C is cleared, the device C is requested to provide the operation panel information by the remote controller 1 if the device C is detected again by a later search.

As described above, the operation history is referred to so as to successively clear the less frequently used operation panel information. As a result, the frequently used operation panel information is kept stored. Therefore, if the device providing the frequently used operation panel information is detected again, the operation panel can be displayed based on the information stored in the cache memory 69A without waiting for the provision of the operation panel information from the device.

The operation panel information provided by the device may also be constantly stored in the storage section 69 instead of being temporality stored as a cache. As a result, the operation panel can also be displayed without waiting for the provision of the operation panel information from the detected device.

If the device is detected by the search, the storage of the operation history, the management of the operation panel information stored in the cache memory 69A and the like are executed by the remote controller 1. These processes are executed in a similar manner even if a plurality of devices is detected.

Figure 25:
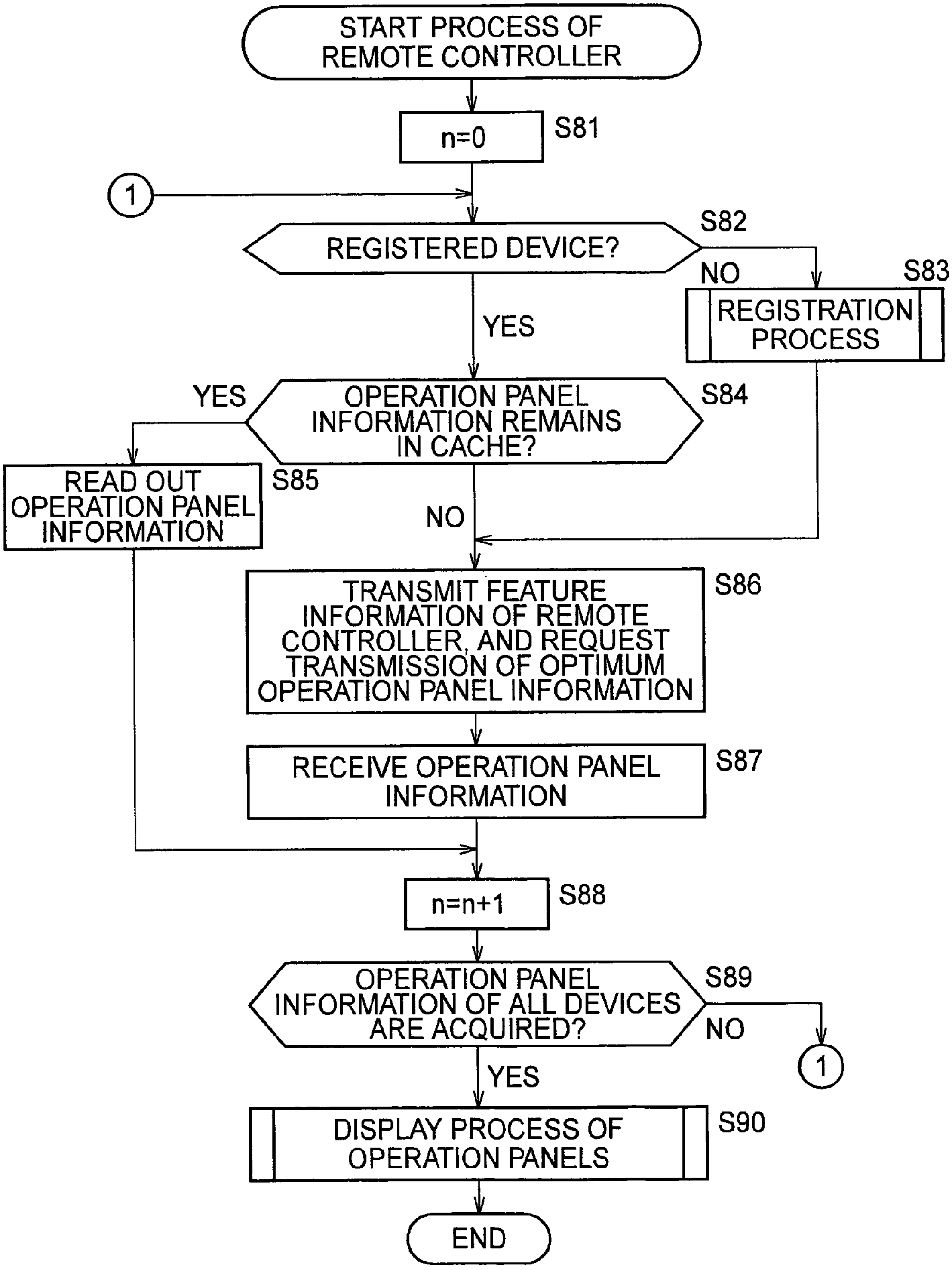
FIG. 25 is a flowchart illustrating another process of a remote controller that displays an operation panel.

Next, with reference to a flowchart of FIG. 25, a process of the remote controller 1 in the case where a plurality of devices is detected by the search will be described.

When it is notified from the search section 161 that the device is detected, the operation panel information acquisition section 201 of the display control section 153 sets "0" as a variable n indicating a target device at step S81. The variable n is incremented by one by one, ever time the operation panel information of the detected device is acquired (step S88).

The device information management section 181 of the storage control section 152 refers to the information registered in the storage section 69 at step S82 so as to determine whether the device of the current target device (the device corresponding to the variable n) has already been registered or not.

At step S82, if it is determined that the device information of the target device has not been registered, the device information management section 181 proceeds to step S83 so as to perform a registration process of the device information. After the registration of the device information, the process in step S84 is skipped so as to execute the process that follows.

On the other hand, if it is determined that the device information of the current target device has already been registered in the storage section 69, the device information proceeds to step S84. At step S84, the cache memory management section 182 determines whether the operation panel information of the target device remains in the cache memory 69A or not.

If it is determined that the operation panel information of the target device remains in the cache memory 69A at step S84, the cache memory management section 182 proceeds to step S85 to read out the operation panel information from the cache memory 69A so as to output it to the operation panel information acquisition section 201.

On the other hand, if it is determined that the operation panel information of the target device does not remain in the cache memory 69A at step S84, the process proceeds to step S86.

At steps S86 and S87, the target device is notified of the feature information of the remote controller 1 as at steps S35 and S36 in FIG. 16. The operation panel information, which is transmitted in response to the notification, is received.

When the operation panel information of the target device is acquired at steps S85 and S87, the operation panel information acquisition section 201 increments the value of the variable n by one at step S88 so as to proceed to step S89 where it determines whether the operation panel information are acquired from all the devices detected by the search or not.

If it is determined that the operation panel information have not been acquired yet from all the detected devices, the process returns to step S82 so as to repeat the above process for a next target device from then on.

If it is determined that the operation panel information are acquired from all the devices detected by the search at step S89, the operation panel information acquisition section 201 proceeds to step S90 so as to execute a display process of the operation panel. At step S90, for example, the editing of the operation panel information acquired from all the detected devices, the display of the operation panel based on the information obtained by the editing, and the like are performed.

Figure 26:
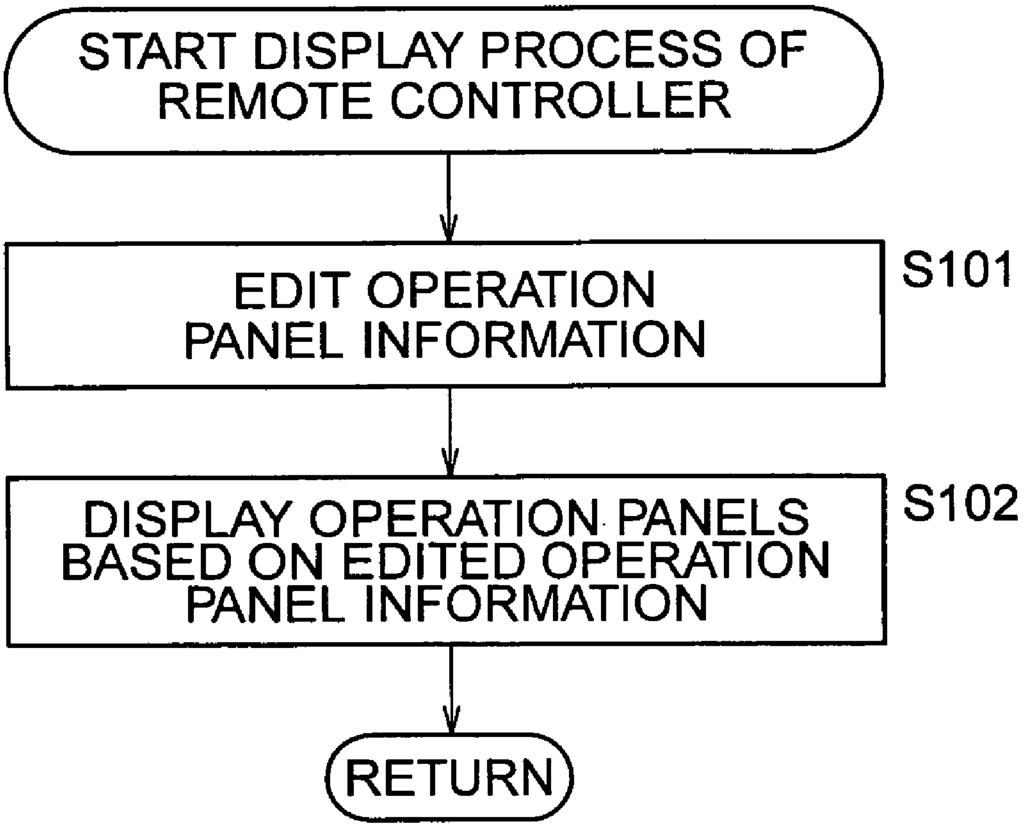
FIG. 26 is a flowchart illustrating a display process of an operation panel of a remote controller, which is executed at step S90 in FIG. 25.

Next, with reference to a flowchart of FIG. 26, a display process of the operation panels, which is executed at step S90 in FIG. 25, will be described.

If a plurality of devices is detected, the editing section 202 of the display control section 153 edits the acquired operation panel information at step S101 so as to display a plurality of operation panels on the LCD 51. Since it is assumed that a single device is detected by the search in FIG. 16, a single operation panel can be displayed on the entire LCD 51 based on the operation panel information acquired from the detected device. However, if a plurality of devices is detected, it is necessary to carry out editing based on the operation panel information acquired from the respective devices so as to display the operation panels of the devices on the LCD 51.

As editing of the operation panel information, for example, the operation panel information corresponding to the HTML files is reconstituted so that the LCD 51 is divided into a plurality of frames in such a manner that the operation panels of the respective devices is displayed in the respective corresponding frames.

Figure 27:
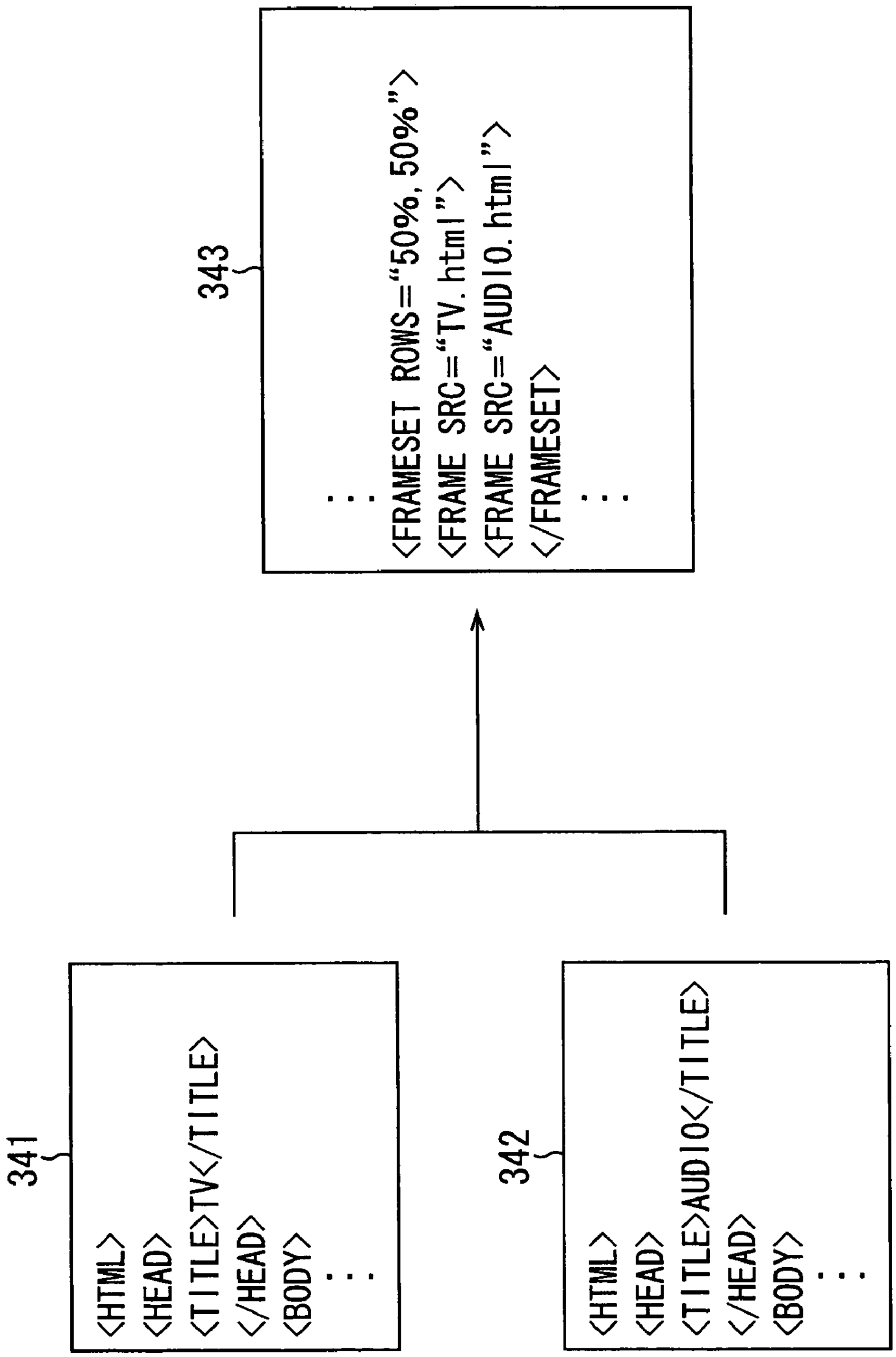
FIG. 27 is a diagram showing an example of reconfiguration of HTML files.

FIG. 27 is a diagram showing an example of reconfiguration of the HTML files.

An HTML file 341 corresponds to the operation panel information acquired from the television receiver 21 in FIG. 1. Between <TITLE> tags, "TV" is described. In FIG. 27, a configuration of a document of the HTML file 341 is represented by each of the tags <HTML> through </HTML>, <HEAD> through </HEAD>, <TITLE> through </TITLE>, <BODY> and the like.

An HTML file 342 corresponds to the operation panel information acquired from the audio system 22 in FIG. 1. Between <TITLE> tags, "AUDIO" is described. The HTML file 342 has the similar configuration as that of the HTML file 341.

Based on these HTML file 341 and HTML file 342, the HTML files are reconstituted by the editing section 202 so as to create, for example, an HTML file 343.

On the first line in the HTML file 343, <FRAMSET ROWS ="50%, 50%"> is described. The <FRAMESET> tag defines the creation of upper and lower frames by horizontally dividing the LCD 51 (browser screen) into two, each having 50% in size where the total vertical size of the browser screen is 100%.

Below the <FRAMESET> tag, <FRAM SRC="TV.html"> and <FRAM SRC="AUDIO.html"> are described. As a result, it is defined that the contents of the HTML file 341 specified by "TV.html", which is acquired from the television receiver 21, is described in the upper frame defined by the <FRAMESET> tag, whereas the contents of the HTML file 342 specified by "AUDIO.html", which is acquired from the audio system 22, is described in the lower frame.

For example, the HTML files are edited so that the operation panel of the previously detected device by the search is displayed in the upper frame. FIG. 27 shows an example where the television receiver 21 is detected prior to the audio system 22.

Figure 28:
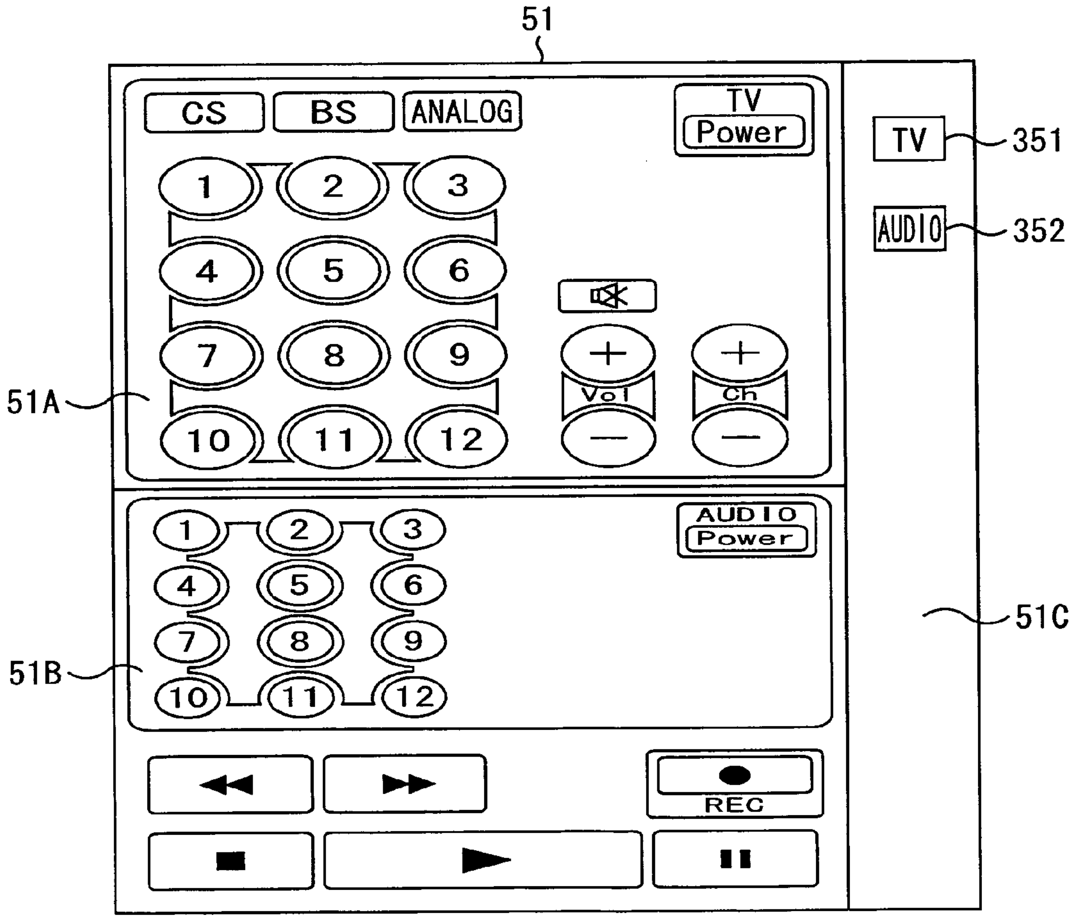
FIG. 28 is a diagram showing an example of display of an operation panel.

Based on the HTML file 343 for which frame split is specified in this manner, operation panels, for example, shown in FIG. 28 are displayed on the LCD 51 at step S102.

As shown in FIG. 28, the operation panel of the television receiver 21 is displayed in a region (frame) 51A formed in the upper half of the LCD 51, whereas the operation panel of the audio system 22 is displayed in a region 51B formed in the lower half based on the HTML file 343 in FIG. 27.

As described above, if a plurality of devices is present in the vicinity of the remote controller 1 and detected by the search, for example, the operation panels of all the detected devices are displayed on the LCD 51. More specifically, even in the case where three or four devices are detected, the HTML files are edited in the similar manner so that the operation panels thereof are displayed in the formed frames.

On the right end of the LCD 51 in FIG. 28, a region 51C is formed. In the region 51C, an icon representing an operation panel which can be displayed on the LCD 51 is displayed. Image information of the icons is also provided by the device, for example, together with the operation panel information. In the example in FIG. 28, an icon 351 representing the operation panel of the television receiver 21 and an icon 352 representing the operation panel of the audio system 22 are displayed.

For example, if a single operation panel is set to be displayed on the entire LCD 51 without any frame split, the user can allow the operation panel of the television receiver 21 to be displayed on the entire LCD 51 by operating the icon 351 and allow the operation panel of the audio system 22 to be displayed on the entire LCD 51 by operating the icon 352. Even if a device other than the television receiver 21 and the audio system 22 is detected, an icon operated to display an operation panel of the device is displayed in the region 51C.

In this manner, the user can preset the number of frames obtained by division, the size and the position of each of the frames in the case where a plurality of devices is detected. Therefore, the operation panels are displayed in accordance with the preference of the user so as to more efficiently and surely operate the devices. The information set by the user is managed by the user setting management section 184 of the storage control section 152.

The display of the operation panels displayed by the process as described above is changeable based on a state of the remote controller 1 at that time, an input provided from the user or the result of analysis of the operation history.

Figure 29:
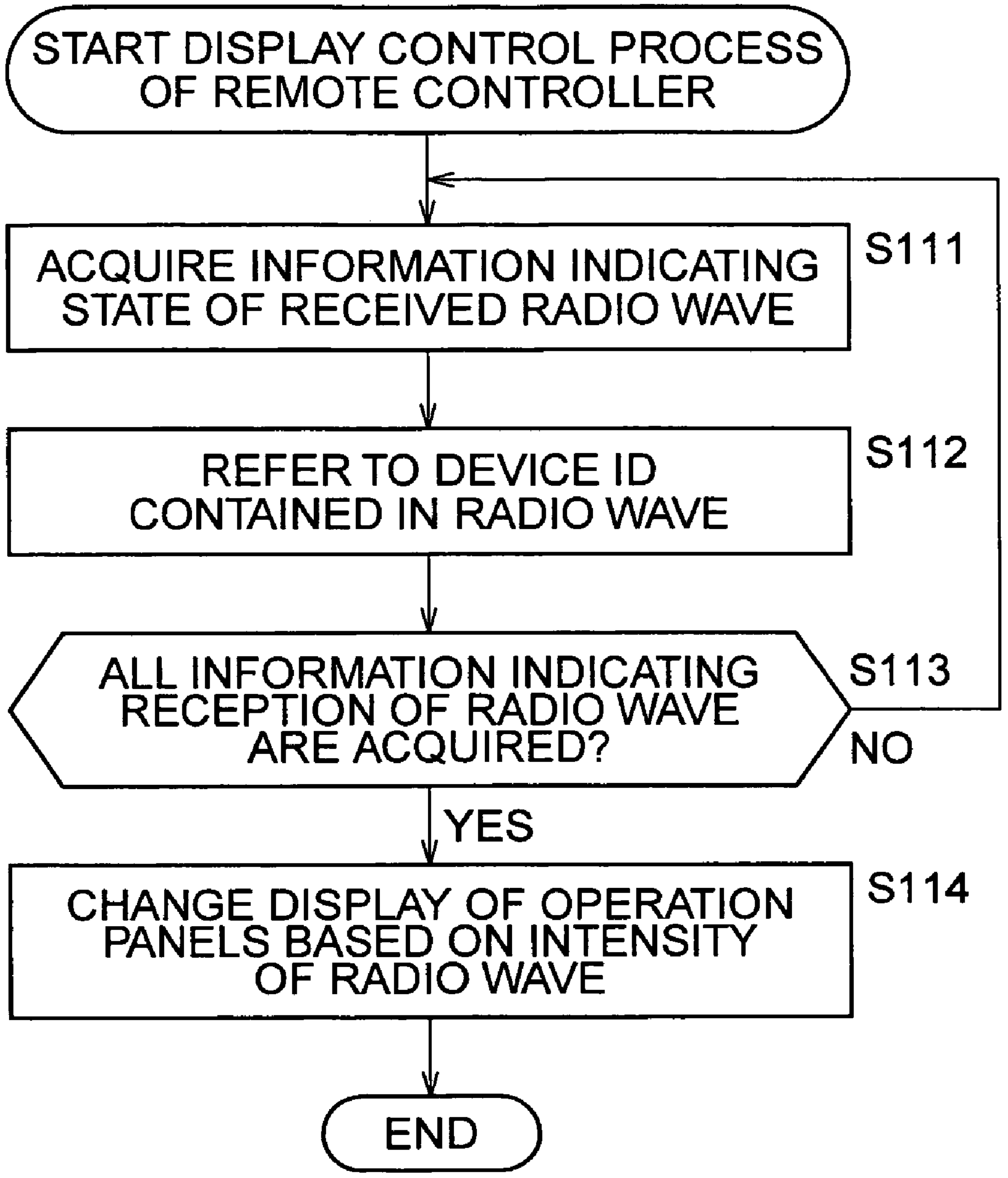
FIG. 29 is a flowchart illustrating a process of a remote controller that controls a display of an operation panel.

First, with reference to a flowchart of FIG. 29, a process of the remote controller 1 for controlling the display of the operation panel in accordance with reception of a radio wave in the Bluetooth communication will be described.

At step S111, the radio field intensity detection section 205 acquires from the communication control section 151 information indicating a state of a radio wave from the device, which is received at the Bluetooth module 67. Since the radio wave received at the Bluetooth module 67 also contains information indicating an ID of the device transmitting it and the like, the radio field intensity detection section 205 refers to the IDs of the devices at step S112 so as to acquire states of the radio waves emitted from all the detected devices.

At step S113, the radio field intensity detection section 205 determines if the information indicating reception of the radio waves are acquired for all the devices or not. If it is determined that the information are not acquired from all the devices, it returns to step S111 so as to repeat the subsequent process.

If the radio field intensity detection section 205 determines the information indicating the reception of a radio waves are acquired from all the devices, the process proceeds to step S114 so as to detect an intensity of reception of each radio wave based on the acquired information. Frames are allocated in the order of higher intensities of reception so that the respective operation panels are displayed on the LCD 51.

For example, if the intensity of reception of a radio wave emitted from the audio system 22 is higher than that of a radio wave emitted from the television receiver 21 while the operation panel shown in FIG. 28 is being displayed, the display is changed so that the operation panel of the audio system 22 is displayed in the region 51A whereas the operation panel of the television receiver 21 is displayed in the region 51B.

Generally, it is supposed that a device transmitting a radio wave at a higher intensity is closer to the remote controller 1 than a device transmitting a radio wave at a low intensity. Therefore, as described above, a device closer to the remote controller 1 has priority to be, for example, displayed in the upper frame 51A so that the user can instinctively recognize an operation panel to be operated by himself/herself. Thus, the device can be efficiently operated while the device can be prevented from being erroneously operated.

The position, at which the operation panel having priority is displayed, may be appropriately set by the user.

Although the position where the operation panel is displayed is changed in accordance with the intensity of a radio wave in the above description, the size may be changed, for example, so that the operation panel of a closer device is displayed larger than that of a device situated far away. In this case, the HTML files are also reconstituted so that the operation panels are displayed based on a newly created HTML file.

The display of the operation panels may be changed by pressing a switching button displayed at a predetermined position on the LCD 51.

Figure 30:
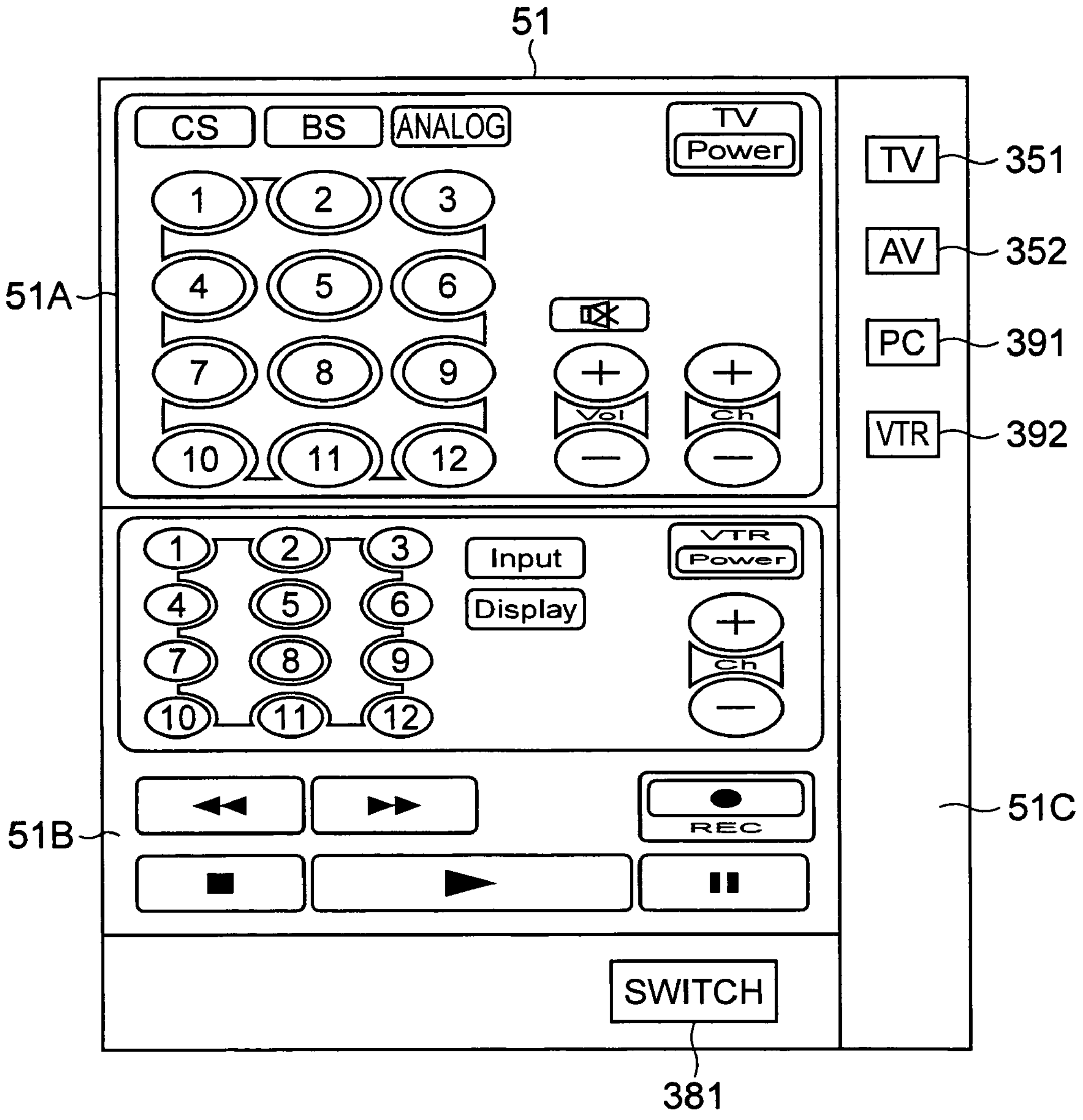
FIG. 30 is a diagram showing another example of display of an operation panel.

FIG. 30 shows an example of display in the case where the television receiver 21, the audio system 22, the personal computer 31 and a VTR (Video Tape Recorder) (not shown) are detected by the search.

The operation panels of the television receiver 21 and the VTR are displayed in the regions 51A and 51B, whereas the icons 351, 352, 391 and 392, which are operated to display the operation panels of the television receiver 21, the audio system 22, the personal computer 31 and the VTR, are displayed in the region C.

In the case where, for example, four devices are detected as described above, each time a switching button 381 displayed on the LCD 51 is pressed, the number of frames obtained by division is changed.

Figure 31:
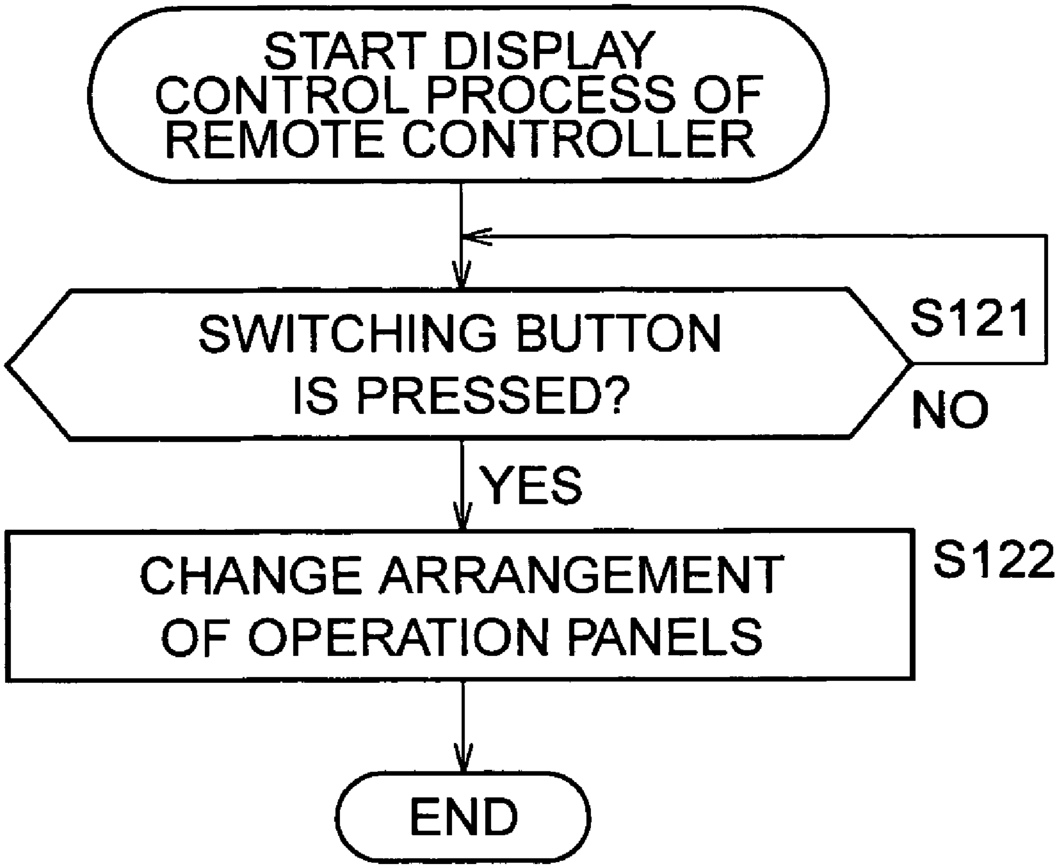
FIG. 31 is a flowchart illustrating a process of the remote controller that switches a display of an operation panel.

Next, with reference to a flowchart of FIG. 31, a process of the remote controller 1 for changing the number of frames obtained by the division in response to pressing of the switching button 381 will be described.

At step S121, the editing section 202 determines whether the switching button 381 is pressed down by the user or not based on an output from the input detection section 154, and waits until it is determined that the button is pressed down.

If it is determined that the switching button 381 is pressed down at step S121, the editing section 202 proceeds to step S122 so as to reconstitute the HTML files (the operation panel information obtained from the television receiver 21, the audio system 22, the personal computer 31 and the VTR) so that the respective operation panels are displayed in the arrangement different from the previous arrangement, thereby allowing the LCD 51 to display the operation panels based on a created HTML file.

The above process is executed each time the switching button 381 is pressed down.

Figure 32:
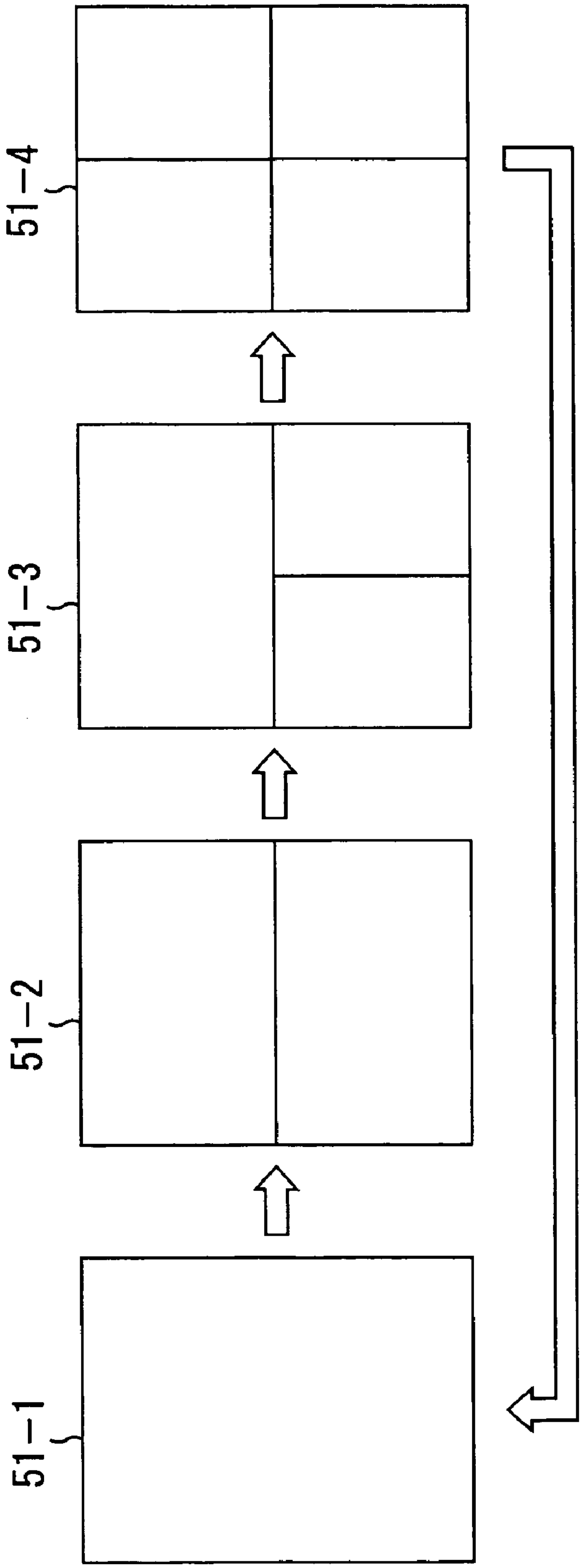
FIG. 32 is a diagram showing an example of switching between frames.

FIG. 32 is a diagram showing an example of switching of the display of the operation panels.

For example, in the case where four devices are detected, each time the switching button 381 is pressed, the display of the operation panels is switched in the order of LCDs 51-1 to 51-4 in FIG. 32. The LCD 51-1 shows an example where an operation panel of only one of the four devices is displayed. The LCD 51-2, which is displayed when the switching button 381 is pressed in such a state, shows an example where two operation panels are respectively displayed in the upper and lower frames.

The LCD 51-3, which is displayed when the switching button 381 is pressed while the LCD 51-2 is being displayed, shows an example where only the lower frame is further horizontally divided into two so that the operation panels are displayed in the respective frames. Furthermore, the LCD 51-4, which is displayed when the switching button 381 is pressed while the LCD 51-3 is being displayed, shows an example where the upper frame is also horizontally divided into two in addition to division of the lower frame so that the operation panels are displayed in the respective frames.

In FIG. 32, the operation panels displayed in the respective regions are omitted.

As described above, each time the switching button 381 is pressed, it is possible to change the number of frames obtained by division. The user can easily select the number of division in accordance with the number of devices operated by himself/herself.

Figure 33:
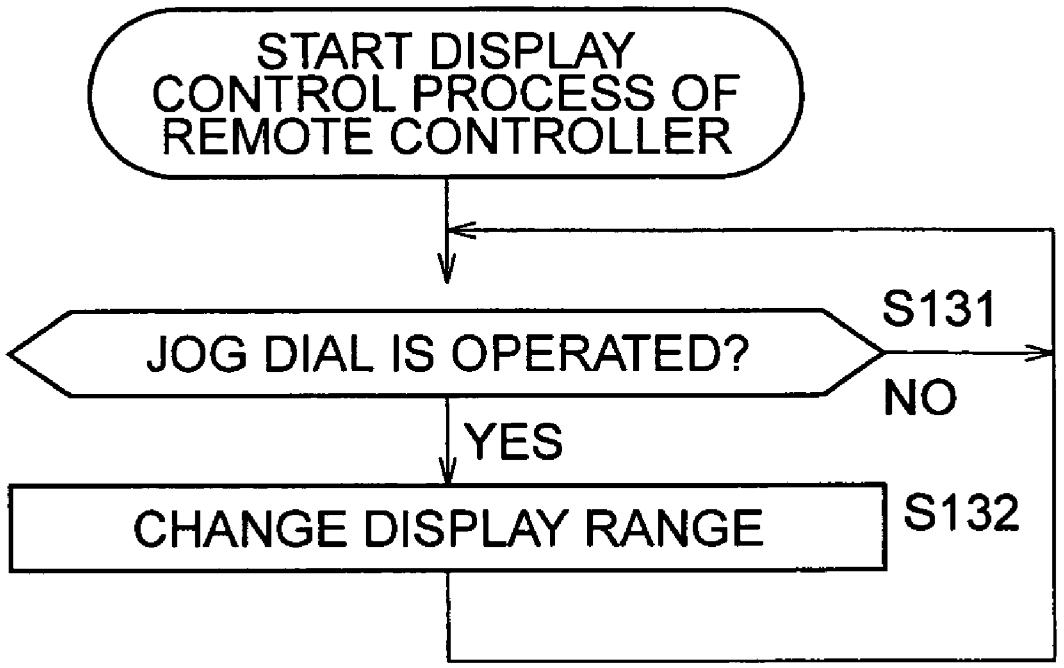
FIG. 33 is a flowchart illustrating a process of the remote controller that changes a display of an operation panel.

Next, with reference to a flowchart of FIG. 33, a process of the remote controller 1 for changing the operation panel displayed on the LCD 51 in conjunction with a rolling operation of the jog dial 52 will be described.

Figure 34:
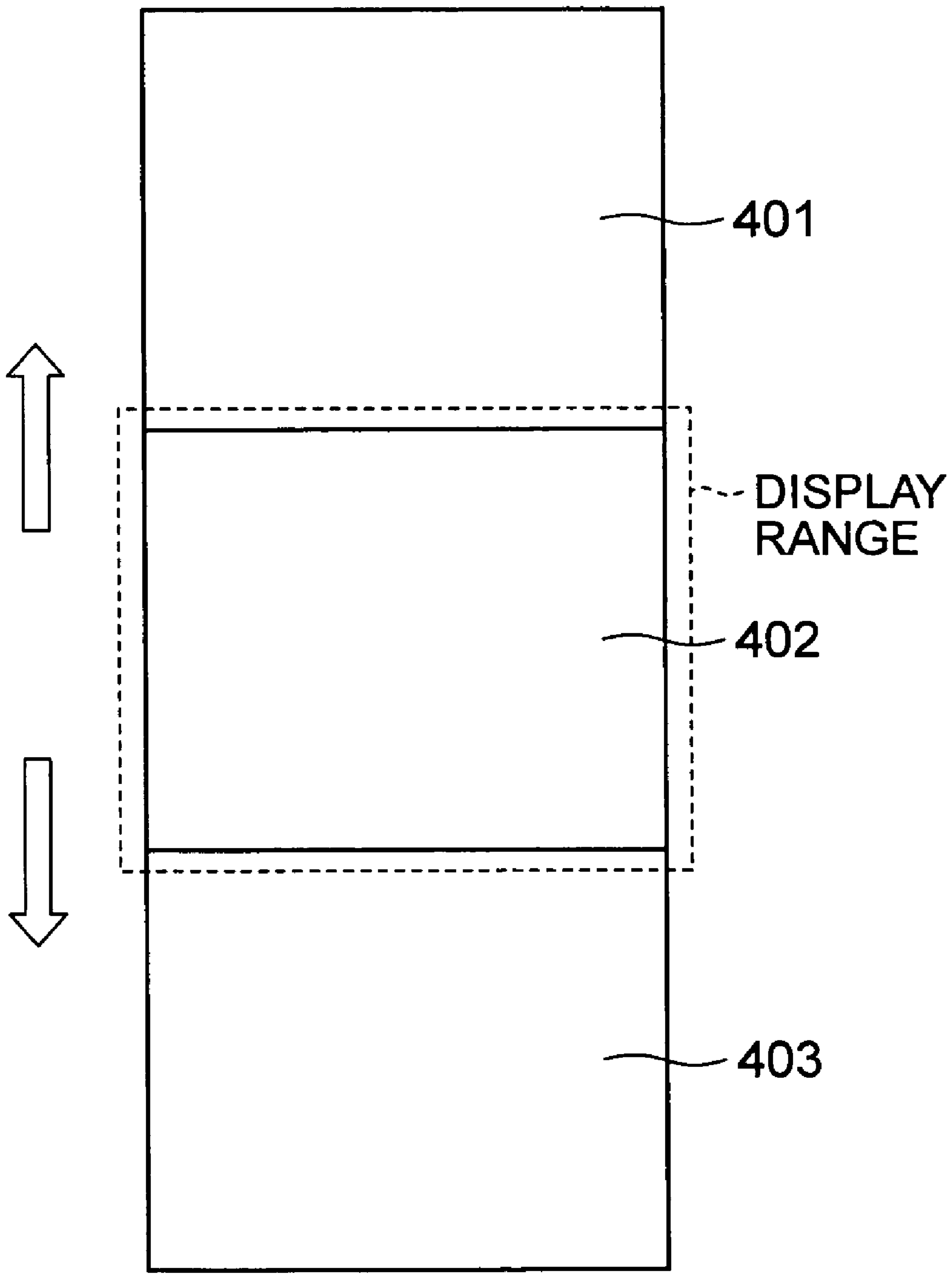
FIG. 34 is a diagram showing further another example of display of an operation panel.

For example, in the case where three devices are detected by the search, an HTML file, in which operation panels 401 to 403 of the detected devices are consecutively arranged in a vertical instruction, is created as shown in FIG. 34.

In FIG. 34, a display range of the LCD 51 is indicated with a broken line. The user can use operation panels within this range. The user can vertically scroll the display range as indicated with outline arrows by rolling the jog dial 52 so as to change the operation panel to be displayed.

At step S131, the control section 203 of the display control section 153 determines whether or not the jog dial 52 has been rolled based on an output from the input detection section 154, and waits until it is determined that it is operated. If it is determined the jog dial has been rolled at step S131, the control section 203 proceeds to step S132 so as to change the display range in conjunction with the amount of rolling.

For example, when the jog dial 52 is rolled upward while the operation panel 402 shown in FIG. 34 is being displayed, the display on the LCD 51 is scrolled up in accordance with the amount of rolling so that the operation panel 401 is displayed on the LCD 51. On the contrary, when the jog dial 52 is rolled downward, the display on the LCD 51 is scrolled down in accordance with the amount of rolling so that the operation panel 403 is displayed on the LCD 51.

In this manner, the user may be able to change the operation panel to be displayed by rolling the jog dial 52.

Although the case where the display of the operation panel is changed in accordance with the reception of the radio wave emitted from the device, the pressing of the switching button 381, and the rolling operation of the jog dial 52 is described above, the user may be able to change the display of the operation panel based on the result of analysis of the stored operation history, as described above.

Figure 35:
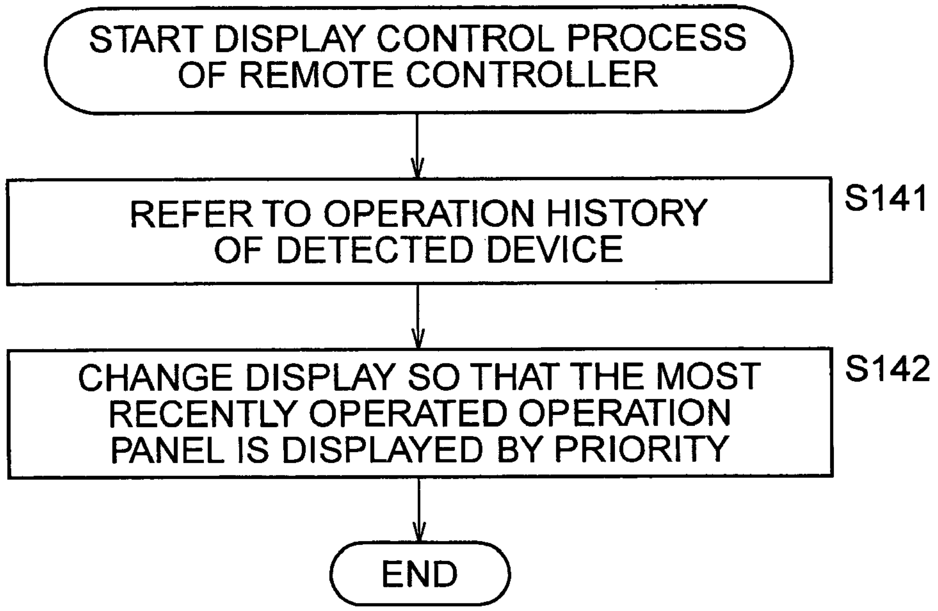
FIG. 35 is a flowchart illustrating a process of a remote controller that changes a display of an operation panel.

First, with reference to a flowchart of FIG. 35, a process of the remote controller 1 for changing the display based on operation times of the operation panel will be described.

At step S141, the operation history analysis section 204 of the display control section 153 refers to the operation history of the device detected by the search. Therefore, in the case where a plurality of devices is detected, the operation history for each device, which is managed by the operation history management section 185, is referred to.

The operation history analysis section 204 instructs the editing section 202 to rearrange the operation panels based on operation times of the respective devices so that the operation panel of the most recently (lately) operated device is displayed by priority. The display by priority means that a target operation panel is displayed at a position that allows the best recognition by the user or displayed in size and color that allow the best recognition by the user. It is apparent that the user may be able to set a position, size, a color and the like for the display by priority.

For example, if a frame is divided into an upper one and a lower one, the display of the operation panels is changed so that the most recently operated operation panel is displayed in the upper frame by priority and the operation panel that is previously operated is displayed in the lower frame. In this case, the operation panel which is operated prior to the operation panel displayed in the lower frame can be displayed by pressing an icon.

Only the most recently operated operation panel may be enlarged to be displayed in a large range by priority whereas the other operation panels may be displayed in a relatively small range. In this manner, the user can set so that the display of the operation panels is changed based on the operation times.

Moreover, not only based on the operation time, the most frequently used operation panel may also be displayed by priority.

Figure 36:
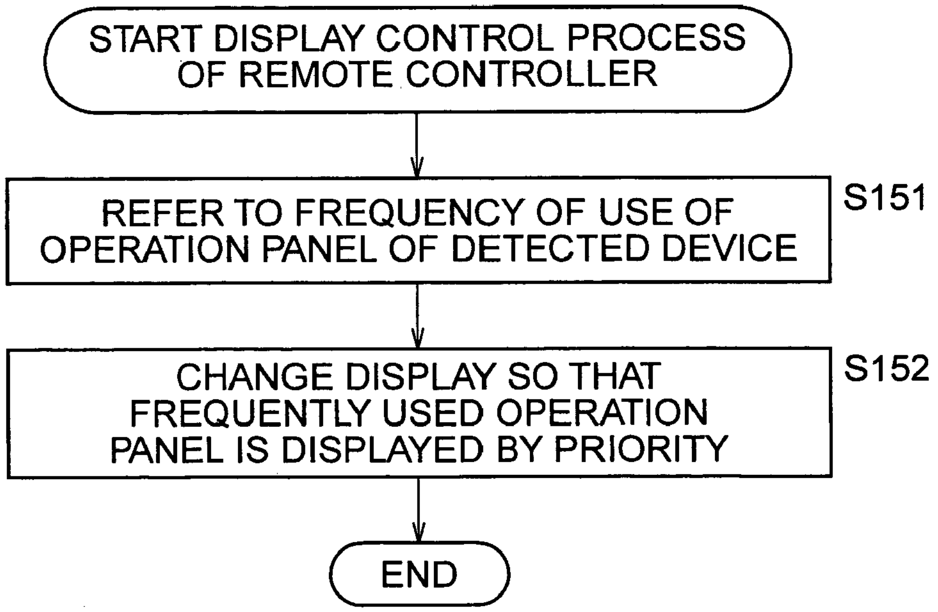
FIG. 36 is a flowchart illustrating a process of a remote controller that changes a display of an operation panel.

Next, with reference to a flowchart of FIG. 36, a process of the remote controller 1 for changing the display of the operation panel in accordance with the frequency of use will be described.

At step S151, the operation history analysis section 204 refers to the frequency of use of the operation panel for each of the devices detected by the search based on the operation history managed by the operation history management section 185.

At step S152, the operation history analysis section 204 instructs the editing section 202 to rearrange the operation panels in accordance with frequencies of use of the respective operation panels so that the most frequently used operation panel is displayed by priority. As a result, the editing section 202 edits the HTML files. For example, in the case where the frame is divided into two, that is, an upper one and a lower one, the most frequently used operation panel is displayed in the upper frame by priority while the next frequently used operation panel is displayed in the lower frame. Moreover, in this case, the operation panels which are less frequently used than the operation panel displayed in the lower frame can be displayed by operating icons.

As a result, the operation panel, which is possibly the most frequently used by the user, is displayed by priority based on the operation history, so that the user can also more efficiently operate the devices.

The operation panel, which is displayed by priority, may be selected in accordance with time at which the remote controller 1 is operated.

Next, with reference to a flowchart of FIG. 37, an operation history analysis process of the remote controller 1 for managing the frequency of use within each period of time based on the operation history will be described.

At step S161, the operation history analysis section 204 targets one of the operation histories managed by the operation history management section 185 and refers to its operation time. As shown in FIG. 21, besides the contents of the operation and year/month/day of the operation, the operation time is stored as the operation history of each of the devices.

At step S162, the operation history analysis section 204 allocates the operation history to a predetermined period of time based on the operation time of the target operation history so as to create a management table of the operation history for each period of time.

FIG. 38 is a diagram showing an example of a management table of the operation history for each period of time.

For example, the number of uses of the devices A to D operated by the remote controller 1 is managed for each hour. In the example shown in FIG. 38, it is shown that, within a period of time “13:00 to 13:59”, the device A is operated 25 times, the device B is operated 0 time, the device C is operated 10 times, and the device D is operated twice, respectively. Similarly, for each of the devices, the operation history within each of the periods of time “14:00 to 14:59”, “15:00 to 15:59”, “16:00 to 16:59” and so on is managed.

The management table in FIG. 38 shows that the user of the remote controller 1 has the highest possibility of using the device A within the periods of time “13:00 to 13:59” and “14:00 to 14:59” and using the device D within the periods of time “15:00 to 15:59” and “16:00 to 16:59”. As described below, the editing section 202 changes the display of the operation panels so that the operation panel, which is most likely to be used by the user, is displayed by priority within the period of time including that time (the current time).

Figure 37:
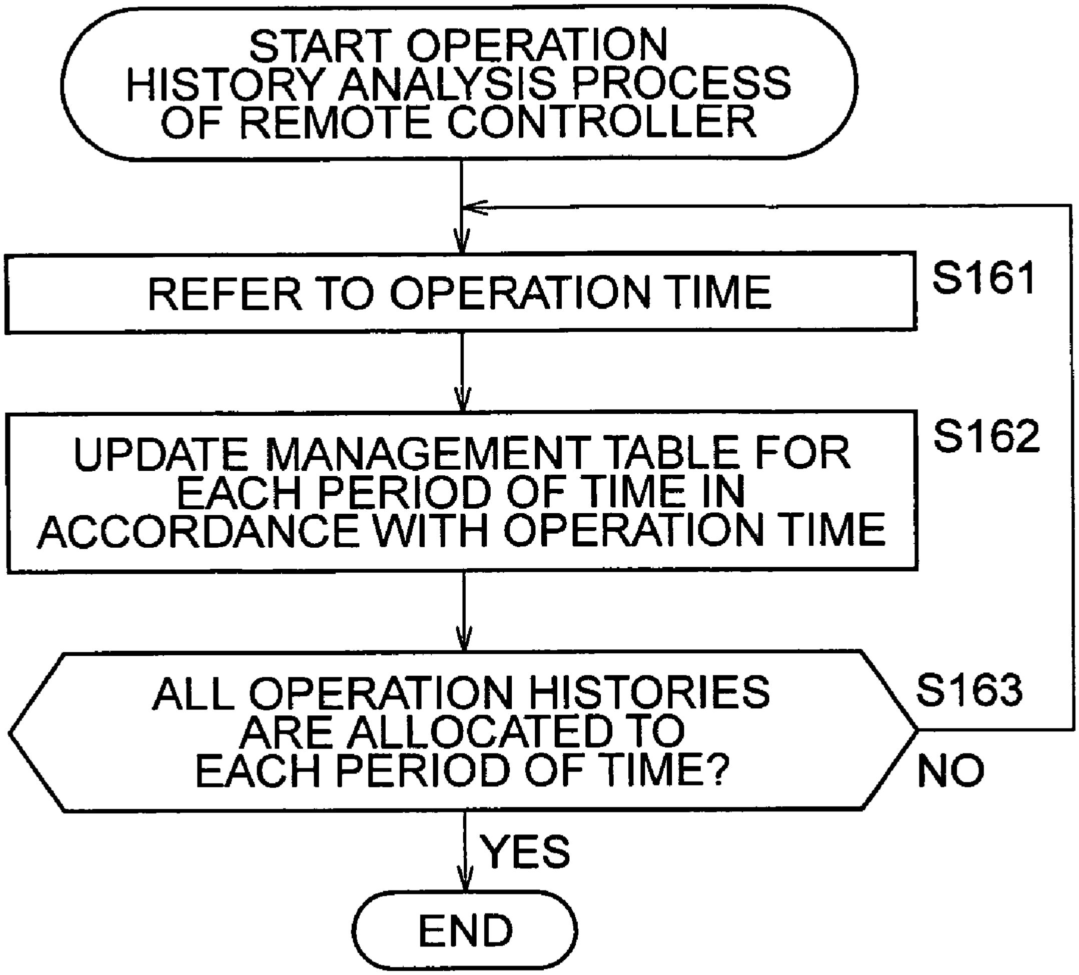
FIG. 37 is a flowchart illustrating a process of a remote controller that manages the frequency of use.

Returning to the description of FIG. 37, at step S163, the operation history analysis section 204 determines that all the operation histories of the detected devices are allocated to the respective periods of time of the management table or not. If it is determined that they are not allocated, it returns to step S161 so as to select a next target operation history and to repeat the process of allocating it to the respective periods of time of the management table in accordance with the operation time.

If the operation history analysis section 204 determines that all the operation histories for the detected devices are allocated to the respective periods of time of the management table at step S163, the process is terminated.

Figure 39:
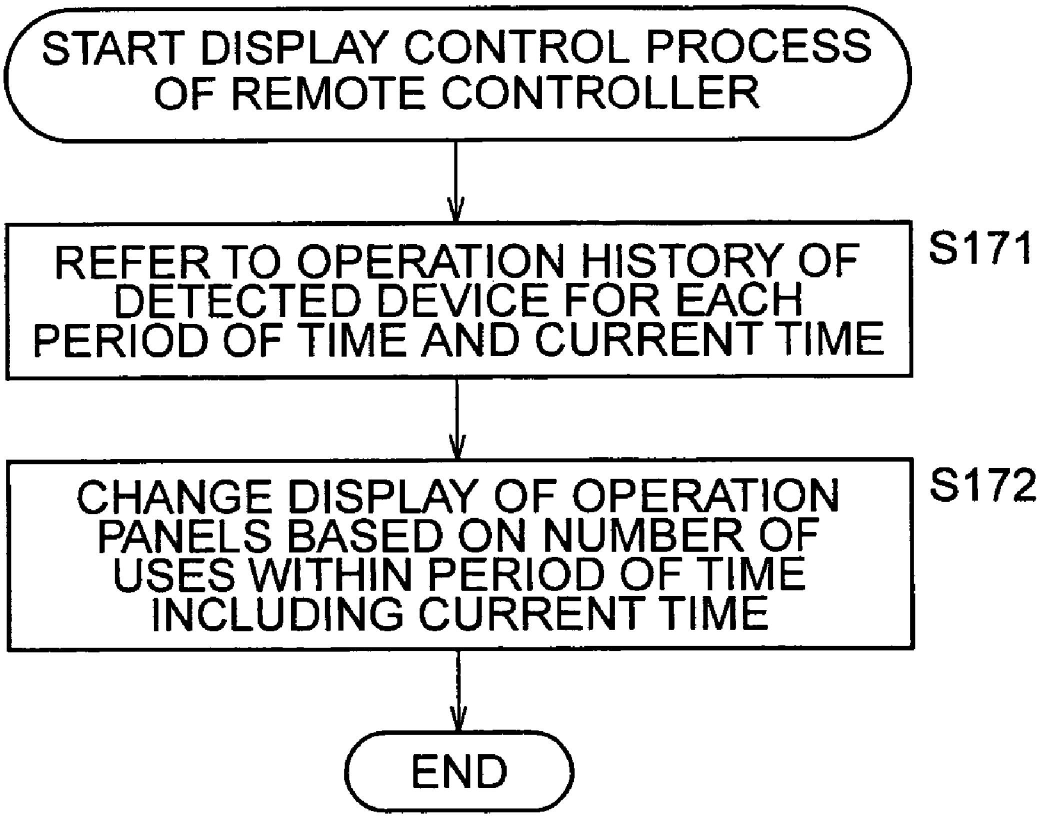
FIG. 39 is a flowchart illustrating a process of a remote controller that changes a display of an operation panel.

Next, with reference to a flowchart of FIG. 39, a process of the remote controller 1 for changing the display of the operation panels based on the management table created by the process shown in FIG. 37 will be described.

At step S171, the operation history analysis section 204 refers to the operation histories of the detected devices within each period of time (the management table in FIG. 38) and the current time.

At step S172, the operation history analysis section 204 instructs the editing section 202 to display the most frequently used operation panel by priority based on the number of uses within the period of time including the current time. As a result, for example, if the current time falls within the period of time “13:00 to 13:59” (such as 13:30) and the management table shown in FIG. 38 is referred to, the HTML files are edited by the editing section 202 so that the operation panel of the device A is displayed by priority.

By the above process, for example, even if the television receiver 21 and the audio system 22 are detected all day by the remote controller 1 in the room 11 shown in FIG. 1, the display of the operation panels is changed in accordance with that time. Therefore, the user can more efficiently operate the devices.

When the display panel of a predetermined device is to be displayed, the operation panel of a highly relevant device may be automatically displayed simultaneously with the operation panel of the device. For example, the VTR and the television receiver, the DVD player and the television receiver, or the like are highly likely to be operated by the user at the similar time, and therefore it is considered that they are highly relevant to each other. Thus, in this case, the operation panel of the television receiver is automatically displayed with the operation panel of the VTR or the DVD player.

Also by this process, the user can more efficiently operate the devices.

Figure 40:
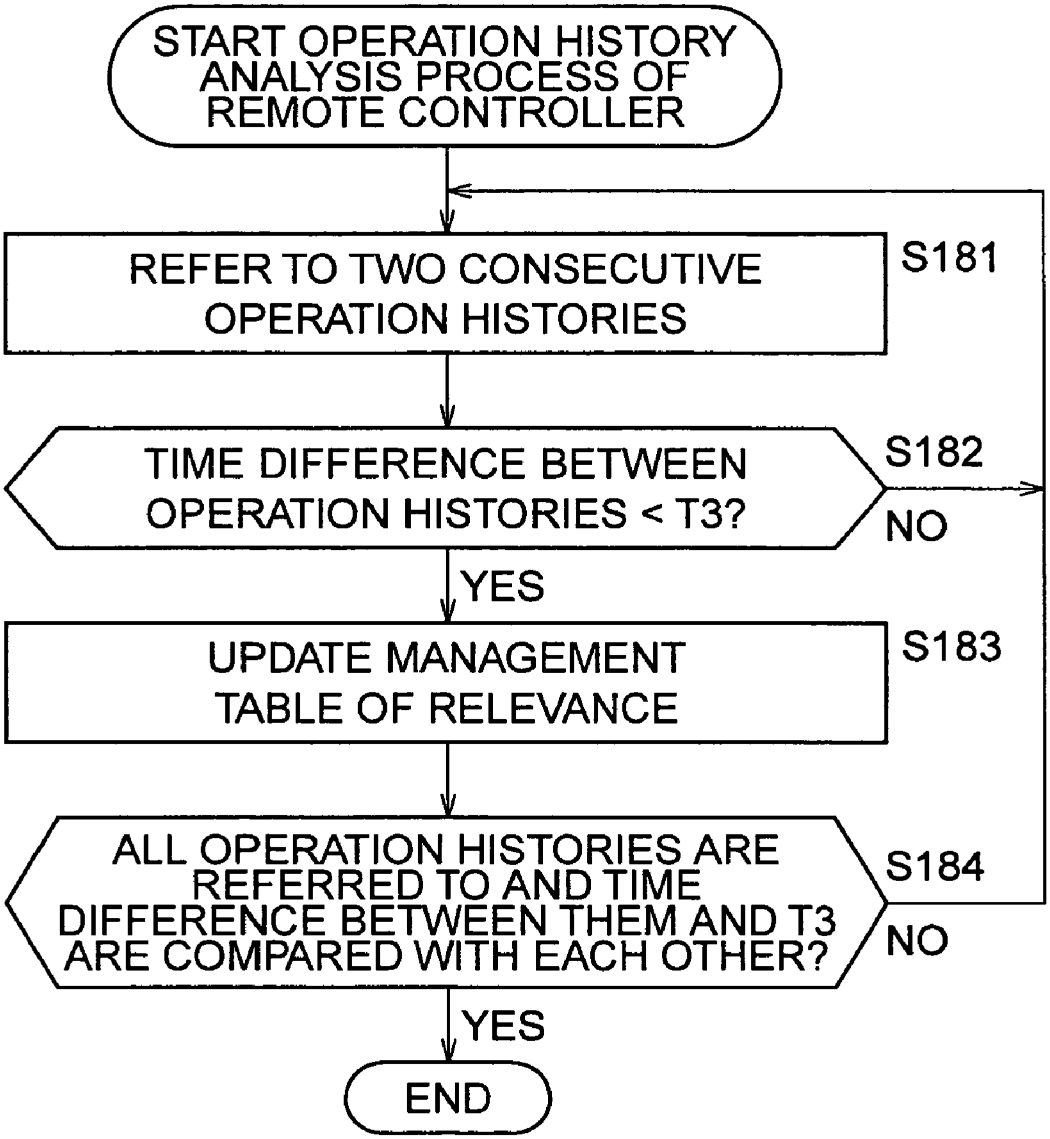
FIG. 40 is a flowchart illustrating a process of a remote controller that analyzes the relevance between devices.

Next, with reference to a flowchart of FIG. 40, a process of the remote controller 1 for analyzing the relevance between the devices based on the operation history will be described.

After the operation history analysis section 204 refers to two consecutive operation histories in a list of the operation histories as shown in FIG. 21 at step S181, it proceeds to step S182 so as to determine whether a difference in time between the operation histories (a time difference between the operation times) is smaller than a predetermined threshold value (T3) or not.

For example, the operation history of the device A, which is registered on the first line, and the subsequent operation history of the device B, which is registered on the second line, are referred to from the operation histories in FIG. 21 so that it is determined whether a time difference between the operation times (16 o’clock 00 minute 15 seconds and 16 o’clock 00 minute 08 seconds) is smaller than a threshold value or not.

If the operation history analysis section 204 determines that the time difference between the two consecutive operation times is larger than a predetermined threshold value at step S182, the process returns to step S181 so as to reselect next two consecutive operation histories (for example, the operation history of the device B registered on the second line and the operation history of the device A registered on the third line in FIG. 21) and to repeat a similar process from then on.

For example, if the operation history of the device A registered on the first line and the operation history of the subsequent device B registered on the second line are referred to from the operation histories in FIG. 21 so as to determine that a time difference “7 seconds” between the respective operation times is smaller than the threshold value (T3) such as “10 seconds” at step S182, the operation history analysis section 204 recognizes that the devices A and B are highly relevant to each other and proceeds to step S183.

At step S183, the operation history analysis section 204 updates a parameter, which the relevance between the devices recognized as being highly relevant to each other, so as to indicate a higher relevance.

FIG. 41 is a diagram showing an example of a management table for managing the relevance between the devices.

On the second line in the management table, values indicating the respective relevancies between the device A and the other devices (the devices B to D) are shown. On the third line, values indicating the respective relevancies between the device B and the other devices (the devices A, C and D) are shown. Values indicating the respective relevancies between the device C and the other devices (the devices A, B and D) are shown on the fourth line, and values indicating the respective relevancies between the device D and the other devices (the devices A to C) are shown on the fifth line.

More specifically, a relevance between the devices A and B is indicated by a value “5”, a relevance between the devices A and C is indicated by a value “0”, and a relevance between the devices A and D is indicated by a value “2”. In addition, a relevance between the devices B and C is indicated by a value “0”, and a relevance between the devices B and D is indicated by a value “1”. Furthermore, a relevance between the devices C and D is indicated by a value “0”.

For example, if it is determined that the devices A and B are highly relevant to each other based on a time difference between the operation history of the device A registered on the first line of the operation histories in FIG. 21 and the operation history of the device B registered on the second line, the operation history analysis section 204 increments by one for the value “5” indicating the relevance between the devices A and B in the management table of FIG. 41 by 1 so as to reset the value to “6”.

Upon update of the management table, the operation history analysis section 204 refers to all of the two consecutive operation histories so as to determine whether the time difference and the predetermined threshold value are compared with each other or not at step S184. If it is determined that the comparison is not made, it returns to step S181 so as to repeat the subsequent process.

If it is determined that the time difference between the two consecutive operation histories and the predetermined threshold value are compared with each other at step S184, the process is terminated. Thereafter, the operation panels are displayed based on the updated management table.

Figure 42:
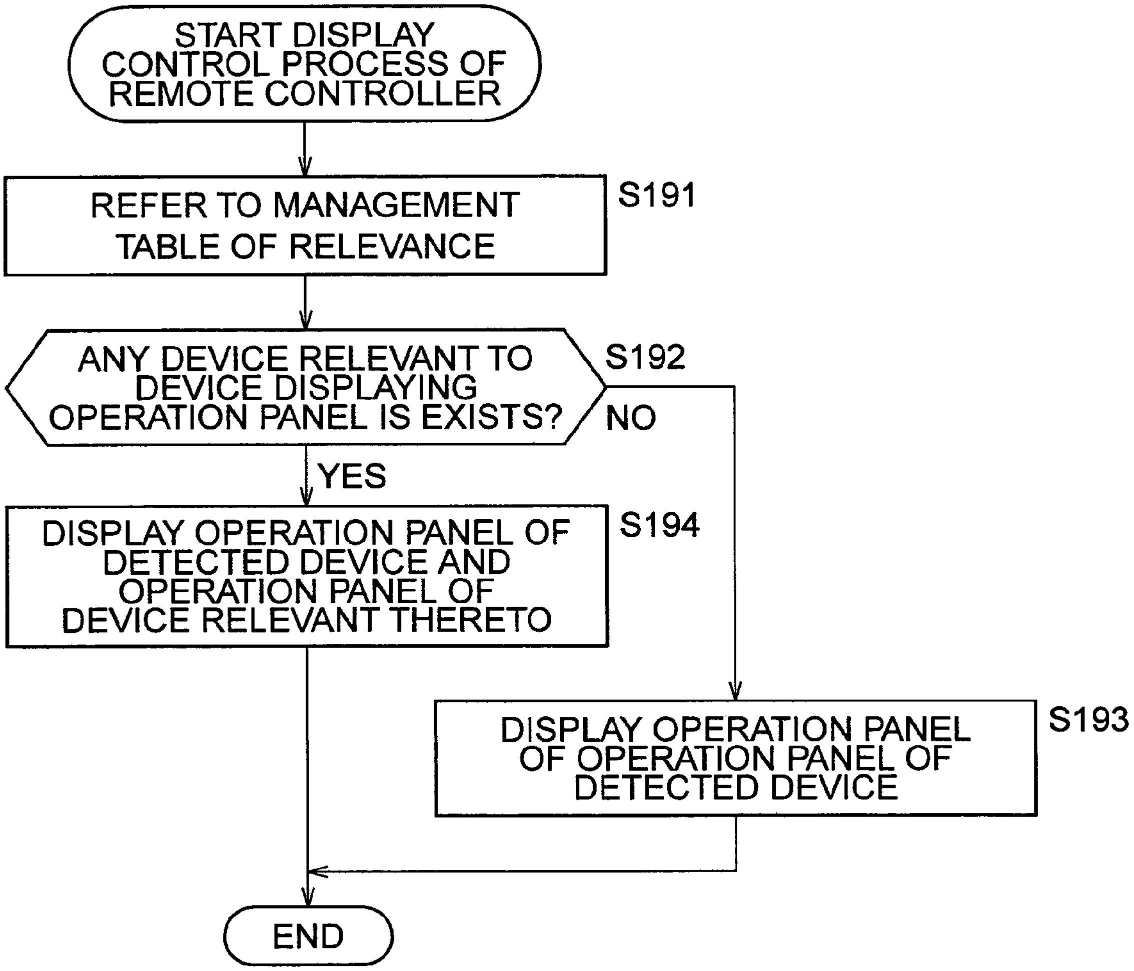
FIG. 42 is a flowchart illustrating a process of a remote controller that controls a display of an operation panel.

Next, with reference to a flowchart of FIG. 42, a process of the remote controller 1 for controlling the display of the operation panels based on the management table of relevancies, which is updated in the above-described manner, will be described. This process is performed, for example, when a plurality of devices is detected and the operation panel of a predetermined device among them is determined to be displayed.

After the operation history analysis section 204 refers to the management table for managing the relevancies between the respective devices, which is created by the process described with reference to FIG. 40, at step S191, it proceeds to step S192 so as to determine whether there is any relevant device with the device whose operation panel is determined to be displayed or not.

If the operation history analysis section 204 determines that there is no relevant device with the device whose operation panel is determined to be displayed at step S192, it proceeds to step S193 so as to instruct the editing section 202 to display the operation panel of the determined device, and then terminates the process.

On the other hand, if the operation history analysis section 204 determines that there is a relevant device with the device whose operation panel is determined to be displayed at step S192, it proceeds to step S194 so as to instruct the editing section 202 to display the operation panel of the device, which is determined to be displayed, with the operation panel of the device relevant to the device. In the management table shown in FIG. 41, for example, it is determined that the devices, for which, for example, a value “5” or more is set, are relevant to each other.

Figure 43:
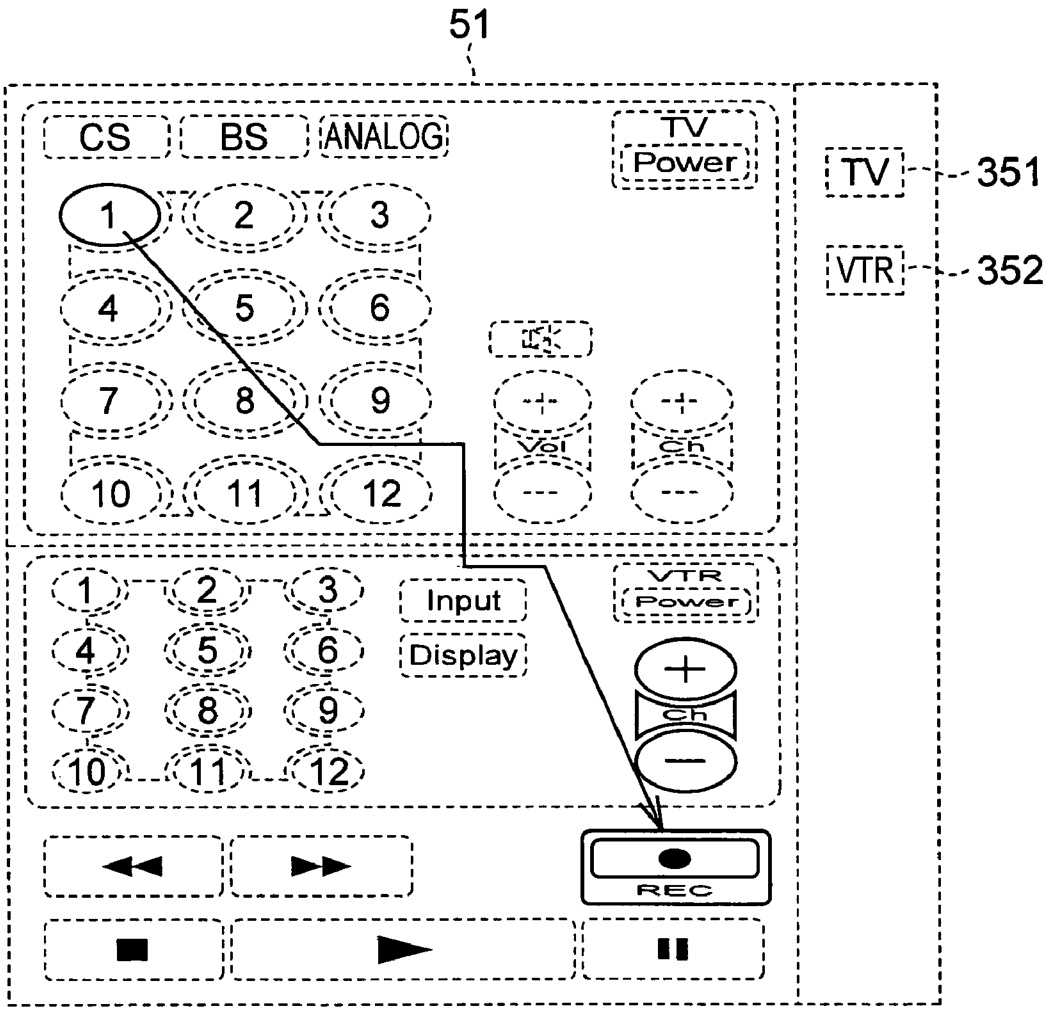
FIG. 43 is a diagram showing an example of display of an operation panel.

FIG. 43 is a diagram showing an example of the operation panels displayed by the above process. For convenience of the description, the most part of FIG. 43 is indicated with a broken line.

For example, if the device A in FIG. 41 is the television receiver 21 and the device B is the VTR, the operation panel of the VTR (the lower frame) is displayed as an operation panel of a device relevant to the television receiver 21 together with the operation panel of the television receiver 21 (the upper frame) as shown in FIG. 43.

The user can operate a plurality of operation panels, which is displayed as relevant devices as described above, in conjunction with each other. For example, as indicated with a solid line in FIG. 43, by dragging a button, which is operated for selecting a channel “1” of the television receiver 21, to a recording start button (REC) of the VTR, the user can make the VTR start recording the channel “1”.

In this manner, the operation panels of a plurality of relevant devices can be used in conjunction with each other so as to allow efficient control of the devices.

As described above, the display of the operation panels can be changed based on various information obtained by the analysis of the operation histories.

Figure 44:
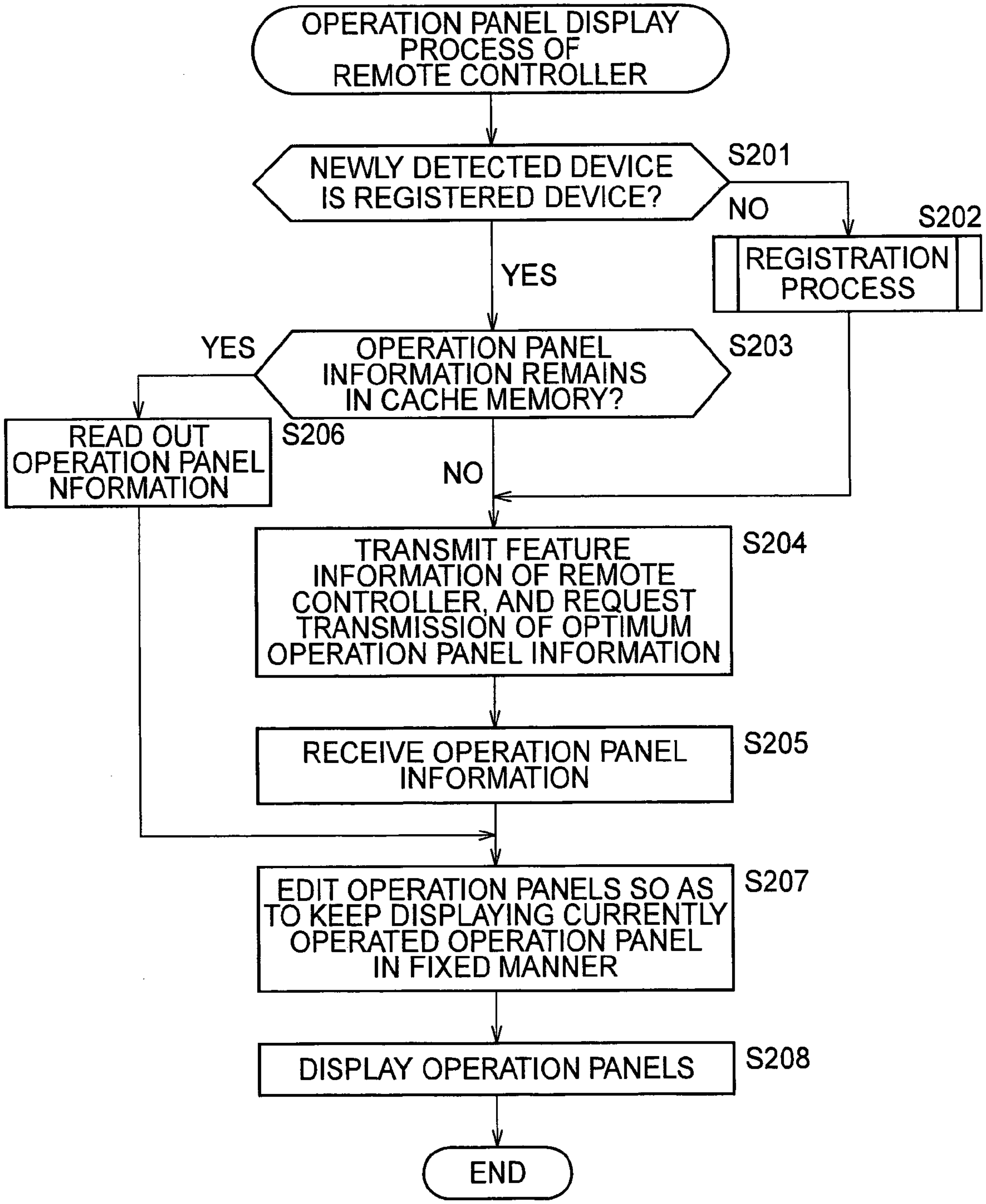
FIG. 44 is a flowchart illustrating a process of a remote controller that displays an operation panel.

Next, with reference to a flowchart of FIG. 44, a display process of the remote controller 1, which is performed when a new device is detected by a search executed while a predetermined operation panel is being displayed on the LCD 51, will be described. This process is basically the similar as that described with reference to FIG. 16.

More specifically, upon notification of the detection of a device from the search section 161, the device information management section 181 of the storage control section 152 determines whether device information of the detected device has already been registered or not at step S201.

If the device information management section 181 determines that the device information of the detected device has not been registered at step S201, it proceeds to step S202 so as to perform a registration process of the device information. As a result, the device information of the newly detected device is registered. After registration of the device information, a process in step S203 is skipped.

On the other hand, if the device information management section 181 determines that the device information of the newly detected device has already been registered in the storage section 69, it proceeds to step S203. At step S203, the cache memory management section 182 determines whether the operation panel information of the detected devices remains in the cache memory 69A or not. If it is determined that it does not remain, the process proceeds to step S204.

At step S204, the device control section 162 transmits the feature information of the remote controller 1 to the newly detected device to request the transmission of operation panel information optimum for the remote controller 1. The operation panel information, which is transmitted in response to the request, is received at step S205. The operation panel information received by the device control section 162 is acquired by the operation panel information acquisition section 201 of the display control section 153.

On the other hand, if it is determined that the operation panel information of the newly detected device remains in the cache memory 69A at step S203, the process proceeds to step S206 where the remaining operation panel information is read out so as to be acquired by the operation panel information acquisition section 201 of the display control section 153.

At step S207, the editing section 202 edits the operation panel information so that the operation panel, which is currently operated by the user, is continuously displayed while the operation panel of the newly detected device is displayed in the other region. Based on the operation panel information created by the editing section 202, the operation panels are displayed on the LCD 51 by the control section 203 at step S208.

Figure 45:
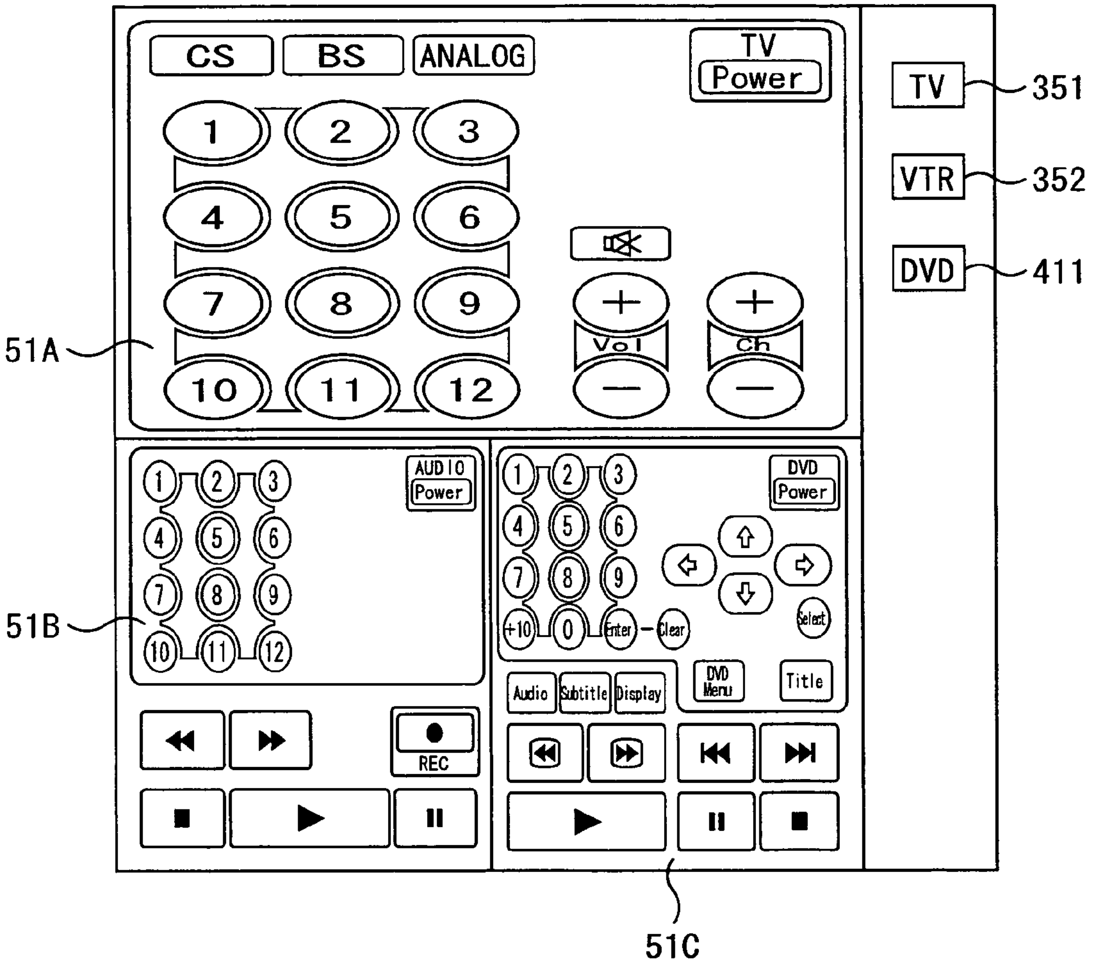
FIG. 45 is a diagram showing an example of display of an operation panel.

FIG. 45 is a diagram showing an example of the operation panels displayed at step S208.

FIG. 45 shows the example where the operation panels of the television receiver 21 and the audio system 22 are respectively displayed in the upper frame and the lower frame of the LCD 51, a DVD player is newly detected while the operation panel of the television receiver 21 is being operated by the user, so that the display is changed.

More specifically, the operation panel of the television receiver 21, which is currently operated, is continuously displayed in the entire upper region 51A. At the similar time, the operation panel of the audio system 22, which has been displayed in the entire lower frame, is now displayed in the lower left region 51B while the operation panel of the newly detected DVD player is displayed in the lower right region 51C.

In this manner, the operation panel, which is being operated by the user, is continuously displayed in a fixed manner even if a new device is detected. Therefore, a change of the display of the operation panels can be restrained from affecting the operation of the user.

Figure 46:
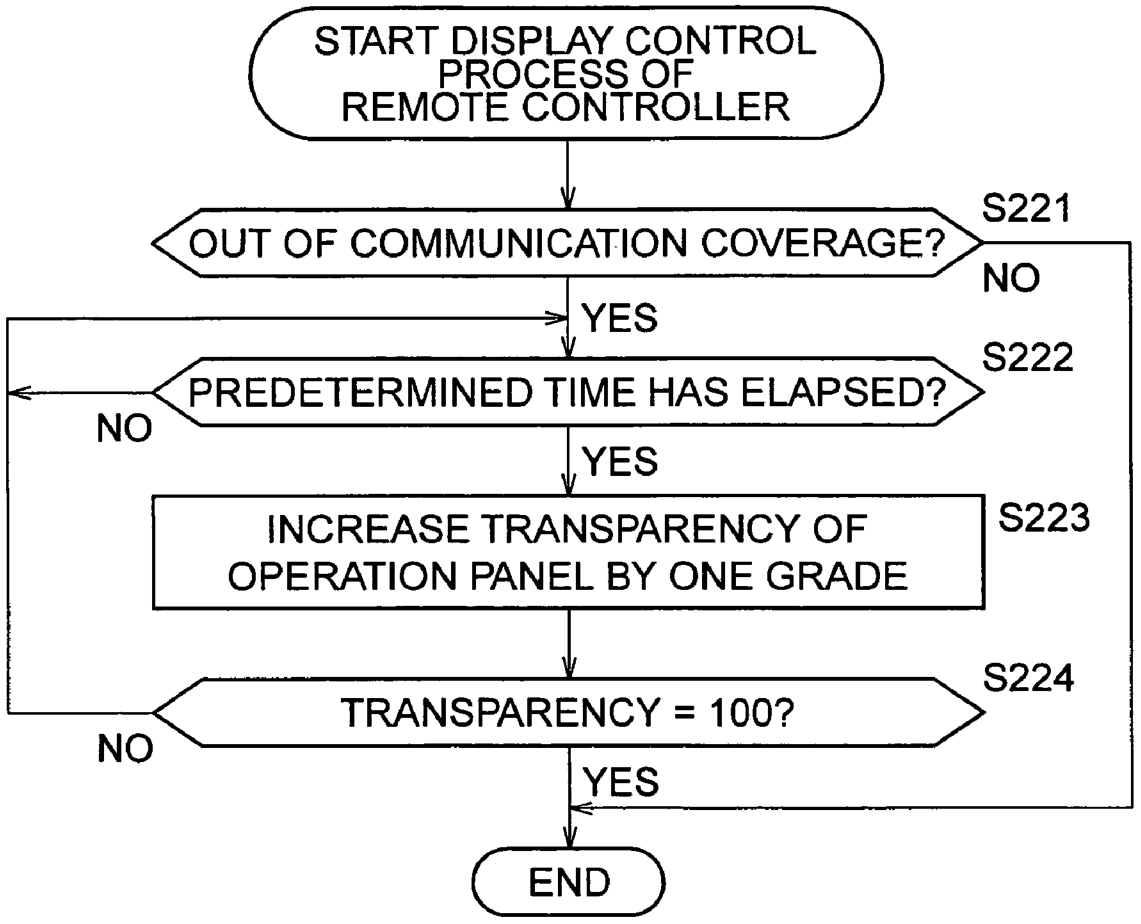
FIG. 46 is a flowchart illustrating a process of the remote controller that clears a display of an operation panel.

Next, with reference to a flowchart of FIG. 46, a process of the remote controller 1 for gradually increasing a transparency (decreasing a density) of the display of the operation panels to clear the display of the operation panels will be described.

At step S221, the control section 203 of the display control section 153 determines whether it goes out of the communication coverage with the devices based on an output from the radio field intensity detecting section 205. In communication with the device detected by a search, information indicating the intensity of a radio wave received by the Bluetooth module 67 is repeatedly output from the radio field intensity detecting section 205 to the control section 203.

If the control section 203 determines that it does not go out of the communication coverage at step S221, the process is terminated. On the other hand, if the control section 203 determines that it goes out of the communication coverage, the process proceeds to step S222. For example, if a radio wave at an intensity lower than a predetermined threshold value is received, it is determined that it goes out of the communication coverage with the device emitting the radio wave.

At step S222, the control section 203 determines whether predetermined time has elapsed after it goes out of the communication coverage with the device and waits until it is determined that the time has elapsed.

If the control section 203 determines that the predetermined time has elapsed after it goes out of the communication coverage with the device, the process proceeds to step S223 so as to increase a transparency of the operation panel displayed on the LCD 51 by one grade (decrease a density by one grade). When it enters the communication coverage with the device again, the operation panel is displayed at a normal density (a transparency "0").

The control section 203 determines whether the transparency is 100 (there is no operation panel being displayed) or not at step S224. If it is determined that the transparency is not 100, it returns to step S222 so as to repeat the subsequent process. More specifically, the operation panel, which is set to increase its transparency by one grade each time the predetermined time elapses so as to gradually disappear with elapse of time, is represented.

If it is determined that the transparency is 100 at step S224, the process is terminated.

Figure 47:
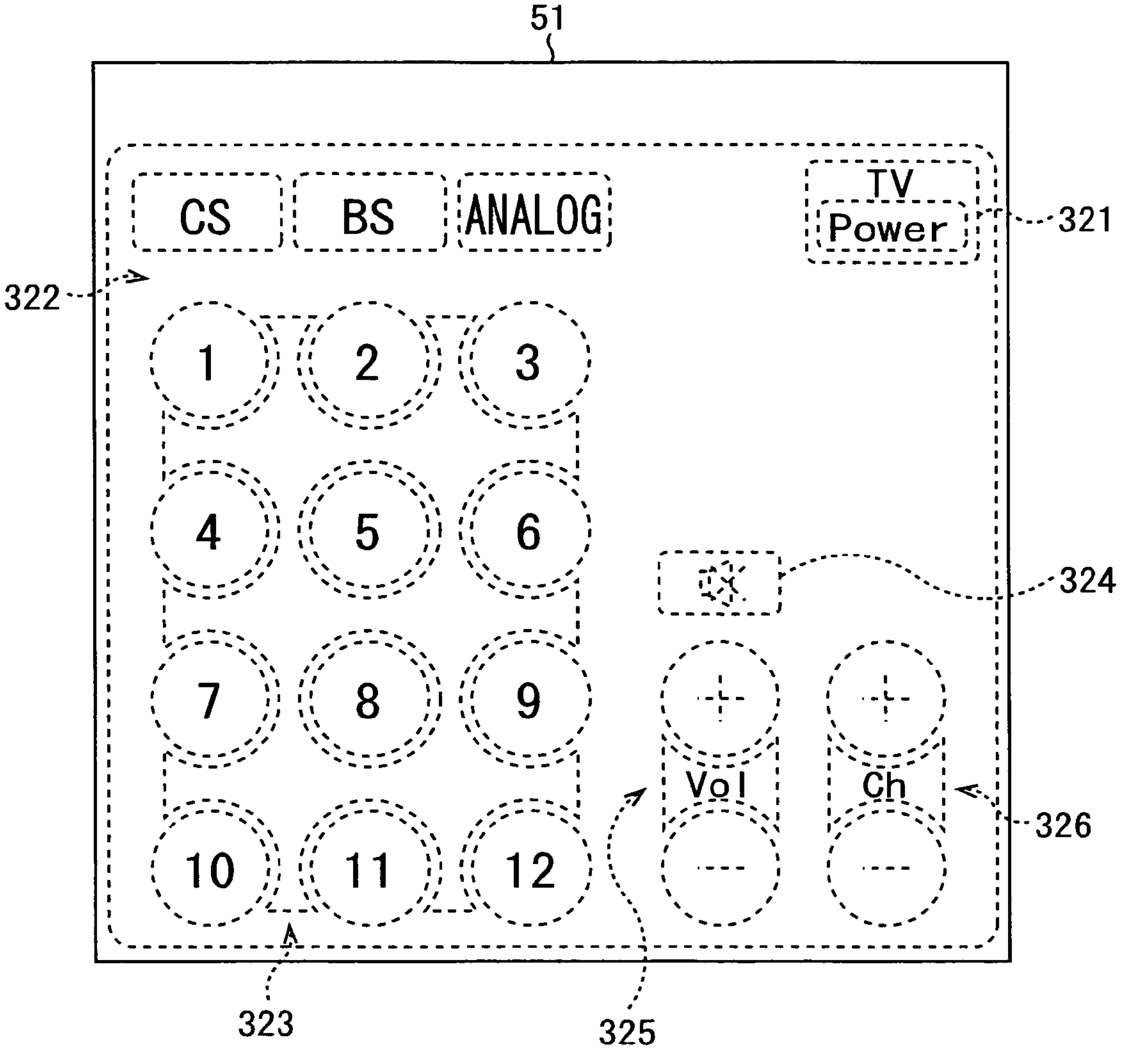
FIG. 47 is a diagram showing an example of display of an operation panel.

FIG. 47 is a diagram showing an example of display of the operation panel whose transparency is set because predetermined time has elapsed after it goes out of the communication coverage with the television receiver 21.

A broken line in FIG. 47 indicates that the operation panel of the television receiver 21 is displayed in paler color as compared with the operation panel in FIG. 18.

In this manner, since the operation panel is displayed so that the density becomes gradually lower, the user can instinctively recognize that it goes out of the communication coverage with the device.

As described above, since the operation panel information is provided by, for example, a device itself, the user can allow the remote controller 1 to display an optimum operation panel screen in accordance with the functions of the device. However, for example, there are some cases where a function is added or the like as a result of version upgrade of a firmware of the device and the like. In such a case, it is necessary to upgrade the operation panel in conformity with a new function.

Figure 48:
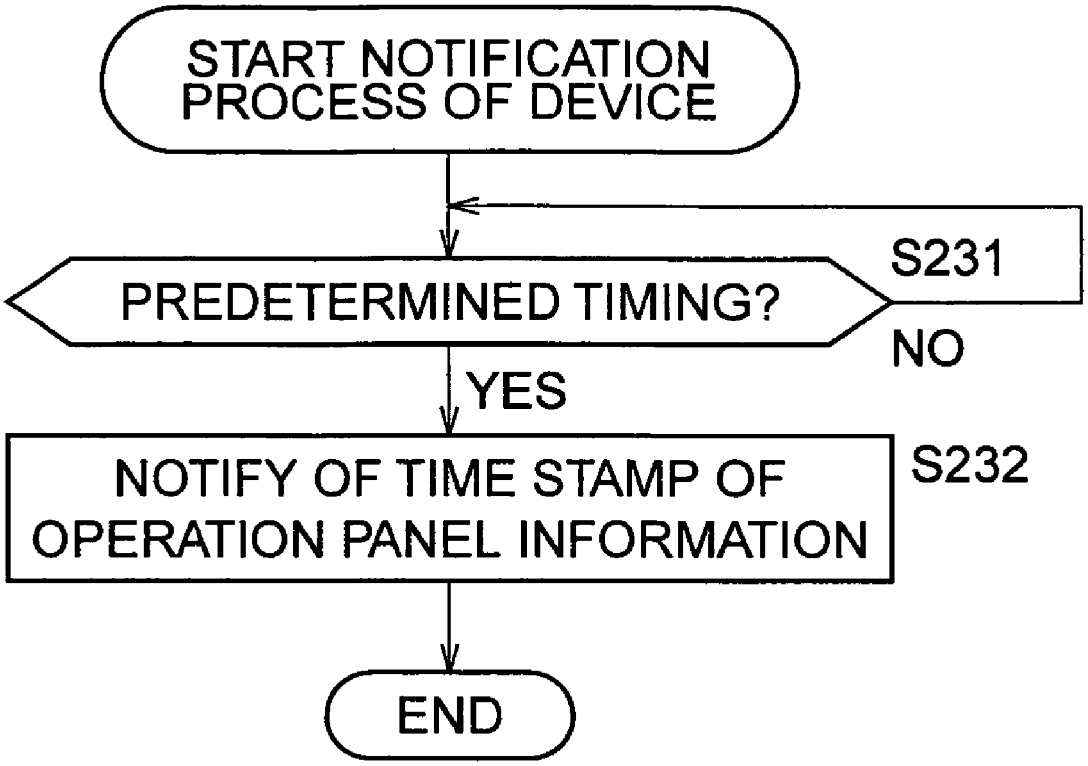
FIG. 48 is a flowchart illustrating a process of a device that notifies of a time stamp.

Next, with reference to a flowchart of FIG. 48, a process of a device notifying of a time stamp of the operation panel information (HTML file) so that the remote controller 1 determines whether the operation panel information possessed by the remote controller 1 is the latest operation panel information or not will be described.

At step S231, for example, the control section 241 of the television receiver 21 determines whether predetermined timing comes or not and waits until it is determined that the predetermined timing comes. If the control section 241 determines that the predetermined timing comes at step S231, it proceeds to step S232.

For example, when the device communicates with the remote control 1 for the first time after the version upgrade of a firmware of the device or a predetermined cycle which is set for the device elapses, the control section 241 determines that the predetermined timing comes. When the firmware is upgraded or the like, operation panel information in accordance with the functions after modification is also installed with the firmware so as to be managed by the operation panel information management section 243.

At step S232, the operation panel information management section 243 notifies the remote controller 1 through the communication control section 242 of a time stamp of the operation panel information stored in the television receiver 21. In the time stamp, it is described that year/month/day of the creation of the operation panel information and the like.

Figure 49:
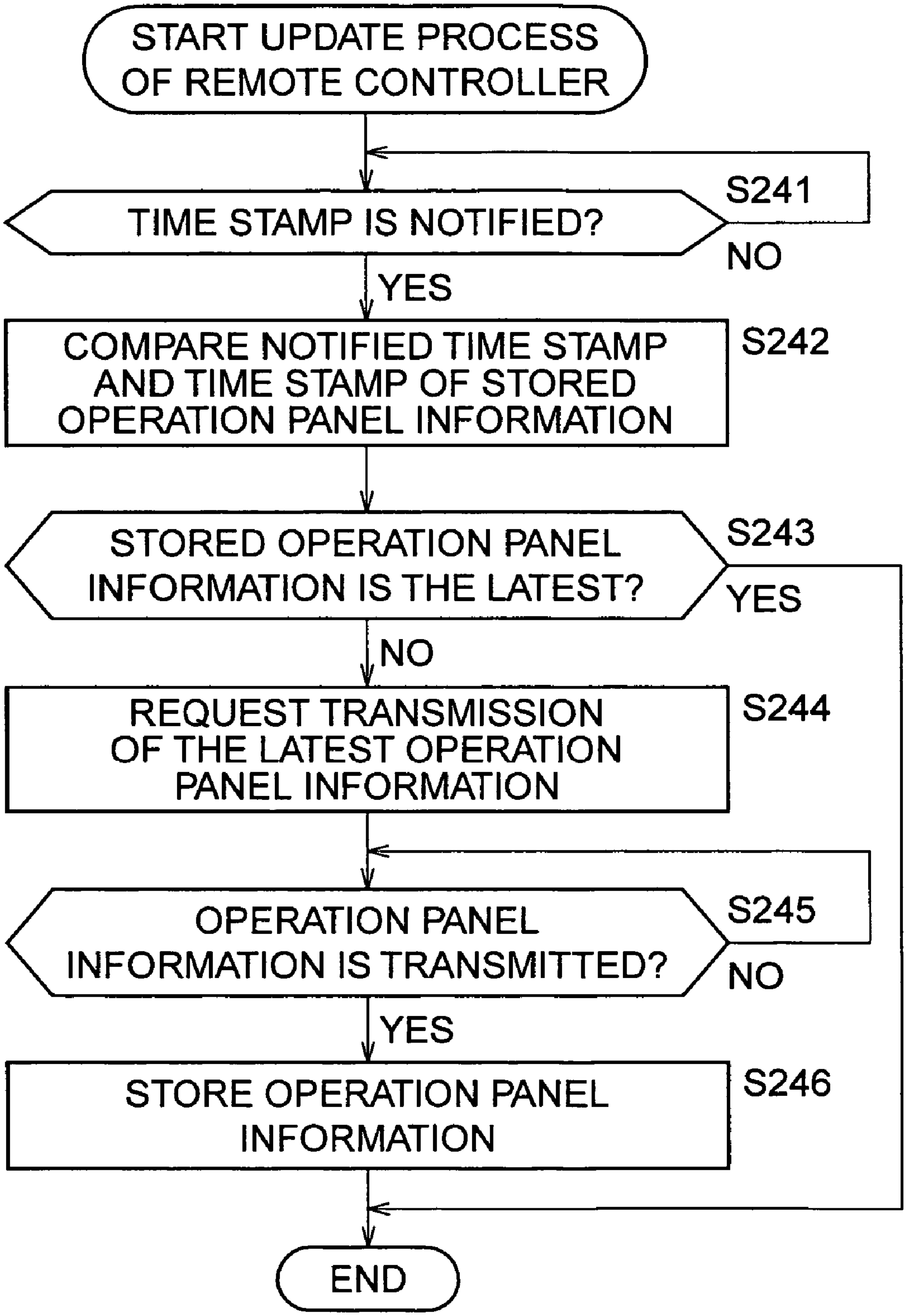
FIG. 49 is a flowchart illustrating a process executed by a remote controller in response to the process in FIG. 48.

Next, with reference to a flowchart of FIG. 49, a process executed by the remote controller 1 in response to FIG. 48 will be described.

At step S241, the cache memory management section 182 of the storage control section 152 determines whether notification of the time stamp is made from the television receiver 21 (device) or not based on an output from the communication control section 151 and waits until it is determined that the notification is made.

If the cache memory management section 182 determines the notification of the time stamp is made from the television receiver 21 at step S241, it proceeds to step S242 so as to compare the notified time stamp and a time stamp of the operation panel information stored in a cache memory 70A with each other.

The cache memory management section 182 determines whether the stored operation panel information is the latest one or not. If it is determined that the information is the latest one, the process is terminated. On the other hand, if it is determined that the stored operation panel information is the latest one, the process proceeds to step S244.

At step S244, the device control section 162 requests the television receiver 21 to transmit the latest operation panel information. The request may contain, for example, the feature information of the remote controller 1 as described above.

If the latest operation panel information is acquired not from the device but from the server 43, the communication control section 151 communicates with the access point 21 so as to request the server 43 to transmit the operation panel information through the network 42. The server 43 is notified of, for example, a device ID of the television receiver 21 and the like from the remote controller 1 and is requested to transmit the latest operation panel information.

For example, if the audio system 22 in FIG. 1 is connected to the network 42 through a router (not shown), the audio system 22 may be made to acquire the latest operation panel information from the server 43 through the router and the network 42 in accordance with a instruction from the remote controller 1 so as to transfer it to the remote controller 1. The latest operation panel information can also be acquired in this manner.

At step S245, it is determined whether the operation panel information is transmitted from the television receiver 21 in response to the request or not. If it is determined that the information is transmitted, the cache memory management section 182 stores the transmitted operation panel information at step S246.

By the above process, the latest operation panel information of the device in conformity with the functions at that time is stored in the remote controller 1. Moreover, with the operation panel displayed based on the latest operation panel information, it is ensured that the user can operate the devices.

Although the case where the communication is performed between the remote controller 1 and the devices through the Bluetooth communication has mainly been described above, various types of wireless communication such as IEEE802.11a and 802.11b can also be used.

Although the television receiver 21, the audio system 22, the personal computer 31 and the robot 32 in FIG. 1 correspond to the devices to be controlled by the remote controller 1 in the above description, various other equipment can also be controlled by the remote controller. For example, AV (Audio Visual) equipment such as a DVD recorder and a hard disk recorder, home electrical appliances such as lighting equipment and an air conditioner, and the other equipment may be controlled by the remote controller 1. Even in this case, each piece of equipment stores information of an operation panel operated when the piece of equipment is controlled so that the stored operation panel information is provided for the remote controller 1.

A series of processes described above is executable by a hardware or by a software.

If the series of processes are executed by a software, a program constituting the software is installed from a network or a recording medium on a computer incorporated into a dedicated hardware or, for example, a general purpose personal computer capable of executing various functions by installing various programs thereon.

The recording medium is constituted not only by a package medium distributed so as to provide a program for the user independently of a device itself, as shown in FIG. 3, which comprised of the magnetic disk 71 (including a flexible disk), the optical disk 72 (including a CD-ROM (Compact Disk-Read Only Memory) and a DVD (Digital Versatile Disk)), the magneto-optical disk 74 (including a MD (registered trademark) (Mini-Disk)), the semiconductor memory 74 or the like, on which a program is recorded, but also by the ROM 62 on which a program is recorded or a hard disk included in the storage section 69, which is already incorporated into a device itself so as to be provided for the user.

In the present specification, steps describing a program recorded on a recording medium include, of course, not only processes which are performed in time series in the described order but also processes executed in parallel or individually, which are not necessarily executed in time series.

Moreover, in the present specification, the system denotes the entire apparatus composed of a plurality of devices.

INDUSTRIAL APPLICABILITY

According to the present invention, it is possible to control an information processing apparatus existing in the vicinity.

Moreover, according to the present invention, it is possible to operate an information processing apparatus more efficiently.

Furthermore, according to the present invention, it is possible to prevent form operating a remote controller erroneously.

The invention claimed is:

1. A control apparatus controlling an information processing apparatus, comprising:

detection means for detecting an information processing apparatus through wireless communication;

first display means for displaying, based only on detecting the information processing apparatus, a temporary operation screen for controlling the information processing apparatus prior to and while receiving operation screen information from the information processing apparatus;

first acquisition means for acquiring operation screen information of a plurality of information processing apparatuses when the plurality of information processing apparatuses are detected, each operation screen information including a full display for controlling the corresponding information processing apparatus;

storage management means for storing the operation screen information;

editing means for editing the operation screen information to display operation screen information for the plurality of information processing apparatuses in a single display region;

second display means for displaying the edited operation screen information;

control means for controlling the information processing apparatuses based on an input provided to the displayed operation screens;

detecting means for detecting when a first of the information processing apparatuses moves outside a range for the wireless communication; and clearing means for clearing the display of the operation screen information for the first information processing apparatus when the first information processing apparatus moves outside the range.

2. The control apparatus according to claim 1, wherein the first acquisition means acquires the operation screen information from the information processing apparatus through the wireless communication.

3. The control apparatus according to claim 1, wherein the first acquisition means acquires the operation screen information from a predetermined server through the wireless communication.

4. The control apparatus according to claim 1, wherein the storage management means clears less frequently used operation screen information from among the operation screen information.

5. The control apparatus according to claim 1, further comprising intensity detection means for detecting intensities of radio waves emitted from the plurality of information processing apparatuses, wherein the editing means edits, based on the intensities, the operation screen information so that the operation screen of the information processing apparatus that emits a high intensity radio wave is displayed by priority.

6. A control apparatus controlling an information processing apparatus, comprising:

detection means for detecting an information processing apparatus through wireless communication;

first acquisition means for acquiring operation screen information of a plurality of information processing apparatuses when the plurality of information processing apparatuses are detected, each operation screen information including a full display for controlling the corresponding information processing apparatus;

storage management means for storing the operation screen information;

editing means for editing the operation screen information to display operation screen information for the plurality of information processing apparatuses in a single display region;

display means for displaying the edited operation screen information;

control means for controlling the information processing apparatuses based on an input provided to the displayed operation screens; and intensity detection means for detecting intensities of radio waves emitted from the plurality of information processing apparatuses, wherein the display means determines, based on the intensities, whether the control apparatus is out of a communication coverage with the information processing apparatuses, initiates a timer when the intensities fall below a predetermined threshold, counts an elapsed time using the timer during which the intensities remain below the predetermined threshold, and thereafter increases the transparency of the corresponding operation screen gradually at predetermined times when the control apparatus is out of the communication coverage, the communication coverage including a defined vicinity to the control apparatus.

7. The control apparatus according to claim 1, wherein the editing means edits the plurality of operation screen information so that the operation screen being operated is continuously displayed.

8. The control apparatus according to claim 1, further comprising history management means for managing a history of control of the information processing apparatus.

9. The control apparatus according to claim 8, wherein the editing means edits, based on the history, the operation screen information so that the operation screen of a most recently operated information processing apparatus is displayed by priority.

10. The control apparatus according to claim 8, wherein the editing means edits, based on the history, the operation screen information so that a most frequently used operation screen is displayed by priority.

11. The control apparatus according to claim 8, wherein the editing means edits, based on the history, the operation screen information so that the operation screen which is most likely to be used within a period of time including a current time is displayed by priority.

12. The control apparatus according to claim 8, further comprising selection means for selecting, based on the history, other information processing apparatus relevant to the information processing apparatus whose operation screen is being displayed, wherein the editing means edits the operation screen information so that the operation screen of the other processing apparatus is displayed together with the operation screen of the information processing apparatus.

13. A control apparatus controlling an information processing apparatus, comprising:

detection means for detecting an information processing apparatus through wireless communication;

first acquisition means for acquiring operation screen information of a plurality of information processing apparatuses when the plurality of information processing apparatuses are detected, each operation screen information including a full display for controlling the corresponding information processing apparatus;

storage management means for storing the operation screen information;

editing means for editing the operation screen information to display operation screen information for the plurality of information processing apparatuses in a single display region;

display means for displaying the edited operation screen information;

control means for controlling the information processing apparatuses based on an input provided to the displayed operation screens; and selection means for selecting a second information processing apparatus that is relevant to the information processing apparatus based on a time difference between times at which the information processing apparatus and the second information processing apparatus are respectively controlled, wherein the display means simultaneously displays in two frames the operation screen for the information processing apparatus and the operation screen for the second information processing apparatus, wherein one of the two frames is larger than the other, the larger frame including a most frequently used one of the operation screen for the information processing apparatus and the second information processing apparatus.

14. The control apparatus according to claim 1, wherein the operation screen information is described in an HTML (Hyper Text Markup Language).

15. The control apparatus according to claim 1, further comprising second acquisition means for acquiring other operation screen information in accordance with a category of the information processing apparatus, wherein the display means displays, until the operation screen information is acquired by the first acquisition means, other operation screen based on the other operation screen information acquired by the second acquisition means.

16. The control apparatus according to claim 1, wherein when the information processing apparatus transmits the operation screen information, the first acquisition means transmits feature information indicating a feature of then control apparatus and acquires the operation screen information transmitted from the information processing apparatus in response to the transmission.

17. A control method of a control apparatus for controlling an information processing apparatus, comprising:

detecting the information processing apparatus through wireless communication;

displaying, based only on detecting the information processing apparatus, a temporary operation screen for controlling the information processing apparatus prior to and while receiving operation screen information from the information processing apparatus;

acquiring operation screen information for displaying an operation screen for controlling the information processing apparatus while acquiring operation screen information of a plurality of information processing apparatuses, each operating screen information including a full display for controlling the corresponding information processing apparatus;

storing the operation screen information;

editing the operation screen information to display operation screen information for the plurality of information processing apparatuses in a single display region;

displaying the edited operation screen information;

controlling the information processing apparatuses based on an input provided from the displayed operation screen information;

detecting when a first of the information processing apparatuses moves outside a range for the wireless communication; and clearing the display of the operation screen information for the first information processing apparatus when the first information processing apparatus moves outside the range.

18. A computer-readable medium comprising a program which, when executed by a processor, performs a method for controlling an information processing apparatus, the method comprising:

detecting an information processing apparatus through wireless communication;

displaying, based only on detecting the information processing apparatus, a temporary operation screen for controlling the information processing apparatus prior to and while receiving operation screen information from the information processing apparatus;

acquiring operation screen information for displaying an operation screen for controlling the information processing apparatus while acquiring operation screen information of a plurality of information processing apparatuses, each operating screen information including a full display for controlling the corresponding information processing apparatus;

storing the operation screen information:

editing the operation screen information to display operation screen information for the plurality of information processing apparatuses in a single display region;

displaying the edited operation screen information;

controlling the information processing apparatuses based on an input provided from the displayed operation screen information;

detecting when a first of the information processing apparatuses moves outside a range for the wireless communication; and clearing the display of the operation screen information for the first information processing apparatus when the first information processing apparatus moves outside the range.

19. An information processing apparatus being controlled by a control apparatus, comprising:

storage means for storing operation screen information that is edited by the control apparatus, the operation screen information providing the control apparatus with a full display operation screen, the operation screen providing controls for the information processing apparatus; and transmission means for transmitting the operation screen information to the control apparatus through wireless communication in response to a request from the control apparatus, wherein the control apparatus controls the information processing apparatus with a temporary operation screen that is displayed, based only on detecting the information processing apparatus, prior to and while until transmitting the operation screen information, wherein the control apparatus edits the operating screen information to display a plurality of operating screens for a plurality of information processing apparatuses within a single display, and wherein the control apparatus removes the display of the operating screen for the information processing apparatus when the information processing apparatus moves outside a range of the wireless communication.

20. The information processing apparatus according to claim 19, wherein the operation screen information is selected based on feature information indicating a feature of the control apparatus, and wherein the transmission means transmits the selected operation screen information.

21. An information processing method of an information processing apparatus being controlled by a control apparatus, the method comprising:

storing operation screen information that is edited by the control apparatus, the operation screen information providing the control apparatus with a full display operation screen, the operation screen providing controls for the information processing apparatus; and transmitting the operation screen information to the control apparatus through wireless communication in response to a request from the control apparatus, wherein the control apparatus controls the information processing apparatus using a temporary operation screen that is displayed, based only on detecting the information processing apparatus, prior to and while transmitting the operation screen information, wherein the control apparatus edits the operating screen information to display a plurality of operating screens for a plurality of information processing apparatuses within a single display, and wherein the control apparatus removes the display of the operating screen for the information processing apparatus when the information processing apparatus moves outside a range of the wireless communication.

22. A computer-readable medium comprising a program which, when executed by a processor, performs a method for controlling an operation based on an instruction from a control apparatus, the method comprising:

storing operation screen information that is edited by the control apparatus, the operation screen information providing the control apparatus with a full display operation screen, the operation screen providing controls for an information processing apparatus; and transmitting the operation screen information to the control apparatus through wireless communication in response to a request from the control apparatus, wherein the control apparatus displays, based only on detecting the information processing apparatus, a temporary operation screen for controlling the information processing apparatus prior to and while transmitting the operation screen information, wherein the control apparatus edits the operating screen information to display a plurality of operating screens for a plurality of information processing apparatuses within a single display, and wherein the control apparatus removes the display of the operating screen for the information processing apparatus when the information processing apparatus moves outside a range of the wireless communication.

* * * * *

UNITED STATES PATENT AND TRADEMARK OFFICE

CERTIFICATE OF CORRECTION

PATENT NO. : 7,627,825 B2
APPLICATION NO. : 10/509557
DATED : December 1, 2009

INVENTOR(S) : Hiroshi Kakuda

It is certified that error appears in the above-identified patent and that said Letters Patent is hereby corrected as shown below:

Claim 16, column 37, line 7, “then” should read --the--.

Claim 17, column 37, line 24, “operating” should read --operation--.

Claim 18, column 37, line 57, “operating” should read --operation--.

Claim 19, column 38, lines 22-23, “while until transmitting” should read --while transmitting--.

Claim 19, column 38, line 24, “operating” should read --operation--.

Claim 19, column 38, line 25, “operating” should read --operation--.

Claim 19, column 38, line 29, “operating” should read --operation--.

Claim 21, column 38, line 56, “operating” should read --operation--.

Claim 21, column 38, line 57, “operating” should read --operation--.

Claim 21, column 38, line 61, “operating” should read --operation--.

Claim 22, column 40, line 3, “operating” should read --operation--.

Claim 22, column 40, line 4, “operating” should read --operation--.

Claim 22, column 40, line 8, “operating” should read --operation--.

Signed and Sealed this

Fourth Day of May, 2010

David J. Kappos

*Director of the United States Patent and Trademark Office*